US009955301B2

(12) United States Patent
Markhovsky et al.

(10) Patent No.: US 9,955,301 B2
(45) Date of Patent: *Apr. 24, 2018

(54) MULTI-PATH MITIGATION IN RANGEFINDING AND TRACKING OBJECTS USING REDUCED ATTENUATION RF TECHNOLOGY

(71) Applicant: Invisitrack, Inc., Annapolis, MD (US)

(72) Inventors: Felix Markhovsky, Saratoga, CA (US); Truman Prevatt, Brooksville, FL (US)

(73) Assignee: POLTE CORPORATION, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/017,327

(22) Filed: Feb. 5, 2016

(65) Prior Publication Data

US 2016/0192144 A1 Jun. 30, 2016

Related U.S. Application Data

(63) Continuation of application No. 14/043,785, filed on Oct. 1, 2013, now Pat. No. 9,288,623, and a (Continued)

(51) Int. Cl.
*G08B 13/14* (2006.01)
*H04W 4/02* (2018.01)
(Continued)

(52) U.S. Cl.
CPC ............... *H04W 4/023* (2013.01); *G01S 3/74* (2013.01); *G01S 5/0205* (2013.01);
(Continued)

(58) Field of Classification Search
CPC .......... H04W 4/023; H04W 4/22; G01S 3/74; G01S 5/0205; G01S 5/0257;
(Continued)

(56) References Cited

U.S. PATENT DOCUMENTS 4,334,314 A 6/1982 Nard et al.
4,455,556 A 6/1984 Koshio et al.
(Continued)

FOREIGN PATENT DOCUMENTS

CN 1484769 A 3/2004
CN 1997911 A 7/2007
(Continued)

OTHER PUBLICATIONS

U.S. Appl. No. 14/105,098, filed Dec. 12, 2003, Markhovksy et al.
(Continued)

*Primary Examiner* — Kerri McNally
(74) *Attorney, Agent, or Firm* — Baker & Hostetler LLP

(57) ABSTRACT

An autonomous system with no Customer Network Investment is described, wherein the system is configurable to operate on in a band in addition to the LTE band. Such system allows the definition of hybrid operations to accommodate the positioning reference signals (PRS) of LTE and already existing reference signals. The system can operate with PRS, with other reference signals such as cell-specific reference signals (CRS), or with both signal types. As such, the system provides the advantage of allowing network operator(s) to dynamically choose between modes of operation depending on circumstances, such as network throughput and compatibility.

17 Claims, 20 Drawing Sheets

Related U.S. Application Data continuation-in-part of application No. 13/566,993, filed on Aug. 3, 2012, now Pat. No. 9,507,007, which is a continuation-in-part of application No. 13/109,904, filed on May 17, 2011, now Pat. No. 8,305,215, which is a continuation of application No. 13/008,519, filed on Jan. 18, 2011, now Pat. No. 7,969,311, which is a continuation-in-part of application No. 12/502,809, filed on Jul. 14, 2009, now Pat. No. 7,872,583, which is a continuation-in-part of application No. 11/610,595, filed on Dec. 14, 2006, now Pat. No. 7,561,048.

(60) Provisional application No. 61/744,828, filed on Oct. 3, 2012, provisional application No. 61/662,270, filed on Jun. 20, 2012, provisional application No. 61/618,472, filed on Mar. 30, 2012, provisional application No. 61/554,945, filed on Nov. 2, 2011, provisional application No. 61/514,839, filed on Aug. 3, 2011, provisional application No. 61/103,270, filed on Oct. 7, 2008, provisional application No. 60/597,649, filed on Dec. 15, 2005.

(51) Int. Cl.
| | |
|---|---|
| *H04W 4/22* | (2009.01) |
| *G01S 3/74* | (2006.01) |
| *G01S 5/02* | (2010.01) |
| *G01S 5/14* | (2006.01) |
| *G01S 13/22* | (2006.01) |
| *G01S 13/24* | (2006.01) |
| *G01S 13/76* | (2006.01) |
| *G01S 13/87* | (2006.01) |
| *H04L 5/00* | (2006.01) |
| *G01S 13/46* | (2006.01) |

(52) U.S. Cl.
CPC .......... *G01S 5/0215* (2013.01); *G01S 5/0257* (2013.01); *G01S 5/0263* (2013.01); *G01S 5/0273* (2013.01); *G01S 5/14* (2013.01); *G01S 13/222* (2013.01); *G01S 13/24* (2013.01); *G01S 13/767* (2013.01); *G01S 13/878* (2013.01); *H04L 5/0048* (2013.01); *H04W 4/22* (2013.01); *G01S 2013/466* (2013.01); *G01S 2013/468* (2013.01)

(58) Field of Classification Search
CPC ........ G01S 5/0263; G01S 5/0273; G01S 5/14; G01S 13/222; G01S 13/24; G01S 13/0767; G01S 13/878; H04L 5/0048
USPC ....................................................... 340/572.1
See application file for complete search history.

(56) References Cited

U.S. PATENT DOCUMENTS

| | | | |
|---|---|---|---|
| 5,045,860 A | 9/1991 | Hodson et al. | |
| 5,525,967 A | 6/1996 | Azizi et al. | |
| 5,604,503 A | 2/1997 | Fowler et al. | |
| 5,774,876 A | 6/1998 | Woolley et al. | |
| 5,881,055 A | 3/1999 | Kondo | |
| 5,973,643 A | 10/1999 | Hawkes et al. | |
| 6,208,295 B1 | 3/2001 | Dogan et al. | |
| 6,211,818 B1 | 4/2001 | Zach | |
| 6,266,014 B1 | 7/2001 | Fattouche et al. | |
| 6,275,186 B1 | 8/2001 | Kong | |
| 6,435,286 B1 | 8/2002 | Stump et al. | |
| 6,515,623 B2 * | 2/2003 | Johnson | G01S 5/12 342/387 |
| 6,788,199 B2 | 9/2004 | Crabtree et al. | |
| 6,812,824 B1 * | 11/2004 | Goldinger | G06K 17/00 340/10.1 |
| 6,856,280 B1 | 2/2005 | Eder et al. | |
| 7,110,774 B1 | 9/2006 | Davis et al. | |
| 7,167,456 B2 | 1/2007 | Iwamatsu et al. | |
| 7,245,677 B1 | 7/2007 | Pare | |
| 7,271,764 B2 | 9/2007 | Golden et al. | |
| 7,292,189 B2 * | 11/2007 | Orr | G01S 5/06 342/387 |
| 7,561,048 B2 | 7/2009 | Yushkov et al. | |
| 7,668,124 B2 | 2/2010 | Karaoguz | |
| 7,668,228 B2 | 2/2010 | Feller et al. | |
| 7,872,583 B1 | 1/2011 | Yushkov et al. | |
| 7,969,311 B2 | 6/2011 | Markhovsky et al. | |
| 7,974,627 B2 | 7/2011 | Mia et al. | |
| 8,140,102 B2 | 3/2012 | Nory et al. | |
| 8,305,215 B2 | 11/2012 | Markhovsky et al. | |
| 8,681,809 B2 | 3/2014 | Sambhwani et al. | |
| 9,288,623 B2 * | 3/2016 | Markhovsky | H04W 4/023 |
| 9,699,607 B2 | 7/2017 | Markhovsky et al. | |
| 2003/0008156 A1 | 1/2003 | Pocius et al. | |
| 2003/0139188 A1 | 7/2003 | Chen et al. | |
| 2003/0146871 A1 * | 8/2003 | Karr | G01S 1/026 342/457 |
| 2004/0021599 A1 | 2/2004 | Hall et al. | |
| 2004/0203429 A1 | 10/2004 | Anderson et al. | |
| 2005/0085257 A1 | 4/2005 | Laird et al. | |
| 2005/0093709 A1 | 5/2005 | Franco et al. | |
| 2005/0285782 A1 | 12/2005 | Bennett | |
| 2006/0009235 A1 | 1/2006 | Sheynblat et al. | |
| 2006/0050625 A1 | 3/2006 | Krasner | |
| 2006/0145853 A1 | 7/2006 | Richards et al. | |
| 2006/0193371 A1 | 8/2006 | Maravic | |
| 2006/0220851 A1 | 10/2006 | Wisherd | |
| 2006/0267841 A1 | 11/2006 | Lee et al. | |
| 2006/0273955 A1 | 12/2006 | Manz | |
| 2007/0053340 A1 | 3/2007 | Guilford | |
| 2007/0139200 A1 | 6/2007 | Yushkov et al. | |
| 2007/0248180 A1 | 10/2007 | Bowman et al. | |
| 2008/0030345 A1 | 2/2008 | Austin et al. | |
| 2008/0037512 A1 | 2/2008 | Aljadeff et al. | |
| 2008/0285505 A1 | 11/2008 | Carlson et al. | |
| 2008/0311870 A1 * | 12/2008 | Walley | G01S 5/0252 455/186.1 |
| 2009/0017841 A1 | 1/2009 | Lewis et al. | |
| 2010/0091826 A1 | 4/2010 | Chen et al. | |
| 2010/0120394 A1 | 5/2010 | Mia et al. | |
| 2010/0178936 A1 | 7/2010 | Wala et al. | |
| 2010/0273504 A1 | 10/2010 | Bull et al. | |
| 2010/0273506 A1 | 10/2010 | Stern-Berkowitz et al. | |
| 2010/0317351 A1 | 12/2010 | Gerstenberger et al. | |
| 2011/0105144 A1 | 5/2011 | Siomina et al. | |
| 2011/0111751 A1 | 5/2011 | Markhovsky et al. | |
| 2011/0117926 A1 | 5/2011 | Hwang et al. | |
| 2011/0124347 A1 | 5/2011 | Chen et al. | |
| 2011/0143770 A1 | 6/2011 | Charbit et al. | |
| 2011/0149887 A1 | 6/2011 | Khandekar et al. | |
| 2011/0256882 A1 | 10/2011 | Markhovsky et al. | |
| 2011/0286349 A1 | 11/2011 | Tee et al. | |
| 2011/0309983 A1 | 12/2011 | Holzer et al. | |
| 2012/0009948 A1 | 1/2012 | Powers et al. | |
| 2012/0129550 A1 | 5/2012 | Hannan et al. | |
| 2012/0232367 A1 | 9/2012 | Allegri et al. | |
| 2012/0302254 A1 | 11/2012 | Charbit | |
| 2013/0023285 A1 | 1/2013 | Markhovsky et al. | |
| 2013/0045754 A1 | 2/2013 | Markhovsky et al. | |
| 2013/0083683 A1 | 4/2013 | Hwang et al. | |
| 2013/0252629 A1 | 9/2013 | Wigren et al. | |
| 2013/0288692 A1 | 10/2013 | Dupray et al. | |
| 2014/0045520 A1 | 2/2014 | Lim et al. | |
| 2014/0177745 A1 | 6/2014 | Krishnamurthy et al. | |

FOREIGN PATENT DOCUMENTS

| | | |
|---|---|---|
| EP | 0467036 | 1/1992 |
| EP | 1863190 A1 | 12/2007 |
| JP | 02-247590 | 10/1990 |
| JP | 08-265250 | 10/1996 |

(56) References Cited

FOREIGN PATENT DOCUMENTS

| | | |
|---|---|---|
| JP | 09-139708 A | 5/1997 |
| JP | H11-178043 A | 7/1999 |
| JP | 2000-241523 A | 9/2000 |
| JP | 2000-354268 A | 12/2000 |
| JP | 2001-197548 A | 7/2001 |
| JP | 2002-532979 A | 10/2002 |
| JP | 2003-501664 | 1/2003 |
| JP | 2007-013500 A | 1/2007 |
| JP | 2007-298503 | 11/2007 |
| JP | 2009-528546 A | 8/2009 |
| JP | 2010-239395 A | 10/2010 |
| JP | 2011-149809 A | 8/2011 |
| JP | 2012-526491 A | 10/2012 |
| JP | 2012-529842 A | 11/2012 |
| JP | 2012-531830 A | 12/2012 |
| KR | 2008-0086889 | 9/2008 |
| WO | WO 2000/035208 A1 | 6/2000 |
| WO | WO 2000/075681 | 12/2000 |
| WO | WO 2002/071093 A2 | 9/2002 |
| WO | WO 2005/088561 | 9/2005 |
| WO | WO 2006/095463 | 9/2006 |
| WO | WO 2007/136419 | 11/2007 |
| WO | WO 2010/104436 | 9/2010 |
| WO | WO 2010/129885 A1 | 11/2010 |
| WO | WO 2010/134933 | 11/2010 |
| WO | WO 2010/151829 A2 | 12/2010 |
| WO | WO 2011/016804 A1 | 2/2011 |
| WO | WO 2011/021974 A1 | 2/2011 |
| WO | WO 2014/093400 A1 | 6/2014 |

OTHER PUBLICATIONS

3rd Generation Partnership Project EST TSI 136 214, V9.1.0, "LTE; Evolved Universal Terrestrial Radio Access (E-UTRA); Physical Layer—Measurements" (Release 9), Apr. 2010, 15 pages.

3rd Generation Partnership Project ETSI TS 136 211 V9.1.0, "LTE; Evolved Universal Terrestrial Radio Access (E-UTRA); Physical Channels and Modulation" (Release 9), Apr. 2010, 87 pages.

3rd Generation Partnership Project TS 36.211 V9.1.0, "Technical Specification Group Radio Access Network; Evolved Universal Terrestrial Radio Access (E-UTRA); Physical Channels and Modulation" (Release 9), Mar. 2010, 85 pages.

3rd Generation Partnership Project, (3GPP) TS 25.215 V3.0.0, "3rd Generation Partnership Project; Technical Specification Group Radio Access Network; Physical layer-Measurements", Oct. 1999, 19 pages.

3rd Generation Partnership Project, (3GPP) TS 36.211 V10.0.0 "Third Generation Partnership Project; Technical Specification Group Radio Access Network; Evolved Universal Terrestrial Radio Access (E-UTRA); Physical Channels and Modulation", (Release 10), Dec. 2010, 102 pages.

3rd Generation Partnership Project, (3GPP) TS 36.305 V9.3.0, "3rd Generation Partnership Project; Technical Specification Group Radio Access Network; Evolved Universal Terrestrial Radio Access Network; (E-UTRAN) Stage 2 Functional Specification of User Equipment (UE) Positioning in E-UTRAN)" (Release 9), Jun. 2010, 52 pages.

Alsindi, "Performance of TOA estimation algorithms in different indoor multipath conditions", Worcester Polytchnic Institute, Apr. 2004, 123 pages.

Dobkin, "Indoor Propagation and Wavelength" WJ Communications, Jul. 10, 2002, V 1.4, 8 pages.

Goldsmith, "EE359-Lecture Outline 2: Wireless Communications", Aug. 2010, http://www.stanford.edu/class/ee359/lectures2_1pp.pdf, 12 pages.

Goldsmith, "Wireless Communication", Cambridge University Press, 2005, 644 pages.

Hashemi et al., MRI: the basics, Lippincott Williams & Wilkinson, Chapter 23 thru 31, Philadelphia, Pa, Apr. 2010, 269-356.

Rantala et al., "Indoor propagation comparison between 2.45 GHz and 433 MHz transmissions", IEEE Antennas and Propagation Society International Symposium, 2002, 1, 240-243.

Ruiter, "Factors to consider when selecting a wireless network for vital signs monitoring", 1999, 9 pages.

Salous, "Indoor and Outdoor UHF Measurements with a 90MHz Bandwidth", IEEE Coloquium on Propagation Chracteristics and Related System Techniques for Beyond Line-of-Site Radio, 1997, 6 pages.

Stone, "Electromagnetic signal attenuation in construction materials", NIST Construction Automation Program Report No. 3, Oct. 1997, NISTIR 6055, 101 pages.

Zyren, "Overview of the 3GPP Long Term Evolution Physical Layer", White Paper, Jul. 2007, 27 pages.

European Patent Application No. 06851205.2: Extended European Search Report dated Aug. 21, 2013, 13 pages.

European Patent Application No. 09845044.8; Extend European Search Report; dated Mar. 3, 2014; 7 pages.

International Patent Application No. PCT/US2013/074212; International Search Report and the Written Opinion; dated May 20, 2014; 19 pages.

Sahad, "Signal Propagation & Path Loss Models"; p. 17-30.

Sakaguchi et al.; "Influence of the Model Order Estimation Error in the ESPIRIT Based High Resolution Techniques"; IEICE Trans. Commun.; vol. E82-B No. 3; Mar. 1999; p. 561-563.

Borkowski et al.; "Performance of Cell ID+RTT Hybrid Positioning Method for UMTS Radio Networks"; Institute of Comm. Engineering; Tampere Univ. of Tech.; 2004; 6 pages.

Lin et al.; "Microscopic Examination of an RSSI-Signature-Based Indoor Localization System"; Dept. of Electrical Engineering; HotEmNets; Jun. 2-3, 2008; 5 pages.

International Patent Application No. PCT/US2013/74212; Int'l Preliminary Report on Patentability; dated Mar. 27, 2015; 38 pages.

International Patent Application No. PCT/US2014/070184; Int'l Search Report and the Written Opinion; dated Oct. 28, 2015; 15 pages.

International Patent Application No. PCT/US2014/70184; Int'l Preliminary Report on Patentability; Apr. 11, 2016; 20 pages.

European Patent Application No. 13863113.0; Extended Search Report; dated Jun. 10, 2016; 7 pages.

European Patent Application No. 12819568.2; Extended Search Report; dated May 8, 2015; 7 pages.

Lee; "Accuracy Limitations of Hyperbolic Multilateration Systems"; Technical Note 1973-11; Massachusetts Institute of Technology, Lincoln Laboratory; 1973; 117 pages.

International Patent Application No. PCT/US2015/43321; Int'l Search Report and the Written Opinion; dated Dec. 22, 2015; 23 pages.

International Patent Application No. PCT/US2015/57418; Int'l Search Report; dated Feb. 26, 2016; 5 pages.

International Patent Application No. PCT/US2015/043321; Int'l Preliminary Report on Patentability; dated Jun. 16, 2016; 26 pages.

European Patent Application No. 16173140.1; Extended Search Report; dated Oct. 11, 2016; 8 pages.

\* cited by examiner

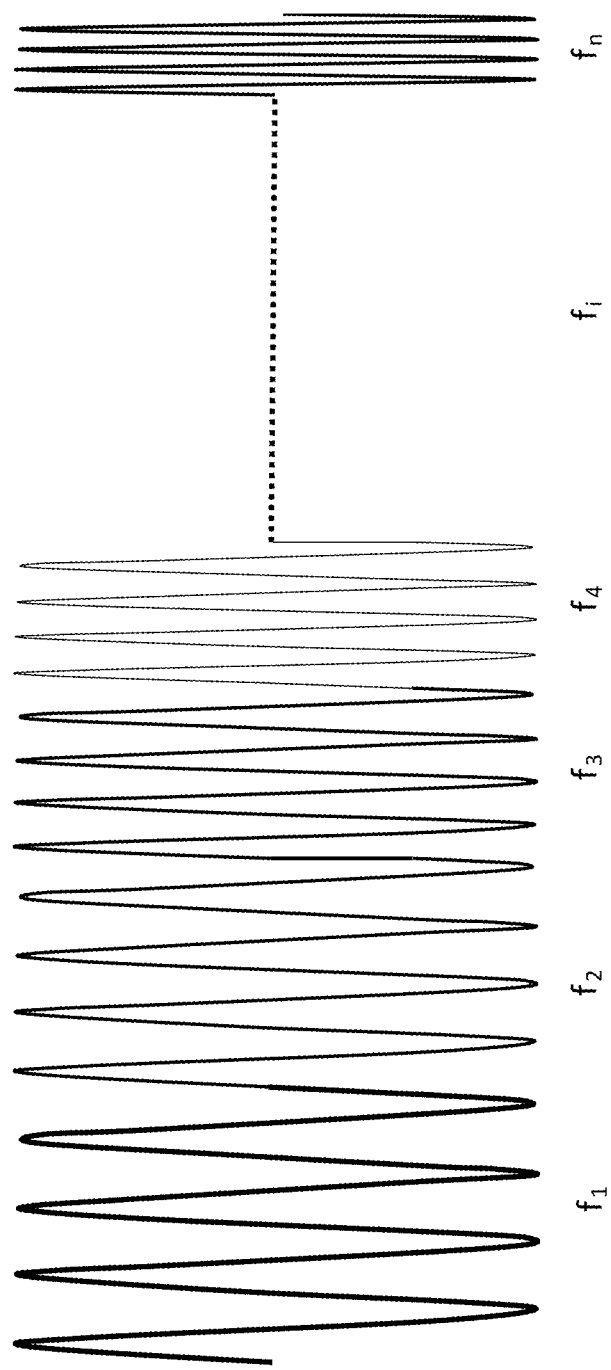

MULTI-PATH MITIGATION IN RANGEFINDING AND TRACKING OBJECTS USING REDUCED ATTENUATION RF TECHNOLOGY

CROSS REFERENCE TO RELATED APPLICATIONS

This application is a continuation of U.S. patent application Ser. No. 14/043,785, filed Oct. 1, 2013, which claims benefit under 35 U.S.C. § 119(e) of U.S. Provisional Application No. 61/744,828, filed Oct. 3, 2012, entitled MULTI-PATH MITIGATION IN RANGEFINDING AND TRACKING OBJECTS USING REDUCED ATTENUATION RF TECHNOLOGY, which is incorporated herein by reference in its entirety.

This application is also a continuation-in-part of U.S. patent application Ser. No. 13/566,993, filed Aug. 3, 2012, entitled MULTI-PATH MITIGATION IN RANGEFINDING AND TRACKING OBJECTS USING REDUCED ATTENUATION RF TECHNOLOGY, which claims benefit under 35 U.S.C. § 119(e) of U.S. Provisional Application No. 61/514,839, filed Aug. 3, 2011, entitled MULTI-PATH MITIGATION IN RANGEFINDING AND TRACKING OBJECTS USING REDUCED ATTENUATION RF TECHNOLOGY; U.S. Provisional Application No. 61/554,945, filed Nov. 2, 2011, entitled MULTI-PATH MITIGATION IN RANGEFINDING AND TRACKING OBJECTS USING REDUCED ATTENUATION RF TECHNOLOGY; U.S. Provisional Application No. 61/618,472, filed Mar. 30, 2012, entitled MULTI-PATH MITIGATION IN RANGEFINDING AND TRACKING OBJECTS USING REDUCED ATTENUATION RF TECHNOLOGY; and U.S. Provisional Application No. 61/662,270, filed Jun. 20, 2012, entitled MULTI-PATH MITIGATION IN RANGEFINDING AND TRACKING OBJECTS USING REDUCED ATTENUATION RF TECHNOLOGY; which are incorporated herein by reference in their entirety.

U.S. patent application Ser. No. 13/566,993, filed Aug. 3, 2012, entitled MULTI-PATH MITIGATION IN RANGEFINDING AND TRACKING OBJECTS USING REDUCED ATTENUATION RF TECHNOLOGY, is a continuation-in-part of U.S. patent application Ser. No. 13/109,904, filed May 17, 2011, entitled MULTI-PATH MITIGATION IN RANGEFINDING AND TRACKING OBJECTS USING REDUCED ATTENUATION RF TECHNOLOGY, now U.S. Pat. No. 8,305,215, issued Nov. 6, 2012, which is a continuation of U.S. patent application Ser. No. 13/008,519, filed Jan. 18, 2011, now U.S. Pat. No. 7,969,311, issued Jun. 28, 2011, entitled METHODS AND SYSTEM FOR MULTI-PATH MITIGATION IN TRACKING OBJECTS USING REDUCED ATTENUATION RF TECHNOLOGY, which is a continuation-in-part of U.S. patent application Ser. No. 12/502,809, filed on Jul. 14, 2009, now U.S. Pat. No. 7,872,583, issued Jan. 18, 2011, entitled METHODS AND SYSTEM FOR REDUCED ATTENUATION IN TRACKING OBJECTS USING RF TECHNOLOGY, which claims benefit under 35 U.S.C. § 119(e) of U.S. Provisional Application No. 61/103,270, filed on Oct. 7, 2008, entitled METHODS AND SYSTEM FOR MULTI-PATH MITIGATION IN TRACKING OBJECTS USING REDUCED ATTENUATION RF TECHNOLOGY, and is a continuation-in-part of U.S. patent application Ser. No. 11/610,595, filed on Dec. 14, 2006, now U.S. Pat. No. 7,561,048, issued Jul. 14, 2009, entitled METHODS AND SYSTEM FOR REDUCED ATTENUATION IN TRACKING OBJECTS USING RF TECHNOLOGY, which claims benefit under 35 U.S.C. § 119(e) of U.S. Provisional Patent Application No. 60/597,649 filed on Dec. 15, 2005, entitled METHOD AND SYSTEM FOR REDUCED ATTENUATION IN TRACKING OBJECTS USING MULTI-BAND RF TECHNOLOGY, which are incorporated by reference herein in their entirety.

TECHNICAL FIELD

The present embodiment relates to wireless communications and wireless networks systems and systems for a Radio Frequency (RF)-based identification, tracking and locating of objects, including RTLS (Real Time Locating Service).

BACKGROUND

RF-based identification and location-finding systems for determination of relative or geographic position of objects are generally used for tracking single objects or groups of objects, as well as for tracking individuals. Conventional location-finding systems have been used for position determination in an open outdoor environment. RF-based, Global Positioning System (GPS), and assisted GPSs are typically used. However, conventional location-finding systems suffer from certain inaccuracies when locating the objects in closed (i.e., indoor) environments, as well as outdoors. Although cellular wireless communication systems provide excellent data coverage in urban and most indoor environments, the position accuracy of these systems is limited by self-interference, multipath and non-line-of-sight propagation.

The indoor and outdoor location inaccuracies are due mainly to the physics of RF propagation, in particular, due to losses/attenuation of the RF signals, signal scattering and reflections. The losses/attenuation and scattering issues can be solved (see U.S. Pat. No. 7,561,048) by employing narrow-band ranging signal(s) and operating at low RF frequencies, for example at VHF range or lower.

Although, at VHF and lower frequencies the multi-path phenomena (e.g., RF energy reflections), is less severe than at UHF and higher frequencies, the impact of the multi-path phenomena on location-finding accuracy makes location determination less reliable and precise than required by the industry. Accordingly, there is a need for a method and a system for mitigating the effects of the RF energy reflections (i.e., multi-path phenomena) in RF-based identification and location-finding systems that are employing narrow-band ranging signal(s).

As a rule, conventional RF-based identification and location-finding systems mitigating multipath by employing wide bandwidth ranging signals, e.g. exploiting wide-band signal nature for multi-path mitigation (see S. Salous, "Indoor and Outdoor UHF Measurements with a 90 MHz Bandwidth", IEEE Colloquium on Propagation Characteristics and Related System Techniques for Beyond Line-of-Sight Radio, 1997, pp. 8/1-8/6). Also, see Chen et al. patent US 2011/0124347 A1 whereby the locate accuracy vs. required PRS bandwidth is shown in Table 1. From this table for 10 meters accuracy 83 MHz of bandwidth is needed. In addition, spatial diversity and/or antenna diversity techniques are used in some cases.

However, the spatial diversity may not be an option in many tracking-location applications because it leads to an increase in required infrastructure. Similarly, the antenna diversity has a limited value, because at lower operating frequencies, for example VHF, the physical size of antenna subsystem becomes too large. The case in point is the U.S.

Pat. No. 6,788,199, where a system and method for locating objects, people, pets and personal articles is described.

The proposed system employs an antenna array to mitigate the multi-path. The optionally system operates at UHF in the 902-926 MHz band. It is well known that the linear dimension of the antenna is proportional to the wave length of an operating frequency. Also, the area of an antenna array is proportional to the square and volume to the cube of the linear dimensions ratio because in an antenna array the antennas are usually separated by ¼ or ½ wave length. Thus, at VHF and lower frequencies the size of the antenna array will significantly impact device portability.

On the other hand, because of a very limited frequency spectrum, the narrow bandwidth ranging signal does not lend itself into multi-path mitigation techniques that are currently used by conventional RF-based identification and location-finding systems. The reason is that the ranging signal distortion (i.e., change in the signal) that is induced by the multi-path is too small for reliable detection/processing in presence of noise. Also, because of limited bandwidth the narrow bandwidth receiver cannot differentiate between ranging signal Direct-Line-Of-Sight (DLOS) path and delayed ranging signal paths when these are separated by small delays, since the narrow bandwidth receiver lacks the required time resolution, which is proportional to the receiver's bandwidth (e.g., the narrow bandwidth has an integrating effect on the incoming signals).

Accordingly, there is a need in the art for a multi-path mitigation method and system for object identification and location-finding, which uses narrow bandwidth ranging signal(s) and operates in VHF or lower frequencies as well as UHF band frequencies and beyond.

The track and locate functionality need is primarily found in wireless networks. The multi-path mitigation methods and systems for object identification and location finding, described in U.S. Pat. No. 7,872,583, can be utilized in most of the available wireless networks. However, certain wireless networks have communications standards/systems that require integration of the techniques into the wireless networks to fully benefit from various ranging and positioning signals that are described in U.S. Pat. No. 7,872,583. Typically, these wireless systems can provide excellent data coverage over wide areas and most indoor environments. However, the position accuracy available with of these systems is limited by self-interference, multipath and non-line-of-sight propagation. As an example, the recent 3GPP Release 9 standardized positioning techniques for LTE (Long Term Evolution) standard has the following: 1) A-GNSS (Assisted Global Navigation Satellite System) or A-GPS (Assisted Global Positioning System) as the primary method; and 2) Enhanced Cell-ID (E-CID) and OTDOA (Observed Time Difference of Arrival), including DL-OTDOA (Downlink OTDOA), as fall-back methods. While these methods might satisfy the current mandatory FCC E911 emergency location requirements, the accuracy, reliability and availability of these location methods fall short of the needs of LBS (Location Based Services) or RTLS system users, who require highly accurate locating within buildings, shopping malls, urban corridors, etc. Moreover, the upcoming FCC 911 requirements are more stringent than the existing ones and with exception of A-GNSS (A-GPS) might be beyond the existing techniques/methods locate capabilities. It is well known that the A-GNSS (A-GPS) accuracy is very good in open spaces but is very unreliable in urban/indoor environments.

At the same time other techniques/methods accuracy is severely impacted by the effects of multipath and other radio wave propagation phenomena. Thus, making it impossible to meet the upcoming FCC 911 requirements and the LBS requirements. Listed below are in addition to the DL-OTDOA and E-CID locate techniques/methods. The U-TDOA concept is similar to the OTDOA, but uses Location Measurement Units (LMUs) installed at the cell towers to calculate a phone's position. It is (was) designed for the original 911 requirements. LMU's have only been deployed on 2G GSM networks and would require major hardware upgrades for 3G UMTS networks. U-TDOA has not been standardized for support in 4G LTE or WiMAX. Also, LMUs are not used in LTE deployments. Like other methods the U-TDOA accuracy suffers from the multipath. The LTE standardization groups might forgo the LMUs additional hardware and fashion the U-TDOA after the DL-OTDOA, e.g. UL-OTDOA. Note: DL-OTDOA is standardized in release 9.

Another contender for the upcoming FCC 911 requirements is the RF Fingerprinting method(s). This technology is based on the principle that every location has a unique radio frequency (RF) signature, like a fingerprint's pattern, a location can be identified by a unique set of values including measurements of neighbor cell signal strengths, etc. Fingerprinting does not require additional hardware. However, this technology suffers from the fact that it requires a large database and a long training phase. Also, unlike human fingerprints that are truly unique, because of RF propagation phenomena the RF signature repeats at multiple different locations. Furthermore, the database goes stale, e.g. signature ages quickly as the environment changes, including weather. This makes the task of maintaining the database burdensome. The number of hearable cell towers has significant impact on accuracy need to obtain readings from multitude (8 or more) towers to get a reasonable accuracy (60 meters, as claimed by Polaris wireless). Thus, in suburban environment the accuracy degrades to 100 meters (see Polaris Wireless Location technology overview, July 29; from Polaris Wireless). Also, there is significant variation (up to 140%) of estimated position with the handset antenna orientation (see Tsung-Han Lin, et al. Microscopic Examination of an RSSI-Signature-Based Indoor Localization System).

While there are several causes of the RF fingerprinting database instability one of the major ones is the multipath. Multipath is highly dynamic and can instantaneously change the RF signature. Specifically, in heavy multipath environment, like indoors people and elevators movements; furniture, cabinets, equipment places changes will result in a different multipath distribution, e.g. severely impact RF signature. Also, indoors and in similar environments a small change in physical location (in 3 dimensions) causes significant changes in the RF signature. This is result of combination of multipath, which makes RF signature 3 dimensional, and short wavelength that results in significant RF signature changes over distances of ¼ wave. Therefore, in such environments the number of points in the database would have to be exponentially increased.

There exist less accurate location methods, for example RTT, RTT+CID, including ones that are based on received signal strength. However, in latter case RF propagation phenomenon make the signal strength vary 30 dB to 40 dB over the distance of a wavelength which, in wireless networks, can be significantly less than a meter. This severely impacts the accuracy and/or the reliability of methods based on received signal strength. Again, all these methods accuracy is suffering from the multipath.

Accordingly, there is a need in the art for more accurate and reliable tracking and locating capability for wireless networks, which can be achieved through multipath mitigation technology.

Positioning reference signals (PRS) were added in the Release 9 of the LTE 3GPP and are meant to be used by the user equipment (UE) for OTDOA positioning (a type of multilateration). The TS 36.211 Release 9 Technical Specification is titled "Evolved Universal Terrestrial Radio Access (E-UTRA); Physical Channels and Modulation."

As noted, PRS can be used by the UE for the Downlink Observed Time Difference of Arrival (DL-OTDOA) positioning. The Release 9 specification also requires neighboring base stations (eNBs) to be synchronized. This removes the last obstacle for OTDOA methods. The PRS also improves UE hearability at the UE of multiple eNBs. It is to be noted that the Release 9 specification did not specify the eNB synchronization accuracy, with some proposals suggesting 100 ns. The UL-TDOA is currently in a study phase and it expected to be standardized in 2011.

The DL-OTDOA method, according to the Release 9 specification, is detailed in U.S. Patent Application Publication No. 2011/0124347 A1 to Chen et al., titled "Method and Apparatus for UE Positioning in LTE Networks." The Release 9 DL-OTDOA suffers from the multipath phenomena. Some multipath mitigation can be achieved by increased PRS signal bandwidth. However, this consequently results in increased scheduling complexity and longer times between UE positions fixes. In addition, for networks with limited operating bandwidth, such as 10 MHz, the best possible accuracy is about 100 meters, as illustrated in Table 1 of Chen et al. These numbers are the results in a best case scenario. In other cases, especially when the DLOS signal strength is significantly lower (10-20 dB) compared to the reflected signal(s) strength, it results in significantly larger (from two to four times) locate/ranging errors.

Chen et al. describe a variant of the UL-TDOA positioning that is also PRS based, referred to as Up Link Positioning Reference Signal (UL-PRS). Chen et al. proposes improved neighbor cells hearability and/or reduced scheduling complexity, yet Chen et al. do not teach anything that addresses mitigating multipath. As a result, the accuracy by Chen et al. is no better than the accuracy per Release 9 of the DL-OTDOA method accuracy.

According to Chen et al. the DL-OTDOA and the UL-TDOA methods are suitable for outdoor environments. Chen et al. further notes that DL-OTDOA and the UL-TDOA methods do not perform well in indoor environments, such as buildings, campuses, etc. Several reasons are noted by Chen et al. to explain the poor performance of these methods in indoor environments. For example, in Distributed Antenna Systems (DAS) that are commonly employed indoors, whereby each antenna does not have a unique ID.

According to Chen, the end result is that in both: the Release 9 and the cell towers based, like UL-TDOA Chen et al., systems, the UE equipment cannot differentiate between the multiple antennas. This phenomenon prevents the usage of the multilateration method, employed in the Release 9 and Chen UL-OTDOA systems. To solve this problem, Chen et al. adds hardware and new network signals to the existing indoors wireless network systems. Furthermore, in case of an active DAS the best accuracy (error lower bound) is limited to 50 meters. Finally, Chen et al. do not address the impact of multipath on the positioning accuracy in indoor environments, where it is most severe (compared to outdoor) and in many cases results in much larger (2×-4×) positioning errors than claimed.

The modifications taught by Chen et al. for indoor wireless networks antenna systems are not always possible because upgrading the existing systems would require a tremendous effort and high cost. Moreover, in case of an active DAS the best theoretical accuracy is only 50 meters, and in practice this accuracy would be significantly lower because of the RF propagation phenomena, including multipath At the same time, In a DAS system signals that are produced by multiple antennas will appear as reflections, e.g. multipath. Therefore, if all antennas locations are known, it is possible to provide a location fix in DAS environment without the additional hardware and/or new network signals if the signals paths from individual antennas can be resolved. For example, using multilateration and location consistency algorithms. Thus, there is a need in the art for an accurate and reliable multipath resolution for wireless networks.

SUMMARY

The present embodiment relates to a method and system for a Radio Frequency (RF)-based identification, tracking and locating of objects, including Real Time Locating Service (RTLS) that substantially obviates one or more of the disadvantages of the related art. The proposed (exemplary) method and system use a narrow bandwidth ranging locating signal(s). According to an embodiment, RF-based tracking and locating is implemented on VHF band, but could be also implemented on lower bands (HF, LF and VLF) as well as UHF band and higher frequencies. It employs multi-path mitigation method including techniques and algorithms. The proposed system can use software implemented digital signal processing and software defined radio technologies. Digital signal processing can be used as well.

The system of the embodiment can be constructed using standard FPGAs and standard signal processing hardware and software at a very small incremental cost to the device and overall system. At the same time the accuracy of the RF-based identification and location-finding systems that are employing narrow-band ranging signal/s can be significantly improved.

The transmitters and receivers for narrow bandwidth ranging/locating signal, for example VHF, are used to identify a location of a person or an object. Digital signal processing (DSP) and software defined radio (SDR) technologies can be used to generate, receive and process a narrow bandwidth ranging signal(s) as well as perform multi-path mitigation algorithms. The narrow bandwidth ranging signal is used to identify, locate and track a person or an object in a half-duplex, full duplex or simplex mode of operation. The Digital signal processing (DSP) and software defined radio (SDR) technologies are used in the multi-path mitigation processor to implement multi-path mitigation algorithms.

The approach described herein employs a multi-path mitigation processor and multi-path mitigation techniques/algorithms described in U.S. Pat. No. 7,872,583 that increase the accuracy of tracking and locating system implemented by a wireless network. The present embodiment can be used in all wireless systems/networks and include simplex, half-duplex and full duplex modes of operation. The embodiment described below operates with wireless networks that employ various modulation types, including OFDM modulation and/or its derivatives. Thus, the embodiment described below operates with LTE networks and it is also applicable to other wireless systems/networks.

The approach described herein is based on the network's one or more reference/pilot signal(s) and/or synchronization signals and is also applicable to other wireless networks, including WiMax, WiFi, and White Space. Other wireless networks that do not use reference and/or pilot/synchronization signals may employ one or more of the following types of alternate embodiments as described in U.S. Pat. No. 7,872,583: 1) where a portion of frame is dedicated to the ranging signal/ranging signal elements as described in U.S. Pat. No. 7,872,583; 2) where the ranging signal elements (see U.S. Pat. No. 7,872,583) are embedded into transmit/receive signals frame(s); and 3) where the ranging signal elements (described in U.S. Pat. No. 7,872,583) are embedded with the data.

These alternate embodiments employ multi-path mitigation processor and multi-path mitigation techniques/algorithms described in U.S. Pat. No. 7,872,583 and can be used in all modes of operation: simplex, half-duplex and full duplex.

The integration of multi-path mitigation processor and multi-path mitigation techniques/algorithms described in U.S. Pat. No. 7,872,583 with OFDM based wireless networks, and other wireless networks with reference/pilot signals and/or synchronization signals, can be done with little or no incremental cost to the device and overall system. At the same time the location accuracy of the network and system will be significantly improved. As described in the embodiment, RF-based tracking and locating is implemented on 3GPP LTE cellular networks will significantly benefit from the localization of multi-path mitigation method/techniques and algorithms that are described in U.S. Pat. No. 7,872,583. The proposed system can use software- or hardware-implemented digital signal processing.

Additional features and advantages of the embodiments will be set forth in the description that follows, and in part will be apparent from the description, or may be learned by practice of the embodiments. The advantages of the embodiments will be realized and attained by the structure particularly pointed out in the written description and claims hereof as well as the appended drawings.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings:

FIG. 1 and FIG. 1A illustrate narrow bandwidth ranging signal frequency components, in accordance with the embodiment;

DETAILED DESCRIPTION OF ILLUSTRATIVE EMBODIMENTS

Figure 1:
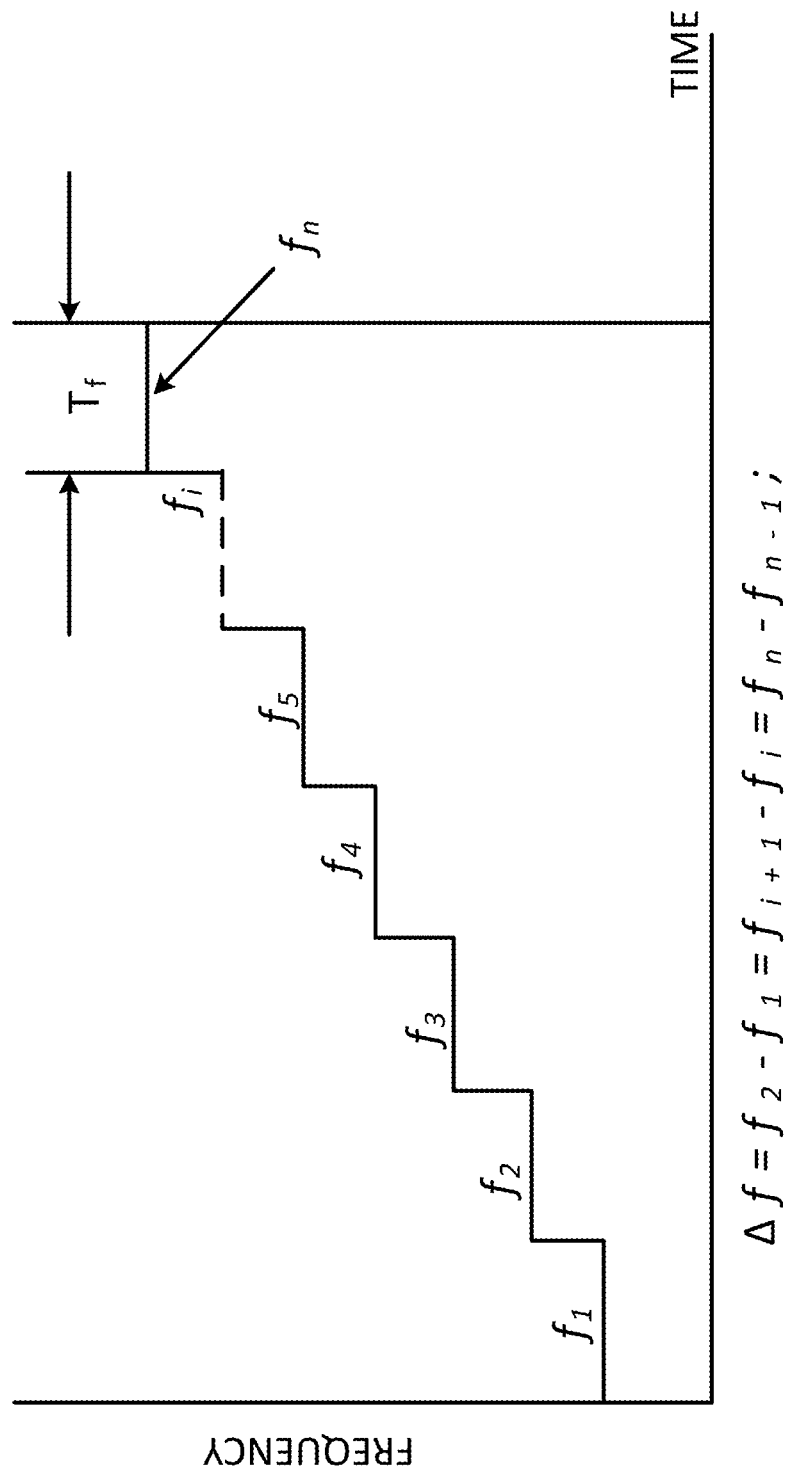

Reference will now be made in detail to the preferred embodiments of the present embodiments, examples of which are illustrated in the accompanying drawings.

The present embodiments relate to a method and system for RF-based identification, tracking and locating of objects, including RTLS. According to an embodiment, the method and system employs a narrow bandwidth ranging signal. The embodiment operates in VHF band, but can be also used in HF, LF and VLF bands as well as UHF band and higher frequencies. It employs multi-path mitigation processor. Employing multi-path mitigation processor increases the accuracy of tracking and locating implemented by a system.

The embodiment includes small, highly portable base units that allow users to track, locate and monitor multiple persons and objects. Each unit has its own ID. Each unit broadcasts an RF signal with its ID, and each unit is able to send back a return signal, which can include its ID as well as voice, data and additional information. Each unit processes the returned signals from the other units and, depending on the triangulation or trilateration and/or other methods used, continuously determines their relative and/or actual locations. The preferred embodiment can also be easily integrated with products such as GPS devices, smart phones, two-way radios and PDAs. The resulting product will have all of the functions of the stand-alone devices while leveraging the existing display, sensors (such as altimeters, GPS, accelerometers and compasses) and processing capacity of its host. For example, a GPS device with the device technology describe herein will be able to provide the user's location on a map as well as to map the locations of the other members of the group.

The size of the preferred embodiment based on an FPGA implementation is between approximately 2×4×1 inches and 2×2×0.5 inches, or smaller, as integrated circuit technology improves. Depending on the frequency used, the antenna will be either integrated into the device or protrude through the device enclosure. An ASIC (Application Specific Integrated Circuit) based version of the device will be able to incorporate the functions of the FPGA and most of the other electronic components in the unit or Tag. The ASIC-based stand-alone version of the product will result in the device size of 1×0.5×0.5 inches or smaller. The antenna size will be determined by the frequency used and part of the antenna can be integrated into the enclosure. The ASIC based embodiment is designed to be integrated into products can consist of nothing more than a chipset. There should not be any substantial physical size difference between the Master or Tag units.

The devices can use standard system components (off-the-shelf components) operating at multiple frequency ranges (bands) for processing of multi-path mitigation algorithms. The software for digital signal processing and software-defined radio can be used. The signal processing software combined with minimal hardware, allows assembling the radios that have transmitted and received waveforms defined by the software.

U.S. Pat. No. 7,561,048 discloses a narrow-bandwidth ranging signal system, whereby the narrow-bandwidth ranging signal is designed to fit into a low-bandwidth channel, for example using voice channels that are only several kilohertz wide (though some of low-bandwidth channels may extend into a few tens of kilohertz). This is in contrast to conventional location-finding systems that use channels from hundreds of kilohertz to tens of megahertz wide.

The advantage of this narrow-bandwidth ranging signal system is as follows: 1) at lower operating frequencies/bands, conventional location-finding systems ranging signal bandwidth exceeds the carrier (operating) frequency value. Thus, such systems cannot be deployed at LF/VLF and other lower frequencies bands, including HF. Unlike conventional location-finding systems, the narrow-bandwidth ranging signal system described in U.S. Pat. No. 7,561,048 can be successfully deployed on LF, VLF and other bands because its ranging signal bandwidth is far below the carrier frequency value; 2) at lower end of RF spectrum (some VLF, LF, HF and VHF bands), e.g., up to UHF band, conventional location-finding systems cannot be used because the FCC severely limits the allowable channel bandwidth (12-25 kHz), which makes it impossible to use conventional ranging signals. Unlike conventional location-finding systems, the narrow-bandwidth ranging signal system's ranging signal bandwidth is fully compliant with FCC regulations and other international spectrum regulatory bodies; and 3) it is well known (see MM: the basics, by Ray H. Hashemi, William G. Bradley . . . -2003) that independently of operating frequency/band, a narrow-bandwidth signal has inherently higher SNR (Signal-to-Noise-Ratio) as compared to a wide-bandwidth signal. This increases the operating range of the narrow-bandwidth ranging signal location-finding system independently of the frequency/band it operates, including UHF band.

Thus, unlike conventional location-finding systems, the narrow-bandwidth ranging signal location-finding system can be deployed on lower end of the RF spectrum for example VHF and lower frequencies bands, down to LF/VLF bands, where the multipath phenomena is less pronounced. At the same time, the narrow-bandwidth ranging location-finding system can be also deployed on UHF band and beyond, improving the ranging signal SNR and, as a result, increasing the location-finding system operating range.

To minimize multipath, e.g., RF energy reflections, it is desirable to operate on VLF/LF bands. However, at these frequencies the efficiency of a portable/mobile antenna is very small (about 0.1% or less because of small antenna length (size) relative to the RF wave length). In addition, at these low frequencies the noise level from natural and manmade sources is much higher than on higher frequencies/bands, for example VHF. Together, these two phenomena may limit the applicability of location-finding system, e.g. its operating range and/or mobility/portability. Therefore, for certain applications where operating range and/or mobility/portability are very important a higher RF frequencies/bands may be used, for example HF, VHF, UHF and UWB.

At VHF and UHF bands, the noise level from natural and manmade sources is significantly lower compared to VLF, LF and HF bands; and at VHF and HF frequencies the multi-path phenomena (e.g., RF energy reflections) is less severe than at UHF and higher frequencies. Also, at VHF, the antenna efficiency is significantly better, than on HF and lower frequencies, and at VHF the RF penetration capabilities are much better than at UHF. Thus, the VHF band provides a good compromise for mobile/portable applications. On the other hand in some special cases, for example GPS where VHF frequencies (or lower frequencies) cannot penetrate the ionosphere (or get deflected/refracted), the UHF can be a good choice. However, in any case (and all cases/applications) the narrow-bandwidth ranging signal system will have advantages over the conventional wide-bandwidth ranging signal location-finding systems.

The actual application(s) will determine the exact technical specifications (such as power, emissions, bandwidth and operating frequencies/band). Narrow bandwidth ranging allows the user to either receive licenses or receive exemption from licenses, or use unlicensed bands as set forth in the FCC because narrow band ranging allows for operation on many different bandwidths/frequencies, including the most stringent narrow bandwidths: 6.25 kHz, 11.25 kHz, 12.5 kHz, 25 kHz and 50 kHz set forth in the FCC and comply with the corresponding technical requirements for the appropriate sections. As a result, multiple FCC sections and exemptions within such sections will be applicable. The primary FCC Regulations that are applicable are: 47 CFR Part 90—Private Land Mobile Radio Services, 47 CFR Part 94 personal Radio Services, 47 CFR Part 15—Radio Frequency Devices. (By comparison, a wideband signal in this context is from several hundred KHz up to 10-20 MHz.)

Typically, for Part 90 and Part 94, VHF implementations allow the user to operate the device up to 100 mW under certain exemptions (Low Power Radio Service being an example). For certain applications the allowable transmitted power at VHF band is between 2 and 5 Watts. For 900 MHz (UHF band) it is 1 W. On 160 kHz 190 kHz frequencies (LF band) the allowable transmitted power is 1 Watt.

Narrow band ranging can comply with many if not all of the different spectrum allowances and allows for accurate ranging while still complying with the most stringent regulatory requirements. This holds true not just for the FCC, but for other international organizations that regulate the use of spectrum throughout the world, including Europe, Japan and Korea.

The following is a list of the common frequencies used, with typical power usage and the distance the tag can communicate with another reader in a real world environment (see Indoor Propagation and Wavelength Dan Dobkin, WJ Communications, V 1.4 7/10/02):

| | | |
|---|---|---|
| 915 MHz | 100 mW | 150 feet |
| 2.4 GHz | 100 mW | 100 feet |
| 5.6 Ghz | 100 mW | 75 feet |

The proposed system works at VHF frequencies and employs a proprietary method for sending and processing the RF signals. More specifically, it uses DSP techniques and software-defined radio (SDR) to overcome the limitations of the narrow bandwidth requirements at VHF frequencies.

Operating at lower (VHF) frequencies reduces scatter and provides much better wall penetration. The net result is a roughly ten-fold increase in range over commonly used frequencies. Compare, for example, the measured range of a prototype to that of the RFID technologies listed above:

| 216 MHz | 100 mw | 700 feet |
|---|---|---|

Utilizing narrow band ranging techniques, the range of commonly used frequencies, with typical power usage and the distance the tag communication range will be able to communicate with another reader in a real world environment would increase significantly:

|  |  | From: | To: |
|---|---|---|---|
| 915 MHz | 100 mW | 150 feet | 500 feet |
| 2.4 GHz | 100 mW | 100 feet | 450 feet |
| 5.6 Ghz | 100 mW | 75 feet | 400 feet |

Battery consumption is a function of design, transmitted power and the duty cycle of the device, e.g., the time interval between two consecutive distance (location) measurements. In many applications the duty cycle is large, 10× to 1000×. In applications with large duty cycle, for example 100×, an FPGA version that transmits 100 mW of power will have an up time of approximately three weeks. An ASIC based version is expected to increase the up time by 10×. Also, ASICs have inherently lower noise level. Thus, the ASIC-based version may also increase the operating range by about 40%.

Those skilled in the art will appreciate that the embodiment does not compromise the system long operating range while significantly increases the location-finding accuracy in RF challenging environments (such as, for example, buildings, urban corridors, etc.)

Typically, tracking and location systems employ Track-Locate-Navigate methods. These methods include Time-Of-Arrival (TOA), Differential-Time-Of-Arrival (DTOA) and combination of TOA and DTOA. Time-Of-Arrival (TOA) as the distance measurement technique is generally described in U.S. Pat. No. 5,525,967. A TOA/DTOA-based system measures the RF ranging signal Direct-Line-Of-Site (DLOS) time-of-flight, e.g., time-delay, which is then converted to a distance range.

In case of RF reflections (e.g., multi-path), multiple copies of the RF ranging signal with various delay times are superimposed onto the DLOS RF ranging signal. A track-locate system that uses a narrow bandwidth ranging signal cannot differentiate between the DLOS signal and reflected signals without multi-path mitigation. As a result, these reflected signals induce an error in the estimated ranging signal DLOS time-of-flight, which, in turn, impacts the range estimating accuracy.

The embodiment advantageously uses the multi-path mitigation processor to separate the DLOS signal and reflected signals. Thus, the embodiment significantly lowers the error in the estimated ranging signal DLOS time-of-flight. The proposed multi-path mitigation method can be used on all RF bands. It can also be used with wide bandwidth ranging signal location-finding systems. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (like.g., Viterbi Algorithm), minimal variance estimation (Kalman Filter), etc.

The embodiment can be used in systems with simplex, half-duplex and full duplex modes of operation. Full-duplex operation is very demanding in terms of complexity, cost and logistics on the RF transceiver, which limits the system operating range in portable/mobile device implementations. In half-duplex mode of operation the reader (often referred to as the "master") and the tags (sometimes also referred to as "slaves" or "targets") are controlled by a protocol that only allows the master or the slave to transmit at any given time.

The alternation of sending and receiving allows a single frequency to be used in distance measurement. Such an arrangement reduces the costs and complexity of the system in comparison with full duplex systems. The simplex mode of operation is conceptually simpler, but requires a more rigorous synchronization of events between master and target unit(s), including the start of the ranging signal sequence.

In present embodiments the narrow bandwidth ranging signal multi-path mitigation processor does not increase the ranging signal bandwidth. It uses different frequency components, advantageously, to allow propagation of a narrow bandwidth ranging signal. Further ranging signal processing can be carried out in the frequency domain by way of employing super resolution spectrum estimation algorithms (MUSIC, rootMUSIC, ESPRIT) and/or statistical algorithms like RELAX, or in time-domain by assembling a synthetic ranging signal with a relatively large bandwidth and applying a further processing to this signal. The different frequency component of narrow bandwidth ranging signal can be pseudo randomly selected, it can also be contiguous or spaced apart in frequency, and it can have uniform and/or non-uniform spacing in frequency.

The embodiment expands multipath mitigation technology. The signal model for the narrowband ranging is a complex exponential (as introduced elsewhere in this document) whose frequency is directly proportional to the delay defined by the range plus similar terms whose delay is defined by the time delay related to the multipath. The model is independent of the actual implementation of the signal structure, e.g., stepped frequency, Linear Frequency Modulation, etc.

The frequency separation between the direct path and multipath is nominally extremely small and normal frequency domain processing is not sufficient to estimate the direct path range. For example a stepped frequency ranging signal at a 100 KHz stepping rate over 5 MHz at a range of 30 meters (100.07 nanoseconds delay) results in a frequency of 0.062875 radians/sec. A multipath reflection with a path length of 35 meters would result in a frequency of 0.073355. The separation is 0.0104792. Frequency resolution of the 50 sample observable has a native frequency resolution of 0.12566 Hz. Consequently it is not possible to use conventional frequency estimation techniques for the separation of the direct path from the reflected path and accurately estimate the direct path range.

To overcome this limitation the embodiments use a unique combination of implementations of subspace decomposition high resolution spectral estimation methodologies and multimodal cluster analysis. The subspace decomposition technology relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The super resolution spectrum estimation algorithms and RELAX algorithm are capable of distinguishing closely placed frequencies (sinusoids) in spectrum in presence of noise. The frequencies do not have to be harmonically related and, unlike the Digital Fourier Transform (DFT), the signal model does not introduce any artificial periodicity. For a given bandwidth, these algorithms provide significantly higher resolution than Fourier Transform. Thus, the Direct Line Of Sight (DLOS) can be reliably distinguished from other multi-paths (MP) with high accuracy. Similarly, applying the thresholded method, which will be explained later, to the artificially produced synthetic wider bandwidth ranging signal makes it possible to reliably distinguish DLOS from other paths with high accuracy.

In accordance with the embodiment, the Digital signal processing (DSP), can be employed by the multi-path mitigation processor to reliably distinguish the DLOS from other MP paths. A variety of super-resolution algorithms/techniques exist in the spectral analysis (spectrum estimation) technology. Examples include subspace based methods: MUltiple SIgnal Characterization (MUSIC) algorithm or root-MUSIC algorithm, Estimation of Signal Parameters via Rotational Invariance Techniques (ESPRIT) algorithm, Pisarenko Harmonic Decomposition (PHD) algorithm, RELAX algorithm, etc.

In all of the abovementioned super-resolution algorithms the incoming (i.e., received) signal is modeled as a linear combination of complex exponentials and their complex amplitudes of frequencies. In case of a multi-path, the received signal will be as follows:

$$r(t) = \beta \times e^{i2\pi f \times t} \sum_{k=0}^{k=L-1} \alpha_k \times e^{-i2\pi f \times \tau_K}, \quad (1)$$

where $\beta \times e^{i2\pi f \times t}$ is the transmitted signal, f is the operating frequency, L is the number of multi-path components, and $\alpha_K = |\alpha_K| \times e^{j\theta_K}$ and $\tau_K$ are the complex attenuation and propagation delay of the K-th path, respectively. The multi-path components are indexed so that the propagation delays are considered in ascending order. As a result, in this model $\tau_0$ denotes the propagation delay of the DLOS path. Obviously, the $\tau_0$ value is of the most interest, as it is the smallest value of all $\tau_K$. The phase $\theta_K$ is normally assumed random from one measurement cycle to another with a uniform probability density function U(0,2π). Thus, we assume that $\alpha_K$=const (i.e., constant value)

Parameters $\alpha_K$ and $\tau_K$ are random time-variant functions reflecting motions of people and equipment in and around buildings. However, since the rate of their variations is very slow as compared to the measurement time interval, these parameters can be treated as time-invariant random variables within a given measurement cycle.

All parameters are frequency-dependent since they are related to radio signal characteristics, such as, transmission and reflection coefficients. However, in the embodiment, the operating frequency changes very little. Thus, the abovementioned parameters can be assumed frequency-independent.

Equation (1) can be presented in frequency domain as:

$$A(f) = \sum_{k=0}^{k=L-1} \alpha_k \times e^{-i(2\pi \times \tau_K)f}, \quad (2)$$

where: A(f) is complex amplitude of the received signal, $(2\pi \times \tau_K)$ are the artificial "frequencies" to be estimated by a super-resolution algorithm and the operating frequency f is the independent variable; $\alpha_K$ is the K-th path amplitude.

In the equation (2) the super-resolution estimation of ($2\pi \times \tau_K$) and subsequently $\tau_K$ values are based on continuous frequency. In practice, there is a finite number of measurements. Thus, the variable f will not be a continuous variable, but rather a discrete one. Accordingly, the complex amplitude A(f) can be calculated as follows:

$$\hat{A}(f_n) = \sum_{k=0}^{k=L-1} \alpha_k \times e^{-i(2\pi \times \tau_k) \times f_n}, \quad (3)$$

where $\hat{A}(f_n)$ are discrete complex amplitude estimates (i.e., measurements) at discrete frequencies $f_n$.

In equation (3) $\hat{A}(f_n)$ can be interpreted as an amplitude and a phase of a sinusoidal signal of frequency $f_n$ after it propagates through the multi-path channel. Note that all spectrum estimation based super-resolution algorithms require complex input data (i.e. complex amplitude).

In some cases, it is possible to convert real signal data, e.g. Re($\hat{A}(f_n)$), into a complex signal (e.g., analytical signal). For example, such a conversion can be accomplished by using Hilbert transformation or other methods. However, in case of short distances the value $\tau_0$ is very small, which results in very low ($2\pi \times \tau_K$) "frequencies".

These low "frequencies" create problems with Hilbert transform (or other methods) implementations. In addition, if only amplitude values (e.g., Re($\hat{A}(f_n)$)) are to be used, then the number of frequencies to be estimated will include not only the ($2\pi \times \tau_K$) "frequencies", but also theirs combinations. As a rule, increasing the number of unknown frequencies impacts the accuracy of the super-resolution algorithms. Thus, reliable and accurate separation of DLOS path from other multi-path (MP) paths requires complex amplitude estimation.

The following is a description of a method and the multi-path mitigation processor operation during the task of obtaining complex amplitude $\hat{A}(f_n)$ in presence of multi-path. Note that, while the description is focused on the half-duplex mode of operation, it can be easily extended for the full-duplex mode. The simplex mode of operation is a subset of the half-duplex mode, but would require additional events synchronization.

In half-duplex mode of operation the reader (often referred to as the "master") and the tags (also referred to as "slaves" or "targets") are controlled by a protocol that only allows the master or the slave to transmit at any given time. In this mode of operation the tags (target devices) serve as Transponders. The tags receive the ranging signal from a reader (master device), store it in the memory and then, after certain time (delay), re-transmit the signal back to the master.

An example of ranging signal is shown in FIG. 1 and FIG. 1A. The exemplary ranging signal employs different frequency components that are contiguous. Other waveforms, including pseudo random, spaced in frequency and/or time or orthogonal, etc. can be also used for as long as the ranging signal bandwidth remains narrow. In FIG. 1 the time duration $T_f$ for every frequency component is long enough to obtain the ranging signal narrow-bandwidth property.

Figure 2:
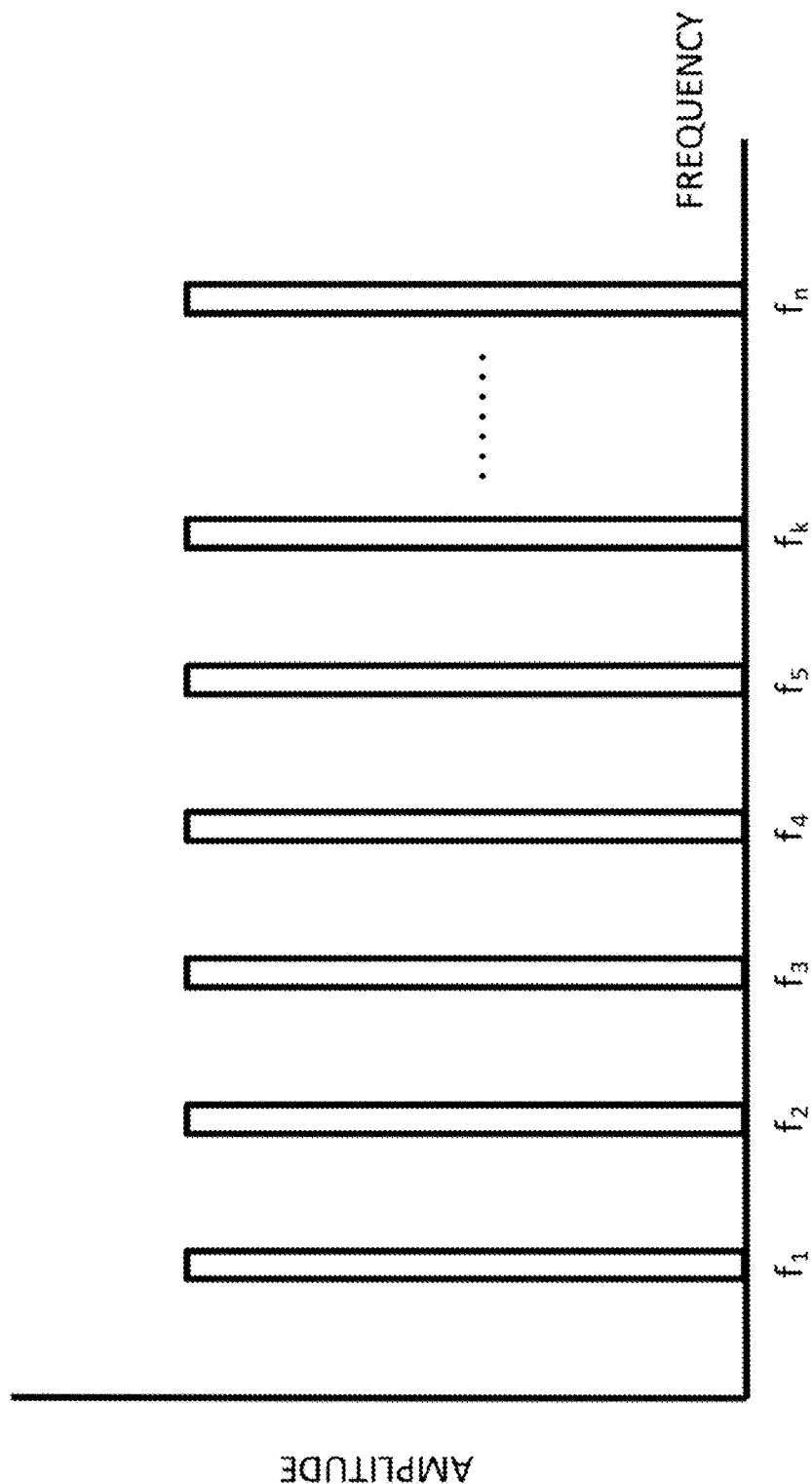
FIG. 2 illustrates exemplary wide bandwidth ranging signal frequency components.

Another variation of a ranging signal with different frequency components is shown on FIG. 2. It includes multiple frequencies ($f_1$, $f_2$, $f_3$, $f_4$, $f_n$) transmitted over long period of time to make individual frequencies narrow-band. Such signal is more efficient, but it occupies in a wide bandwidth and a wide bandwidth ranging signal impacts the SNR, which, in turn, reduces the operating range. Also, such wide bandwidth ranging signal will violate FCC requirements on the VHF band or lower frequencies bands. However, in certain applications this wide-bandwidth ranging signal allows an easier integration into existing signal and transmission protocols. Also, such a signal decreases the track-locate time.

These multiple-frequency ($f_1$, $f_2$, $f_3$, $f_4$, $f_n$) bursts may be also contiguous and/or pseudo random, spaced in frequency and/or time or orthogonal, etc.

The narrowband ranging mode will produce the accuracy in the form of instantaneous wide band ranging while increasing the range at which this accuracy can be realized, compared to wide band ranging. This performance is achieved because at a fixed transmit power, the SNR (in the appropriate signal bandwidths) at the receiver of the narrow band ranging signal is greater than the SNR at the receiver of a wideband ranging signal. The SNR gain is on the order of the ratio of the total bandwidth of the wideband ranging signal and the bandwidth of each channel of the narrow band ranging signal. This provides a good trade-off when very rapid ranging is not required, e.g., for stationary and slow-moving targets, such as a person walking or running.

Master devices and Tag devices are identical and can operate either in Master or Transponder mode. All devices include data/remote control communication channels. The devices can exchange the information and master device(s) can remotely control tag devices. In this example depicted in FIG. 1 during an operation of a master (i.e., reader) multi-path mitigation processor originates the ranging signal to tag(s) and, after a certain delay, the master/reader receives the repeated ranging signal from the tag(s).

Thereafter, master's multi-path mitigation processor compares the received ranging signal with the one that was originally sent from the master and determines the $\hat{A}(f_n)$ estimates in form of an amplitude and a phase for every frequency component $f_n$. Note that in the equation (3) $\hat{A}(f_n)$ is defined for one-way ranging signal trip. In the embodiment the ranging signal makes a round-trip. In other words, it travels both ways: from a master/reader to a target/slave and from the target/slave back to the master/reader. Thus, this round-trip signal complex amplitude, which is received back by the master, can be calculated as follows:

$$|\hat{A}_{RT}(f_n)|=|\hat{A}(f_n)|^2 \text{ and } \angle \hat{A}_{RT}(f_n)=2\times(\angle \hat{A}(f_n)) \qquad (4)$$

There are many techniques available for estimating the complex amplitude and phase values, including, for example, matching filtering $|\hat{A}(f_n)|$ and $\angle \hat{A}(f_n)$. According to the embodiment, a complex amplitude determination is based on $|\hat{A}(f_n)|$ values derived from the master and/or tag receiver RSSI (Received Signal Strength Indicator) values. The phase values $\angle \hat{A}_{RT}(f_n)$ are obtained by comparing the received by a reader/master returned base-band ranging signal phase and the original (i.e., sent by reader/master) base band ranging signal phase. In addition, because master and tag devices have independent clock systems a detailed explanation of devices operation is augmented by analysis of the clock accuracy impact on the phase estimation error. As the above description shows, the one-way amplitude $|\hat{A}(f_n)|$ values are directly obtainable from target/slave device. However, the one-way phase $\angle \hat{A}(f_n)$ values cannot be measured directly.

In the embodiment, the ranging base band signal is the same as the one depicted in FIG. 1. However, for the sake of simplicity, it is assumed herein that the ranging base band signal consists of only two frequency components each containing multiple periods of cosine or sine waves of different frequency: $F_1$ and $F_2$. Note that $F_1=f_1$ and $F_2=f_2$. The number of periods in a first frequency component is L and the number of periods in a second frequency component is P. Note that L may or may not be equal to P, because for $T_f$=constant each frequency component can have different number of periods. Also, there is no time gap between each frequency component, and both $F_1$ and $F_2$ start from the initial phase equal to zero.

Figure 3A:
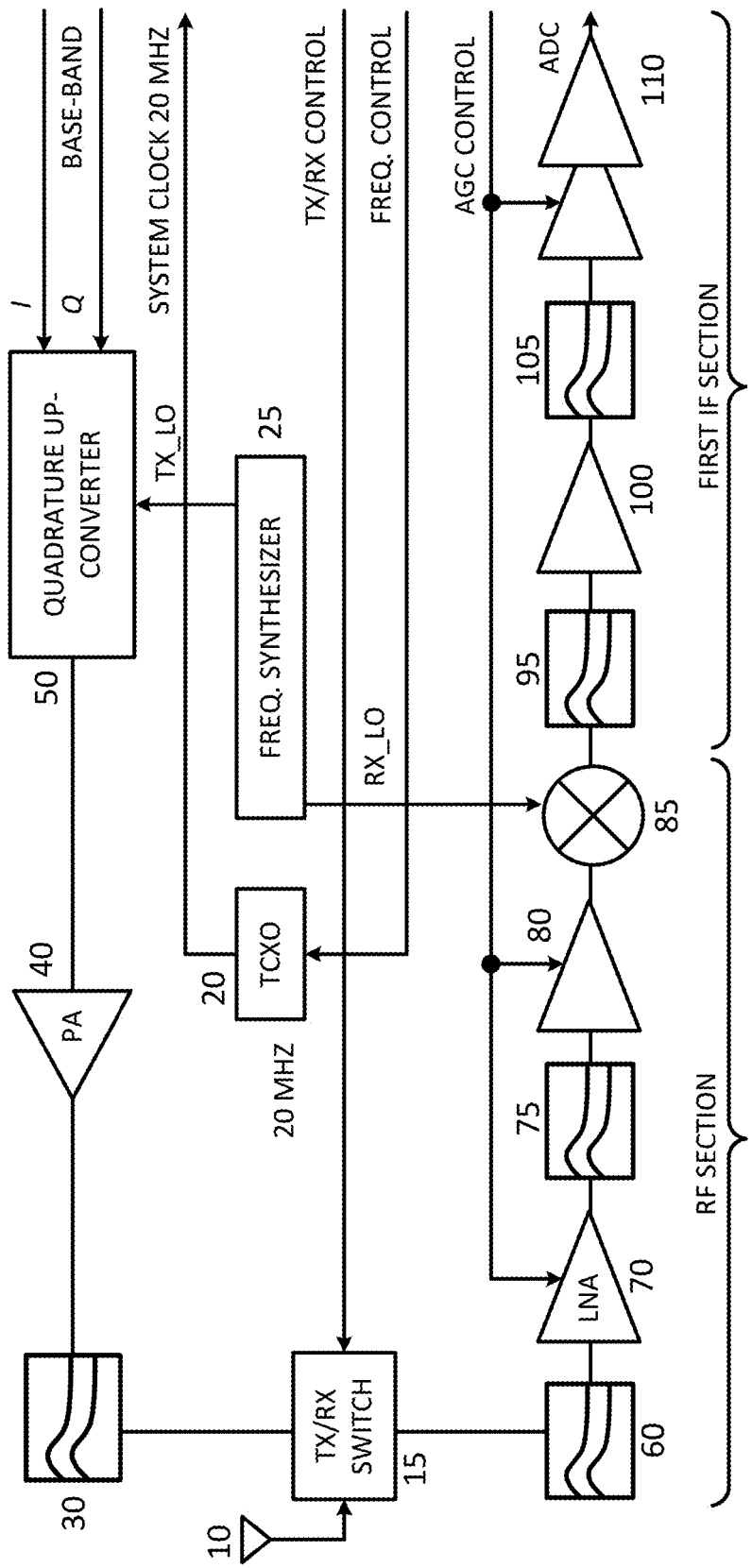
FIG. 3A, FIG. 3B and FIG. 3C illustrate block diagrams of master and slave units of an RF mobile tracking and locating system, in accordance with the embodiment.
Figure 3B:
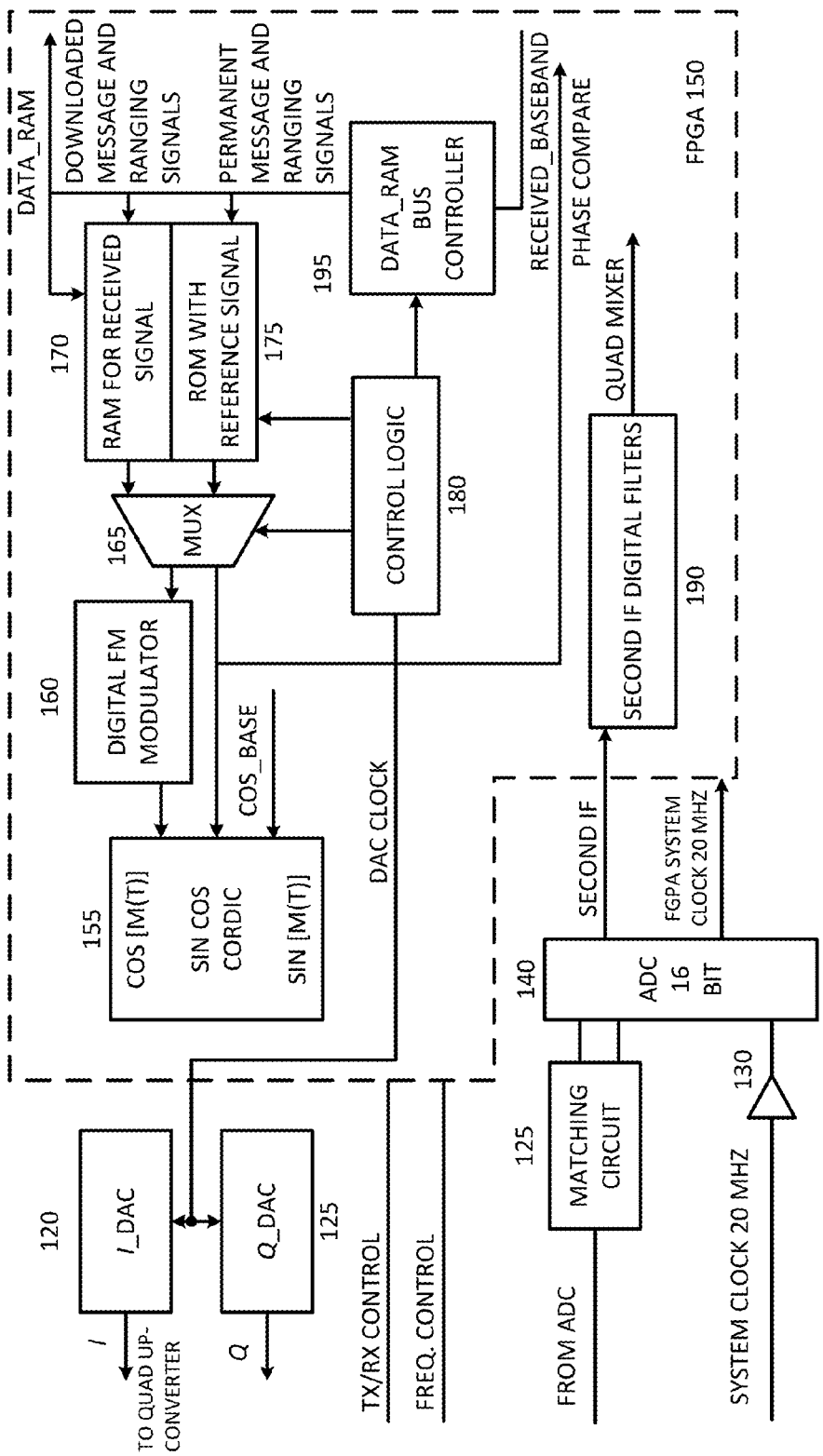
Figure 3C:
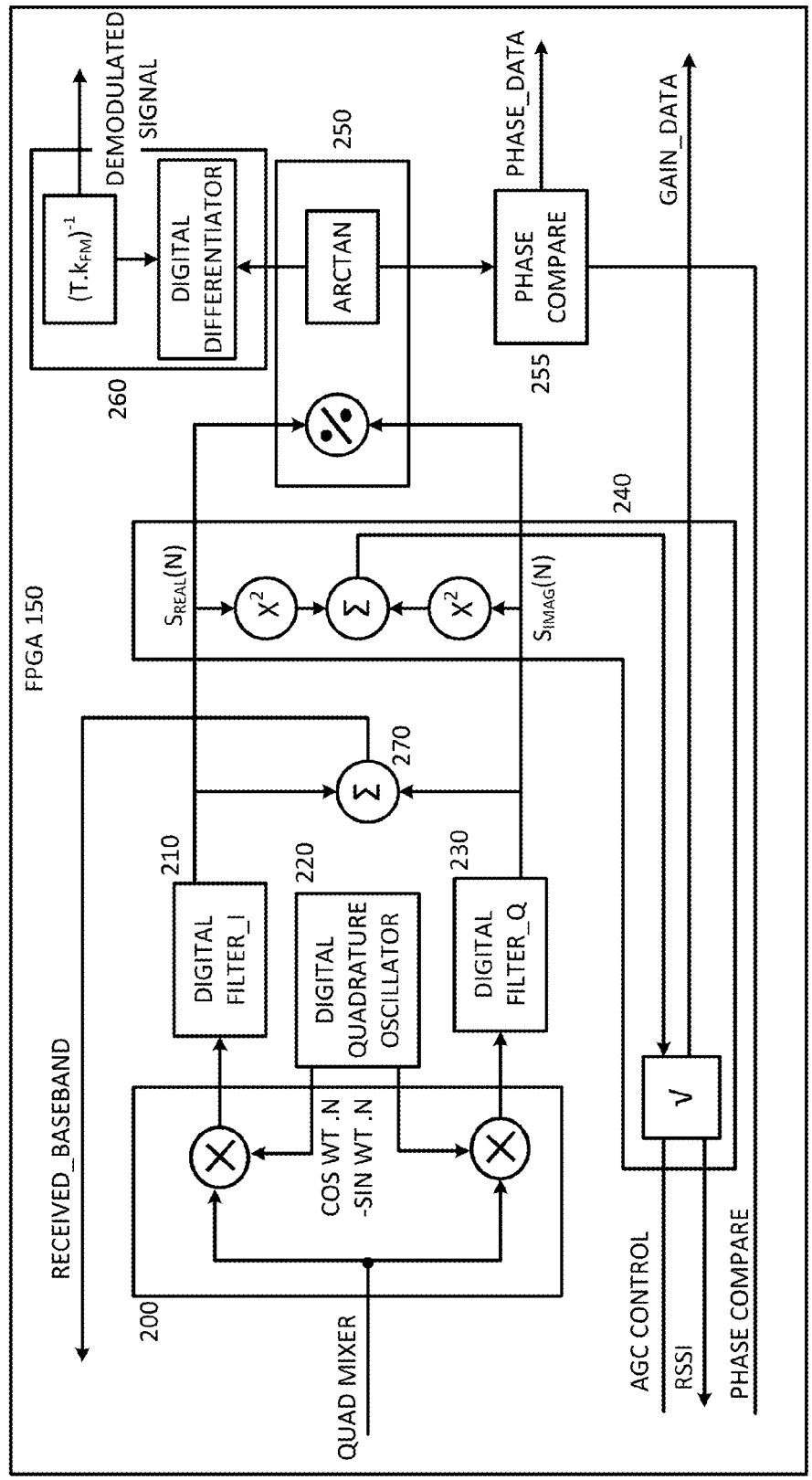

FIGS. 3A, 3B and 3C depict block diagrams of a master or a slave unit (tag) of an RF mobile tracking and locating system. $F_{OSC}$ refers to the frequency of the device system clock (crystal oscillator 20 in FIG. 3A). All frequencies generated within the device are generated from this system clock crystal oscillator. The following definitions are used: M is a master device (unit); AM is a tag (target) device (unit). The tag device is operating in the transponder mode and is referred to as transponder (AM) unit.

In the preferred embodiment the device consists of the RF front-end and the RF back-end, base-band and the multi-path mitigation processor. The RF back-end, base-band and the multi-path mitigation processor are implemented in the FPGA 150 (see FIGS. 3B and 3C). The system clock generator 20 (see FIG. 3A) oscillates at: $F_{OSC}$=20 MHz; or $\omega_{OSC}$=2π×20×10$^6$. This is an ideal frequency because in actual devices the system clocks frequencies are not always equal to 20 MHz: $F_{OSC}^M=F_{OSC}\gamma^M$; $F_{OSC}^{AM}=F_{OSC}\gamma^{AM}$.

Note that $$\gamma^M = \frac{F_{OSC}^M}{F_{OSC}}, \gamma^{AM} = \frac{F_{OSC}^{AM}}{F_{OSC}}; \text{ and } \beta^M = \frac{1}{\gamma^M}, \beta^{AM} = \frac{1}{\gamma^{AM}}$$

It should be noted that other than 20 MHz $F_{OSC}$ frequencies can be used without any impact on system performance.

Both units' (master and tag) electronic makeup is identical and the different modes of operations are software programmable. The base band ranging signal is generated in digital format by the master' FPGA 150, blocks 155-180 (see FIG. 2B). It consists of two frequency components each containing multiple periods of cosine or sine waves of different frequency. At the beginning, t=0, the FPGA 150 in a master device (FIG. 3B) outputs the digital base-band ranging signal to its up-converter 50 via FQ DACs 120 and 125. The FPGA 150 starts with $F_1$ frequency and after time $T_1$ start generating $F_2$ frequency for time duration of $T_2$.

Since crystal oscillator's frequency might differ from 20 MHz the actual frequencies generated by the FPGA will be $F_1\gamma^M$ and $F_2\gamma^M$. Also, time $T_1$ will be $T_1\beta^M$ and $T_2$ will be $T_2\beta^M$. IT is also assumed that $T_1$, $T_2$, $F_1$, $F_2$ are such that $F_1\gamma^M*T_1\beta^M=F_1T_1$ and $F_2\gamma^M*T_2\beta^M=F_2T_2$, where both $F_1T_1$ & $F_2T_2$ are integer numbers. That means that the initial phases of $F_1$ and $F_2$ are equal to zero.

Since all frequencies are generated from the system crystal oscillator 20 clocks, the master' base-band I/Q DAC(s) 120 and 125 outputs are as follows: $F_1 = \gamma^M 20 \times 10^6 \times K_{F_1}$ and $F_2 = \gamma^M 20 \times 10^6 \times K_{F_2}$, where $K_{F_1}$ and $K_{F_2}$ are constant coefficients. Similarly, the output frequencies TX_LO and RX_LO from frequency synthesizer 25 (LO signals for mixers 50 and 85) can be expressed through constant coefficients. These constant coefficients are the same for the master (M) and the transponder (AM)—the difference is in the system crystal oscillator 20 clock frequency of each device.

The master (M) and the transponder (AM) work in a half-duplex mode. Master's RF front-end up-converts the base-band ranging signal, generated by the multi-path mitigation processor, using quadrature up-converter (i.e., mixer) 50 and transmits this up-converted signal. After the base-band signal is transmitted the master switches from TX to RX mode using RF Front-end TX/RX Switch 15. The transponder receives and down-converts the received signal back using its RF Front-end mixer 85 (producing First IF) and ADC 140 (producing Second IF).

Thereafter, this second IF signal is digitally filtered in the Transponder RF back-end processor using digital filters 190 and further down-converted to the base-band ranging signal using the RF back-end quadrature mixer 200, digital I/Q filters 210 and 230, a digital quadrature oscillator 220 and a summer 270. This base-band ranging signal is stored in the transponder's memory 170 using Ram Data Bus Controller 195 and control logic 180.

Subsequently, the transponder switches from RX to TX mode using RF front-end switch 15 and after certain delay $t_{RTX}$ begins re-transmitting the stored base-band signal. Note that the delay is measured in the AM (transponder) system clock. Thus, $t_{RTX}^{AM} = t_{RTX} \beta^{AM}$. The master receives the transponder transmission and down-converts the received signal back to the base-band signal using its RF back-end quadrature mixer 200, the digital I and Q filters 210 and 230, the digital quadrature oscillator 220 (see FIG. 3C).

Thereafter, the master calculates the phase difference between $F_1$ and $F_2$ in the received (i.e., recovered) base-band signal using multi-path mitigation processor arctan block 250 and phase compare block 255. The amplitude values are derived from the RF back-end RSSI block 240.

For improving the estimation accuracy it is always desirable to improve the SNR of the amplitude estimates from block 240 and phase difference estimates from block 255. In the preferred embodiment the multi-path mitigation processor calculates amplitude and phase difference estimates for many time instances over the ranging signal frequency component duration ($T_f$). These values, when averaged, improve SNR. The SNR improvement can be in an order that is proportional to $\sqrt{N}$, where N is a number of instances when amplitude and phase difference values were taken (i.e., determined).

Another approach to the SNR improvement is to determine amplitude and phase difference values by applying matching filter techniques over a period of time. Yet, another approach would be to estimate the phase and the amplitude of the received (i.e., repeated) base band ranging signal frequency components by sampling them and integrating over period $T \leq T_f$ against the original (i.e., sent by the master/reader) base-band ranging signal frequency components in the I/Q form. The integration has the effect of averaging of multiple instances of the amplitude and the phase in the I/Q format. Thereafter, the phase and the amplitude values can be translated from the I/Q format to the $|\hat{A}(f_n)|$ and $\angle \hat{A}(f_n)$ format.

Let's assume that at t=0 under master' multi-path processor control the master base-band processor (both in FPGA 150) start the base-band ranging sequence.

$$\varphi_{FPGA}^M(t) = \gamma^M \times \omega_{OSC} \times (K_{F_1}(t)), t < T_1 \beta^M, t < T_1 \beta^M;$$

$$\varphi_{FPGA}^M(t) = \gamma^M \times \omega_{OSC} \times (K_{F_1}(T_1 \beta^M) + K_{F_2}(t - T_1 \beta^M)), t > T_1 \beta^M,$$

where $T_2 \geq T_1 \beta^M$.

The phase at master's DAC(s) 120 and 125 outputs are as follows:

$$\varphi_{FPGA}^M(t) = \gamma^M \times \omega_{OSC} \times (K_{F_1}(t - t_{DAC}^M)) + \varphi_{DAC}^M(0), t < T_1 \beta^M + t_{DAC}^M;$$

$$\varphi_{FPGA}^M(t) = \gamma^M \times \omega_{OSC} \times (K_{F_1}(T_1 \beta^M) + K_{F_2}(t - T_1 \beta^M t_{DAC}^M)) + \varphi_{DAC}^M(0), t > T_1 \beta^M + t_{DAC}^M$$

Note that DACs 120 and 125 have internal propagation delay, $t_{DAC}^M$, that does not depend upon the system clock.

Similarly, the transmitter circuitry components 15, 30, 40 and 50 will introduce additional delay, $t_{TX}^M$, that does not depend upon the system clock.

As a result, the phase of the transmitted RF signal by the master can be calculated as follows:

$$\varphi_{RF}^M(t) = \gamma^M \omega_{OSC} \times (K_{F_1}(t - t_{DAC}^M - t_{TX}^M) + K_{SYN\_TX}(t - t_{TX}^M)) + \varphi_{DAC}^M(0) + \varphi_{SYN\_TX}^M(0), t < T_1 \beta^M + t_{DAC}^M + t_{TX}^M;$$

$$\varphi_{RF}^M(t) = \gamma^M \omega_{OSC} \times (K_{F_1}(T_1 \beta^M) + K_{F_2}(t - T_1 \beta^M t_{DAC} - t_{TX}^M) + K_{SYN\_TX}(t - t_{TX}^M)) + \varphi_{DAC}^M(0) + \varphi_{SYN\_TX}^M(0), t > T_1 \beta^M + t_{DAC}^M + t_{TX}^M$$

The RF signal from the master (M) experiences a phase shift $\varphi^{MULT}$ that is a function of the multi-path phenomena between the master and tag.

The $\varphi^{MULT}$ values depend upon the transmitted frequencies, e.g. $F_1$ and $F_2$. The transponder (AM) receiver' is not able to resolve each path because of limited (i.e., narrow) bandwidth of the RF portion of the receiver. Thus, after a certain time, for example, 1 microsecond (equivalent to ~300 meters of flight), when all reflected signals have arrived at the receiver antenna, the following formulas apply:

$$\varphi_{ANT}^{AM}(t) = \gamma^M \omega_{OSC} \times (K_{F_1}(t - t_{DAC}^M - t_{TX}^M) + K_{SYN\_TX}(t - t_{TX}^M)) + \varphi_{F_1}^{MULT} + \varphi_{DAC}^M(0) + \varphi_{SYN\_TX}^M(0), 10^{-6} < t < T_1 \beta^M + t_{DAC}^M + t_{TX}^M;$$

$$\varphi_{ANT}^{AM}(t) = \gamma^M \omega_{OSC} \times (K_{F_1}(T_1 \beta^M) + K_{F_2}(t - T_1 \beta^M - t_{DAC}^M - t_{TX}^M) + K_{SYN\_TX}(t - t_{TX}^M)) + \varphi_{F_2}^{MULT} + \varphi_{DAC}^M(0) \varphi_{SYN\_TX}^M(0), t > T_1 \beta^M + t_{DAC}^M + t_{TX}^M + 10^{-6}$$

In the AM (transponder) receiver at the first down converter, element 85, an output, e.g. first IF, the phase of the signal is as follows:

$$\varphi_{IF\_1}^{AM}(t) = \gamma^M \omega_{OSC} \times (K_{F_1}(t - t_{DAC}^M - t_{TX}^M - t_{RX}^{AM}) + K_{SYN\_TX}(t - t_{TX}^M - t_{RX}^{AM})) - \gamma^{AM} \omega_{OSC} \times (K_{SYN\_RX\_1}t) + \varphi_{F_1}^{MULT} + \varphi_{SYN\_TX}^M(0) - \varphi_{SYN\_RX\_1}^{AM}(0), 10^{-6} < t < T_1 \beta^M + t_{DAC}^M + t_{TX}^M + t_{RX}^{AM};$$

$$\varphi_{IF\_1}^{AM}(t) = \gamma^M \omega_{OSC} \times (K_{F_1}(T_1 \beta^M) K_{F_2}(t - T_1 \beta^M - t_{DAC}^M - t_{TX}^M t_{RX}^{AM}) + K_{SYN\_TX}(t - t_{TX}^M - t_{RX}^{AM})) - \gamma^{AM} \omega_{OSC} \times (K_{SYN\_RX\_1}t) + \varphi_{F_2}^{MULT} + \varphi_{SYN\_TX}^M(0) - \varphi_{SYN\_RX\_1}^{AM}(0), t > T_1 \beta^M + t_{DAC}^M \pm t_{TX}^M \pm t_{RX}^{AM} + 10^{-6}$$

Note that the propagation delay $t_{RX}^{AM}$ in the receiver RF section (elements 15 and 60-85) does not depend upon the system clock. After passing through RF Front-end filters and amplifiers (elements 95-110 and 125) the first IF signal is sampled by the RF Back-end ADC 140. It is assumed that ADC 140 is under-sampling the input signal (e.g., first IF). Thus, the ADC also acts like a down-converter producing the second IF. The first IF filters, amplifiers and the ADC add propagation delay time. At the ADC output (second IF):

$$\varphi_{ADC}{}^{AM}(t) = \gamma^M \times \omega_{OSC} \times (K_{F_1}(t - t_{DAC}{}^M - t_{TX}{}^M - t_{RX}{}^{AM} - t_{IF\_1}{}^{AM} - t_{ADC}{}^{AM}) + K_{SYN\_TX}(t - t_{TX}{}^M - t_{RX}{}^{AM} - t_{IF\_1}{}^{AM} - t_{ADC}{}^{AM})) - \gamma^{AM} \times \omega_{OSC} \times (K_{SYN\_RX\_1}(t - t_{IF\_1}{}^{AM} - t_{ADC}{}^{AM}) + K_{ADC}(t)) + \varphi_{F_1}{}^{MULT} + \varphi_{SYN\_TX}{}^M(0) - \varphi_{SYN\_RX\_1}{}^{AM}(0) - \varphi_{ADC\_CLK}{}^{AM}(0),$$
$$10^{-6} < t < T_1\beta^M + t_{DAC}{}^M + t_{TX}{}^M + t_{RX}{}^{AM} + t_{IF\_1}{}^{AM} + t_{ADC}{}^{AM};$$

$$\varphi_{ADC}{}^{AM}(t) = \gamma^M \times \omega_{OSC} \times (K_{F_1}(T_1\beta^M) + K_{F_2}(t - T_1\beta^M - t_{DAC}{}^M - t_{TX}{}^M - t_{RX}{}^{AM} - t_{IF\_1}{}^{AM} - t_{ADC}{}^{AM}) + K_{SYN\_TX}(t - t_{TX}{}^M - t_{RX}{}^{AM} - t_{IF\_1}{}^{AM} - t_{ADC}{}^{AM})) - \gamma^{AM} \times \omega_{OSC} \times (K_{SYN\_RX\_1}(t - t_{IF\_1}{}^{AM} - t_{ADC}{}^{AM}) + K_{ADC}(t)) + \varphi_{F_2}{}^{MULT} + \varphi_{SYN\_TX}{}^M(0) - \varphi_{SYN\_RX\_1}{}^{AM}(0) - \varphi_{ADC\_CLK}{}^{AM}(0), t > T_1\beta^M + t_{DAC}{}^M + t_{TX}{}^M + t_{RX}{}^{AM} + t_{IF\_1}{}^{AM} + t_{ADC}{}^{AM} + 10^{-6}$$

In the FPGA 150 the second IF signal (from the ADC output) is filtered by the RF Back-end digital filters 190 and further down-converted back to base-band ranging signal by the third down-converter (i.e., quadrature mixer 200, digital filters 230 and 210 and digital quadrature oscillator 220), summed in the summer 270 and is stored in the memory 170. At the third down-converter output (i.e., quadrature mixer):

$$\varphi_{BB}^{AM}(t) = \gamma^M \times \omega_{OSC} \times (K_{F_1}(t - t_{DAC}^M - t_{TX}^M - t_{RX}^{AM} + t_{IF\_1}^{AM} + t_{ADC}^{AM} - t_{FIR}\beta^{AM}) + K_{SYN\_TX}(t - t_{TX}^M - t_{RX}^{AM} - t_{IF\_1}^{AM} - t_{ADC}^{AM} - t_{FIR}\beta^{AM})) - \gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_2}t) + \varphi_{F_1}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$10^{-6} < t < T_1\beta^M + t_{DAC}^M + t_{TX}^M + t_{RX}^{AM} + t_{IF\_1}^{AM} + t_{ADC}^{AM} + t_{FIR}\beta^{AM};$$

$$\varphi_{BB}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM}) + K_{SYN\_TX}(t - t_{TX}^M - t_{RX}^{AM} - t_{IF\_1}^{AM} - t_{ADC}^{AM} - t_{FIR}\beta^{AM})) - \gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_2}t) + \varphi_{F_2}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + 10^{-6}$$

Note that propagation delay $t_{FIR}{}^{AM} = t_{FIR}\beta^{AM}$ in the FIR section 190 does not depend upon the system clock.

After RX→TX delay the stored (in memory 170) base-band ranging signal from the master (M) is retransmitted. Note that RX→TX delay $t_{RTX}{}^{AM} = t_{RTX}\beta^{AM}$.

$$\varphi_{RF}^{AM}(t) = \gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{ADC}(t - t_{FIR}\beta^{AM} - t_{RTX}\beta^{AM} - t_{DAC}^{AM} - t_{TX}^{AM}) + K_{SYN\_RX\_2}(t - t_{RTX}\beta^{AM} - t_{DAC}^{AM} - t_{TX}^{AM}) - K_{SYN\_TX}(t - t_{TX}^{AM})) + \varphi_{F_1}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$10^{-6} < t < T_1\beta^M + t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM};$$

$$\varphi_{RF}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{ADC}(t - t_{FIR}\beta^{AM} - t_{RTX}\beta^{AM} - t_{DAC}^{AM} - t_{TX}^{AM}) + K_{SYN\_RX\_2}(t - t_{RTX}\beta^{AM} - t_{DAC}^{AM} - t_{TX}^{AM}) - K_{SYN\_TX}(t - t_{TX}^{AM})) + \varphi_{F_2}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM} + 10^{-6}$$

By the time the signal from the transponder reaches the master' (M) receiver antenna the RF signal from transponder (AM) experiences another phase shift $\varphi^{MULT}$ that is a function of the multi-path. As discussed above, this phase shift happens after a certain time period when all reflected signals have arrived at the master' receiver antenna:

$$\varphi_{ANT}^M(t) = \gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{ADC}(t - t_{FIR}\beta^{AM} - t_{RTX}\beta^{AM} - t_{DAC}^{AM} - t_{TX}^{AM}) + K_{SYN\_RX\_2}(t - t_{RTX}\beta^{AM} - t_{DAC}^{AM} - t_{TX}^{AM}) - K_{SYN\_TX}(t - t_{TX}^{AM})) + 2 \times \varphi_{F_1}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$2 \times 10^{-6} < t < T_1\beta^M + t_{DAC}^M + t_{TX}^M + t_{RX}^{AM} + 1 t_{IF\_1}^{AM} + t_{ADC}^{AM} + t_{FIR}\beta^{AM} + t_{RTX}\beta^{AM} + t_{DAC}^{AM} + t_{TX}^{AM};$$

$$\varphi_{ANT}^M(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + K_{ADC}(t - t_{FIR}\beta^{AM} - t_{RTX}\beta^{AM} - t_{DAC}^{AM} - t_{TX}^{AM}) + K_{SYN\_RX\_2}(t - t_{RTX}\beta^{AM} - t_{DAC}^{AM} - t_{TX}^{AM}) - K_{SYN\_TX}(t - t_{TX}^{AM})) + 2 \times \varphi_{F_2}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM} + 2 \times 10^{-6}$$

In the master receiver the signal from transponder goes through the same down-conversion process as in the transponder receiver. The result is the recovered base-band ranging signal that was originally sent by the master.

For the first frequency component $F_1$:

$$\varphi_{BB\_RECOV}^M(t) =$$
$$\gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) +$$
$$K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) - K_{SYN\_RX\_1}(t -$$
$$t_{IF\_1}^{AM} - t_{ADC}^{AM} - t_{FIR}\beta^{AM}) - K_{ADC}(t - t_{FIR}\beta^M) - K_{SYN\_RX\_2}(t)) -$$
$$\gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) +$$
$$K_{ADC}(t - t_{FIR}\beta^{AM} - t_{RTX}\beta^{AM} - t_{DAC}^{AM} - t_{TX}^{AM} - t_{RX}^M -$$
$$t_{IF\_1}^M - t_{ADC}^M - t_{FIR}\beta^M) + K_{SYN\_RX\_2}(t - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) -$$
$$K_{SYN\_TX}(t - t_{TX}^{AM} - t_{RX}^M - t_{IF\_1}^M - t_{ADC}^M - t_{FIR}\beta^M)) +$$
$$2 \times \varphi_{F_1}^{MULT} + \varphi_{SYN\_TX}^M(0) - \varphi_{SYN\_RX\_1}^{AM}(0) -$$
$$\varphi_{ADC\_CLK}^{AM}(0) - \varphi_{SYN\_RX\_2}^{AM}(0) +$$
$$\varphi_{SYN\_TX}^{AM} - \varphi_{SYN\_RX\_1}^M(0) - \varphi_{ADC\_CLK}^M(0) - \varphi_{SYN\_RX\_2}^M(0),$$
$$2 \times 10^{-6} < t < T_1 \beta^M + t_{DAC}^M + t_{TX}^M + t_{RX}^{AM} + t_{IF\_1}^{AM} + t_{ADC}^{AM} + t_{FIR}\beta^{AM} +$$
$$t_{RTX}\beta^{AM} + t_{DAC}^{AM} + t_{TX}^{AM} + t_{RX}^M + t_{IF\_1}^M + t_{ADC}^M + t_{FIR}\beta^M;$$

For the Second Frequency Component $F_2$:

$$\varphi_{BB\_RECOV}^M(t) =$$
$$\gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} -$$
$$t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M -$$
$$t_{FIR}\beta^M) + K_{SYN\_TX}(t - t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(t - t_{IF\_1}^M - t_{ADC}^M - t_{FIR}\beta^M) -$$
$$K_{ADC}(t - t_{FIR}\beta^M) - K_{SYN\_RX\_2}(t)) -$$
$$\gamma^{AM} \times \omega_{OSC} \times (K_{SYN\_RX\_1}(t - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) +$$
$$K_{ADC}(t - t_{FIR}\beta^{AM} - t_{RTX}\beta^{AM} - t_{DAC}^{AM} - t_{TX}^{AM} - t_{RX}^M -$$
$$t_{IF\_1}^M - t_{ADC}^M - t_{FIR}\beta^M) + K_{SYN\_RX\_2}(t - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) -$$
$$K_{SYN\_TX}(t - t_{TX}^{AM} - t_{RX}^M - t_{IF\_1}^M - t_{ADC}^M - t_{FIR}\beta^M)) +$$
$$2 \times \varphi_{F_2}^{MULT} + \varphi_{SYN\_TX}^M(0) - \varphi_{SYN\_RX\_1}^{AM}(0) -$$
$$\varphi_{ADC\_CLK}^{AM}(0) - \varphi_{SYN\_RX\_2}^{AM}(0) +$$
$$\varphi_{SYN\_TX}^{AM} - \varphi_{SYN\_RX\_1}^M(0) - \varphi_{ADC\_CLK}^M(0) - \varphi_{SYN\_RX\_2}^M(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} +$$
$$t_{RTX}\beta^{AM} + t_{DAC}^{AM} + t_{TX}^{AM} + t_{RX}^M + t_{IF\_1}^M + t_{ADC}^M + t_{FIR}\beta^M + 2 \times 10^{-6}$$

Substitutions:

$$T_{D\_M-AM} = t_{DAC}^M + t_{TX}^M + t_{RX}^{AM} + t_{IF\_1}^{AM} + t_{ADC}^{AM} +$$
$$t_{FIR}\beta^{AM} + t_{RTX}\beta^{AM} + t_{DAC}^{AM} + t_{TX}^{AM} + t_{RX}^M + t_{IF\_1}^M +$$
$$t_{ADC}^M + t_{FIR}\beta^M;$$

where $T_{D\_M-AM}$ is the propagation delay through master (M) and transponder (AM) circuitry.

$$\varphi_{BB\_M-AM}(0) = \varphi_{SYN\_TX}^M(0) - \varphi_{SYN\_RX\_1}^{AM}(0) -$$
$$\varphi_{ADC\_CLK}^{AM}(0) - \varphi_{SYN\_RX\_2}^{AM}(0) + \varphi_{SYN\_TX}^{AM} -$$
$$\varphi_{SYN\_RX\_1}^M(0) - \varphi_{ADC\_CLK}^M(0) -$$
$$\varphi_{SYN\_RX\_2}^M(0) = \text{Cont};$$

where: $\varphi_{BB\_M-AM}(0)$ is the LO phase shift, at time $t=0$, from master (M) and transponder (AM) frequency mixers, including ADC(s).

Also: $K_{SYN\_TX} = K_{SYN\_RX\_1} + K_{ADC} + K_{SYN\_RX\_2}$

First Frequency Component F1:

$$\varphi_{BB\_RECOV}^M(t) =$$
$$\gamma^M \times \omega_{OSC} \times (K_{F_1}(t - T_{D\_M-AM}) - K_{SYN\_TX}(t) + K_{SYN\_RX\_1}(t) - K_{ADC}(t) -$$
$$K_{SYN\_RX\_2}(t) + K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(t) + K_{ADC}(t) + K_{SYN\_RX\_2}(t) - K_{SYN\_TX}(t) +$$
$$K_{SYN\_RX\_1}(t - t_{IF\_1}^{AM} - t_{ADC}^{AM} - t_{FIR}\beta^{AM} - t_{RTX}\beta^{AM} - t_{DAC}^{AM}) +$$
$$K_{ADC}(-t_{FIR}\beta^{AM} - t_{RTX}\beta^{AM} - t_{DAC}^{AM}) + K_{SYN\_RX\_2}(-t_{RTX}\beta^{AM} -$$
$$t_{DAC}^{AM}) K_{SYN\_RX\_1}(-t_{TX}^M - t_{RX}^M - t_{IF\_1}^M - t_{ADC}^M - t_{FIR}\beta^M) +$$
$$K_{ADC}(-t_{TX}^M - t_{RX}^M - t_{IF\_1}^M - t_{ADC}^M - t_{FIR}\beta^M) +$$
$$K_{SYN\_RX\_2}(-t_{TX}^M - t_{RX}^M - t_{IF\_1}^M - t_{ADC}^M - t_{FIR}\beta^M) -$$
$$K_{SYN\_TX}(-t_{TX}^{AM} - t_{RX}^M - t_{IF\_1}^M - t_{ADC}^M - t_{FIR}\beta^M)) +$$
$$2 \times \varphi_{F_1}^{MULT} + \varphi_{BB\_M-AM}(0),$$
$$2 \times 10^{-6} < t < T_1\beta^M + T_{D\_M-AM};$$

First Frequency Component F1 Continued:

$$\varphi_{BB\_RECOV}^M(t) = \gamma^M \times \omega_{OSC} \times$$
$$(K_{F_1}(t - T_{D\_M-AM}) + K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM} - t_{DAC}^{AM}) +$$
$$K_{ADC}(-t_{FIR}\beta^{AM} - t_{RTX}\beta^{AM} - t_{DAC}^{AM}) +$$
$$K_{SYN\_RX\_2}(-t_{RTX}\beta^{AM} - t_{DAC}^{AM})) + 2 \times \varphi_{F_1}^{MULT} + \varphi_{BB\_M-AM}(0),$$
$$2 \times 10^{-6} < t < T_1\beta^M + T_{D\_M-AM};$$

Second Frequency Component F2:

$$\varphi_{BB\_RECOV}^M(t) =$$
$$\gamma^M \times \omega_{OSC} \times (K_{F_1}(T_1\beta^M) + K_{F_2}(t - T_1\beta^M - T_{D\_M-AM}) - K_{SYN\_TX}(t) +$$
$$K_{SYN\_RX\_1}(t) - K_{ADC}(t) - K_{SYN\_RX\_2}(t) +$$
$$K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(t) + K_{ADC}(t) + K_{SYN\_RX\_2}(t) -$$
$$K_{SYN\_TX}(t) + K_{SYN\_RX\_1}(-t_{IF\_1}^{AM} - t_{ADC}^{AM} - t_{FIR}\beta^{AM} - t_{RTX}\beta^{AM}) +$$
$$K_{ADC}(-t_{FIR}\beta^{AM} - t_{RTX}\beta^{AM} - t_{DAC}^{AM}) + K_{SYN\_RX\_2}(-t_{RTX}\beta^{AM} -$$

-continued $$t_{DAC}^{AM})K_{SYN\_RX\_1}(-t_{TX}^{AM} - t_{RX}^{M} - t_{IF\_1}^{M} - t_{ADC}^{M} - t_{FIR}\beta^{M}) +$$

$$K_{ADC}(-t_{TX}^{AM} - t_{RX}^{M} - t_{IF\_1}^{M} - t_{ADC}^{M} - t_{FIR}\beta^{M}) +$$

$$K_{SYN\_RX\_2}(-t_{TX}^{AM} - t_{RX}^{M} - t_{IF\_1}^{M} - t_{ADC}^{M} - t_{FIR}\beta^{M}) -$$

$$K_{SYN\_TX}(-t_{TX}^{AM} - t_{RX}^{M} - t_{IF\_1}^{M} - t_{ADC}^{M} - t_{FIR}\beta^{M})) +$$

$$2 \times \varphi_{F_2}^{MULT} + \varphi_{BB\_M-AM}(0),$$

$$t > T_1\beta^{M} + T_{D\_M-AM} + 2 \times 10^{-6}$$

Second Frequency Component F2, Continued:

$$\varphi_{BB\_RECOV}^{M}(t) = \gamma^{M} \times \omega_{OSC} \times (K_{F_1}(T_1\beta^{M}) + K_{F_2}(t - T_1\beta^{M} - T_{D\_M-AM}) +$$

$$K_{SYN\_TX}(-t_{TX}^{M} - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM} - t_{RX}^{M} - t_{IF\_1}^{M} - t_{ADC}^{M} - t_{FIR}\beta^{M}) -$$

$$K_{SYN\_RX\_1}(-t_{IF\_1}^{M} - t_{ADC}^{M} - t_{FIR}\beta^{M}) - K_{ADC}(-t_{FIR}\beta^{M})) -$$

$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM}) +$$

$$K_{ADC}(-t_{FIR}\beta^{AM} - t_{RTX}\beta^{AM} - t_{DAC}^{AM}) +$$

$$K_{SYN\_RX\_2}(-t_{RTX}\beta^{AM} - t_{DAC}^{AM})) + 2 \times \varphi_{F_2}^{MULT} + \varphi_{BB\_M-AM}(0),$$

$$t > T_1\beta^{M} + T_{D\_M-AM} + 2 \times 10^{-6}$$

Further Substituting:

$$\alpha =$$
$$\gamma^{M} \times \omega_{OSC} \times (K_{SYN\_TX}(-t_{TX}^{M} - t_{RX}^{AM} - t_{IF\_1}^{AM} - t_{ADC}^{AM} - t_{FIR}\beta^{AM} - t_{RTX}\beta^{AM} -$$

$$t_{DAC}^{AM} - t_{TX}^{AM} - t_{RX}^{M} - t_{IF\_1}^{M} - t_{ADC}^{M} - t_{FIR}\beta^{M}) -$$

$$K_{SYN\_RX\_1}(-t_{IF\_1}^{M} - t_{ADC}^{M} - t_{FIR}\beta^{M}) + K_{ADC}(-t_{FIR}\beta^{M})) -$$

$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM}) +$$

$$K_{ADC}(-t_{FIR}\beta^{AM} - t_{RTX}\beta^{AM} -$$

$$t_{DAC}^{AM}) + K_{SYN\_RX\_2}(-t_{RTX}\beta^{AM} - t_{DAC}^{AM})),$$

where α is a constant.
Then the Final Phase Equations is:

$$\varphi_{BB\_RECOV}^{M}(t) = \gamma^{M} \times \omega_{OSC} \times (K_{F_1}(t - T_{D\_M-AM})) + 2 \times$$
$$\varphi_{F_1}^{MULT} + \varphi_{BB\_M-AMN}(0) + \alpha, 2 \times 10^{-6} < t < T_1\beta^{M} + T_{D\_M-AM};$$

$$\varphi_{BB\_RECOV}^{M}(t) = \gamma^{M} \times \omega_{OSC} \times (K_{F_1}(T_1\beta^{M}) + K_{F_2}(t - T_1\beta^{M} - T_{D\_M-AM})) + 2 \times \varphi_{F_2}^{MULT} + \varphi_{BB\_M-AM}(0) + \alpha,$$
$$t > T_1\beta^{M} \pm T_{D\_M-AM} + 2 \times 10^{-6} \quad (5)$$

From the equation (5):

$$L\hat{A}_{RT}(f_n) = \langle 2 \times \varphi_{F_1}^{MULT}; 2 \times \varphi_{F_1}^{MULT} + 2 \times \Delta\Phi_{F_1/F_2}; 2 \times \varphi_{F_1}^{MULT} + 2 \times$$
$$\Delta\Phi_{F_1/F_3}; 2 \times \varphi_{F_1}^{MULT} + 2 \times \Delta\Phi_{F_1/F_4}; \ldots; 2 \times \varphi_{F_1}^{MULT} + 2 \times \Delta\Phi_{F_1/F_i} \rangle$$

where i=2, 3, 4 ... ; and $2\times\Delta\Phi_{F_1/F_i}$ is equal to $2\times(\varphi_{F_i}^{MULT} - \varphi_{F_1}^{MULT})$.

For example, the difference $2\times(\varphi_{F_2}^{MULT} - \varphi_{F_1}^{MULT})$ at time instances t1 and t2:

$$2\times\varphi_{F_2}^{MULT} - 2\times\varphi_{F_1}^{MULT} = 2\Delta\Phi_{F_1/F_2} = \varphi_{BB\_RECOV}^{M}$$
$$(t_2) - \varphi_{BB\_RECOV}^{M}(t_1) - \gamma^{M} \times \omega_{OSC} \times [K_{F_1}(T_1\beta^{M}) +$$
$$(K_{F_2}(t_2 - T_1\beta^{M} - T_{D\_M-AM})) - (K_{F_1}(t_1 - T_{D\_M-AM}))],$$
$$2\times10^{-6} < t_1 < T_1\beta^{M} + T_{D\_M-AM}; t_2 > T_1\beta^{M} + T_{D\_M-AM} +$$
$$2\times10^{-6}$$

To find $2\times\Delta\Phi_{F_1/F_2}$ difference we need to know $T_{D\_M-AM}$:

$$T_{D\_M-AM} = T_{LB\_M}\beta^{M} + T_{LB\_AM}\beta^{AM} + t_{RTX}\beta^{AM};$$

$$T_{LB\_M} = t_{DAC}^{M} + t_{TX}^{M} + t_{RX}^{M} + t_{IF\_1}^{M} + t_{ADC}^{M} + t_{FIR}\beta^{M};$$
$$T_{LB\_AM} = t_{DAC}^{AM} + t_{TX}^{AM} + t_{RX}^{AM} + t_{IF\_1}^{AM} + t_{ADC}^{AM} + t_{FIR}\beta^{AM},$$

where $T_{LB\_M}$ and $T_{LB\_AM}$ are propagation delays through the master (M) and transponder (AM) TX and RX circuitries that are measured by placing devices in the loop-back mode. Note that the master and the transponder devices can measure $T_{LB\_M}$ and $T_{LB\_AM}$ automatically; and we also know the $t_{RTX}$ value.

From the above formulas and $t_{RTX}$ value $T_{D\_M-AM}$ can be determined and consequently, for a given $t_1$, and $t_2$ the $2\times\Delta\Phi_{F_1/F_2}$ value can be found as follows:

$$2\times\Delta\Phi_{F_1/F_2} = \quad (6)$$
$$\varphi_{BB\_RECOV}^{M}(t_2) - \varphi_{BB\_RECOV}^{M}(t_1) - \gamma^{M} \times \omega_{OSC} \times [K_{F_1}(T_1\beta^{M}) +$$
$$K_{F_2}t_2 - K_{F_2}T_1\beta^{M} - K_{F_1}t_1 - K_{F_2}T_{LB\_M}\beta^{M} +$$
$$K_{F_1}T_{LB\_M}\beta^{M} - K_{F_2}(T_{LB\_AM}\beta^{AM}\beta^{M} + t_{RTX}\beta^{M}) +$$
$$K_{F_1}(T_{LB\_AM}\beta^{AM}\beta^{M} + t_{RTX}\beta^{M})],$$
$$2\times10^{-6} < t_1 < T_1\beta^{M} + T_{D\_M-AM}; t_2 = t_1 + T_1\beta^{M}$$

$$2\times\Delta\Phi_{F_1/F_2} =$$
$$\varphi_{BB\_RECOV}^{M}(t_2) - \varphi_{BB\_RECOV}^{M}(t_1) - \gamma^{M} \times \omega_{OSC} \times [K_{F_2}t_2 - K_{F_1}t_1 -$$
$$(K_{F_2} - K_{F_1}) \times T_1\beta^{M} - (K_{F_2} - K_{F_1}) \times T_{LB\_M}\beta^{M} -$$
$$(K_{F_2} - K_{F_1}) \times (T_{LB\_AM}\beta^{AM}\beta^{M} + t_{RTX}\beta^{M})],$$
$$2\times10^{-6} < t_1 < T_1\beta^{M} + T_{D\_M-AM}; t_2 = t_1 + T_1\beta^{M}$$

$$2\times\Delta\Phi_{F_1/F_2} = \varphi_{BB\_RECOV}^{M}(t_2) - \varphi_{BB\_RECOV}^{M}(t_1) -$$
$$\gamma^{M} \times \omega_{OSC} \times [K_{F_2}t_2 - K_{F_1}t_1 - (K_{F_2} - K_{F_1}) \times$$
$$(T_1\beta^{M} - T_{LB\_M}\beta^{M} - T_{LB\_AM}\beta^{AM}\beta^{M} - t_{RTX}\beta^{M})],$$
$$2\times10^{-6} < t_1 < T_1\beta^{M} + T_{D\_M-AM}; t_2 = t_1 + T_1\beta^{M};$$

Or, assuming that $\beta^{M} = \beta^{AM} = 1$:

$$2\times\Delta\Phi_{F_1/F_2} = \varphi_{BB\_RECOV}^{M}(t_2) - \varphi_{BB\_RECOV}^{M}(t_1) - \gamma^{M} \times \omega_{OSC} \times \quad (6A)$$
$$[K_{F_2}t_2 - K_{F_1}t_1 - (K_{F_2} - K_{F_1}) \times (T_1 - T_{D\_M-AM})],$$
$$2\times10^{-6} < t_1 < T_1 + T_{D\_M-AM}; t_2 = t_1 + T_1;$$

From the equation (6) it can be concluded that at operating frequency(s) ranging signal(s) complex amplitude values can be found from processing the returned base-band ranging signal.

The initial phase value $2\times\varphi_{F_1}^{MULT}$ can be assumed to be equal zero because the subspace algorithms are not sensitive to a constant phase offset. If necessary, the $2\times\varphi_{F_1}^{MULT}$ value (phase initial value) can be found by determining the TOA (Time Of Arrival) using the narrow-bandwidth ranging signal method as described in U.S. Pat. No. 7,561,048, incorporated herein by reference in its entirety. This method estimates the ranging signal round trip delay, which is equal to $2\times T_{FLT}\beta^{M}$ and the $2\times\varphi_{F_1}^{MULT}$ value can be found from the following equation:

$$2\times\varphi_{F_1}^{MULT} = 2\times\beta^{M} \times \gamma^{M} \times \omega_{OSC} \times (K_{SYN\_TX} + K_{F_1}) \times (T_{FLT}),$$

Or:

$$2\times\varphi_{F_1}^{MULT} = 2\times\omega_{OSC} \times (K_{SYN\_TX} + K_{F_1}) \times (T_{FLT}),$$

In the preferred embodiment, the returned base-band ranging signal phase values $\varphi_{BB\_RECOV}^{M}(t)$ are calculated by the multi-path processor's arctan block 250. To improve SNR, the multi-path mitigation processor phase compare block 255 calculates $2\times\Delta\Phi_{F_1/F_i} = \varphi BB\_RECOV^{M}(t_m) -$ φ$_{BB\_RECOV}^{M}$(t$_n$) for many instances n (n=2, 3, 4 . . . ) using the equation (6A), and then average them out to improve SNR. Note that $2 \times 10^{-6} < t_n < T_f + T_{D\_M-AM}$; $t_m = t_1 + T_f$.

From the equations 5 and 6 it becomes apparent that the recovered (i.e., received) base-band ranging signal has the same frequency as the original base-band signal that was sent by the master. Thus, there is no frequency translation despite the fact that the master (M) and the transponder (AM) system clocks can differ. Because the base-band signal consists of several frequency components, each component is consists of multiple periods of a sinusoid, it is also possible to estimate the phase and the amplitude of the received ranging signal by sampling the received base-band signal individual component frequency with the corresponding original (i.e., sent by the master) base-band signal individual frequency component and integrating the resulting signal over period $T \le T_f$.

This operation generates complex amplitude values $\hat{A}_{RT}$(f$_n$) of received ranging signal in the I/Q format. Note that each base-band signal individual frequency component that was sent by the master has to be shifted in time by the $T_{D\_M-AM}$. The integration operation produces effect of averaging out the multiple instances of the amplitude and the phase (e.g., increasing the SNR). Note that the phase and the amplitude values can be translated from the I/Q format to the |$\hat{A}$(f$_n$)| and ∠$\hat{A}_{RT}$(f$_n$)) format.

This method of sampling, integrating over period of $T \le T_f$ and subsequent conversion from the I/Q format to the |$\hat{A}$(f$_n$)| and ∠$\hat{A}$(f$_n$) format can be implemented in the phase compare block 255 in FIG. 3C. Thus, depending upon the block's 255 design and implementation, either the method of the preferred embodiment, based on the equation (5), or an alternative method, described in this section, can be used.

Although the ranging signal bandwidth is narrow, the frequency difference $f_n – f_1$ can be relatively large, for example, in an order of several megahertz. As a result, the receiver's bandwidth has to be kept wide enough to pass all of the $f_1:f_n$ ranging signal frequencies components. This wide receiver bandwidth impacts the SNR. To reduce the receiver effective bandwidth and improve the SNR, the received ranging signal base-band frequency components can be filtered by the RF back-end processor in FPGA 150 by the digital narrow bandwidth filters tuned for each individual frequency component of the received base-band ranging signal. However, this large number of digital filters (the number of filters equals to the number of individual frequency components, n) puts additional burden on the FPGA resources, increasing its cost, size and power consumption.

In the preferred embodiment only two narrow bandwidth digital filters are used: one filter is always tuned for $f_1$ frequency component and the other filter can be tuned for all other frequencies components: $f_2:f_n$. Multiple instances of ranging signal are sent by the master. Each instance consists of only two frequencies: $f_1:f_2$; $f_1:f_3$ . . . ; $f_1:f_i$ . . . ; $f_1:f_n$. Similar strategies are also possible.

Please note that it is also entirely possible to keep the base-band ranging signal components to only two (or even one) generating the rest of the frequency components by adjusting the frequency synthesizers, e.g. changing $K_{SYN}$. It is desirable that LO signals for up-converters and down-converters mixers are generated using the Direct Digital Synthesis (DDS) technology. For high VHF band frequencies this can present an undesired burden on the transceiver/FPGA hardware. However, for lower frequencies this might be a useful approach. Analog frequency synthesizers can also be used, but may take additional time to settle after frequency is changed. Also, in case of analog synthesizers, two measurements at the same frequency would have to be made in order to cancel a phase offset that might develop after changing the analog synthesizer's frequency.

The actual $T_{D\_M-AM}$ that is used in the above equations is measured in both: the master (M) and the transponder (AM) systems clocks, e.g. $T_{LB\_AM}$ and $t_{RTX}$ are counted in the transponder (AM) clocks and $T_{LB\_M}$ is counted in the master (M) clock. However, when $2 \times \Delta\Phi_{F_1/F_2}$ is calculated both: $T_{LB\_AM}$ and $t_{RTX}$ are measured (counted) in master (M) clock. This introduces an error:

$$2 \times \Delta\Phi_{ERROR} = \gamma^M \times \omega_{OSC} \times (K_{F_2} - K_{F_1}) \times (T_{LB\_AM}(\beta^{AM}\beta^M - \beta^{AM}) + t_{RTX}(\beta^M - \beta^{AM})) \quad (7)$$

The phase estimation error (7) impacts the accuracy. Therefore, it is necessary to minimize this error. If $\beta^M = \beta^{AM}$, in other words, all master(s) and transponders (tags) system clocks are synchronized, then the contribution from the $t_{RTX}$ time is eliminated.

In the preferred embodiment, the master and the transponder units (devices) are capable of synchronizing clocks with any of the devices. For example, a master device can serve as a reference. Clock synchronization is accomplished by using the remote control communication channel, whereby under FPGA 150 control, the frequency of temperature compensated crystal oscillator TCXO 20 is adjusted. The frequency difference is measured at the output of the summer 270 of the master device while the selected transponder device is transmitting a carrier signal.

Thereafter, the master sends a command to the transponder to increase/decrease TCXO frequency. This procedure may be repeated several times to achieve greater accuracy by minimizing frequency at the summer 270 output. Please note that in an ideal case the frequency at the summer 270 output should become equal to zero. An alternative method is to measure the frequency difference and make a correction of the estimated phase without adjusting the transponder' TCXO frequency.

While $\beta^M - \beta^{AM}$ can be considerably reduced there is a phase estimation error when $\beta^M \ne 1$. In this case the margin of error depends upon a long term stability of the reference device (usually master (M)) clock generator. In addition, the process of clock synchronization may take considerable amount of time, especially with large number of units in the field. During the synchronization process the track-locate system becomes partially or fully inoperable, which negatively impacts the system readiness and performance. In this case the abovementioned method that does not require the transponder' TCXO frequency adjustment is preferred.

Commercially available (off the shelf) TCXO components have high degree of accuracy and stability. Specifically, TCXO components for the GPS commercial applications are very accurate. With these devices, the phase error impact on locating accuracy can be less than one meter without the need for frequent clock synchronization.

After narrow bandwidth ranging signal multi-path mitigation processor obtains the returned narrow bandwidth ranging signal complex amplitude $\hat{A}_{RT}$(f$_n$), the further processing (i.e., execution of super-resolution algorithms), is implemented in the software-based component, which is a part of the multi-path mitigation processor. This software component can be implemented in the master (reader) host computer CPU and/or the microprocessor that is embedded in the FPGA 150 (not shown). In the preferred embodiment the multi-path mitigation algorithm(s) software component is executed by the master host computer CPU.

The super-resolution algorithm(s) produce estimation of $(2\pi \times \tau_K)$ "frequencies", e.g. $\tau_K$ values. At the final step the multi-path mitigation processor selects with the smallest value (i.e., the DLOS delay time).

In certain cases where the ranging signal narrow bandwidth requirements are somewhat relaxed, the DLOS path can be separated from MP paths by employing a continuous (in time) chirp. In the preferred embodiment this continuous chirp is Linear Frequency Modulation (LFM). However, other chirp waveforms can be also used.

Let's assume that under multi-path mitigation processor control a chirp with bandwidth of B and duration of T is transmitted. That gives a chirp rate of $$\beta = 2\pi \frac{B}{T}$$

radians per second. Multiple chirps are transmitted and received back. Note that chirps signals are generated digitally with each chirp started at the same phase.

In the multi-path processor each received single chirp is aligned so that the returned chirp is from the middle of the area of interest.

The chirp waveform equation is:

$$s(t) = \exp(i(\omega_0 t + \beta t^2)),$$

where $\omega_0$ is the initial frequency for $0 < t < T$. For a single delay round-trip $\tau$, e.g. no multi-path, the returned signal (cirp) is $s(t-\tau)$.

The multi-path mitigation processor then "deramps" the $s(t-\tau)$ by performing complex conjugate mix with the originally transmitted chirp. The resulting signal is a complex sinusoid:

$$f_\tau(t) = \exp(-\omega_0 \tau)\exp(-2i\beta\tau t)\exp(i\beta\tau^2), \quad (8)$$

where $\exp(-iw_0\tau_k)$ is the amplitude and $2\beta\tau$ is the frequency and $0 \le t \le T$. Note that the last term is a phase and it is negligible.

In case of multi-path, the composite deramped signal consists of multiple complex sinusoids:

$$f_{MP}(t) = \sum_{k=0}^{k=L} \exp(-iw_0\tau_k)\exp(-i2\beta\tau_k)(t), \quad (9)$$

where L is the number of ranging signal paths, including the DLOS path and $0 \le t \le T$.

Multiple chirps are transmitted and processed. Each chirp is individually treated/processed as described above. Thereafter, the multi-path mitigation processor assembles results of individual chirps processing:

$$f_{MP}^N(t) = \left[\sum_{n=0}^{n=N-1} P(t-n\rho)\right] \times \left[\sum_{n=0}^{k=L} \exp(-iw_0\tau_k)\exp(-i2\beta\tau_k)t\right] \quad (10)$$

where N is the number of chirps, $$P(t) = \begin{cases} 1; 0 \le t \le T \\ 0; t > T \end{cases}, \rho = T + t_{dead}; t_{dead}$$

is the dead time zone between two consecutive chirps; $2\beta\tau_k$ are artificial delay "frequencies". Again, the most interesting is the lowest "frequency", which corresponds to the DLOS path delay.

In the equation (10) $f_{MP}^N(t)$ can be thought of as N samples of a sum of complex sinusoids at times:
$0 \le t_\alpha \le T$; $t_1 = t_\alpha + \rho$; $t_2 = t_\alpha + 2\rho \ldots$; $t_{m-1} = t_\alpha + (N-1)\rho$; $m \in 0:m-1$; Thus, the number of samples can be a multiple of N, e.g. $\alpha N$; $\alpha = 1, 2, \ldots$.

From the equation (10) the multi-path mitigation processor produces $\alpha N$ complex amplitude samples in time domain that are used in further processing (i.e., execution of super-resolution algorithms). This further processing is implemented in the software component, which is a part of the multi-path mitigation processor. This software component can be executed by the master (reader) host computer CPU and/or by the microprocessor that is embedded in the FPGA 150 (not shown), or both. In the preferred embodiment the multi-path mitigation algorithm(s) software is executed by the master host computer CPU.

The super-resolution algorithm(s) produce estimation of $2\beta\tau_k$ "frequencies", e.g. $\tau_K$ values. At the final step the multi-path mitigation processor selects $\tau$ with the smallest value, i.e. the DLOS delay time.

An explanation will be given of a special processing method, called the "threshold technique," which can serve as an alternative to the super-resolution algorithms. In other words, it is used to enhance reliability and accuracy in distinguishing DLOS path from other MP paths using the artificially generated synthetic wider bandwidth ranging signal.

The frequency domain base-band ranging signal shown in FIG. 1 and FIG. 1A can be converted into time domain base-band signal s(t):

$$s(t) = \frac{\sin\pi(2N+1)\Delta ft}{\sin\pi\Delta ft} \quad (11)$$

It is readily verified that s(t) is periodic with period $1/\Delta t$ and for any integer k, that $s(k/\Delta t) = 2N+1$, which is the peak value of the signal. Where $n = N$ in FIG. 1 and FIG. 1A.

Figure 4:
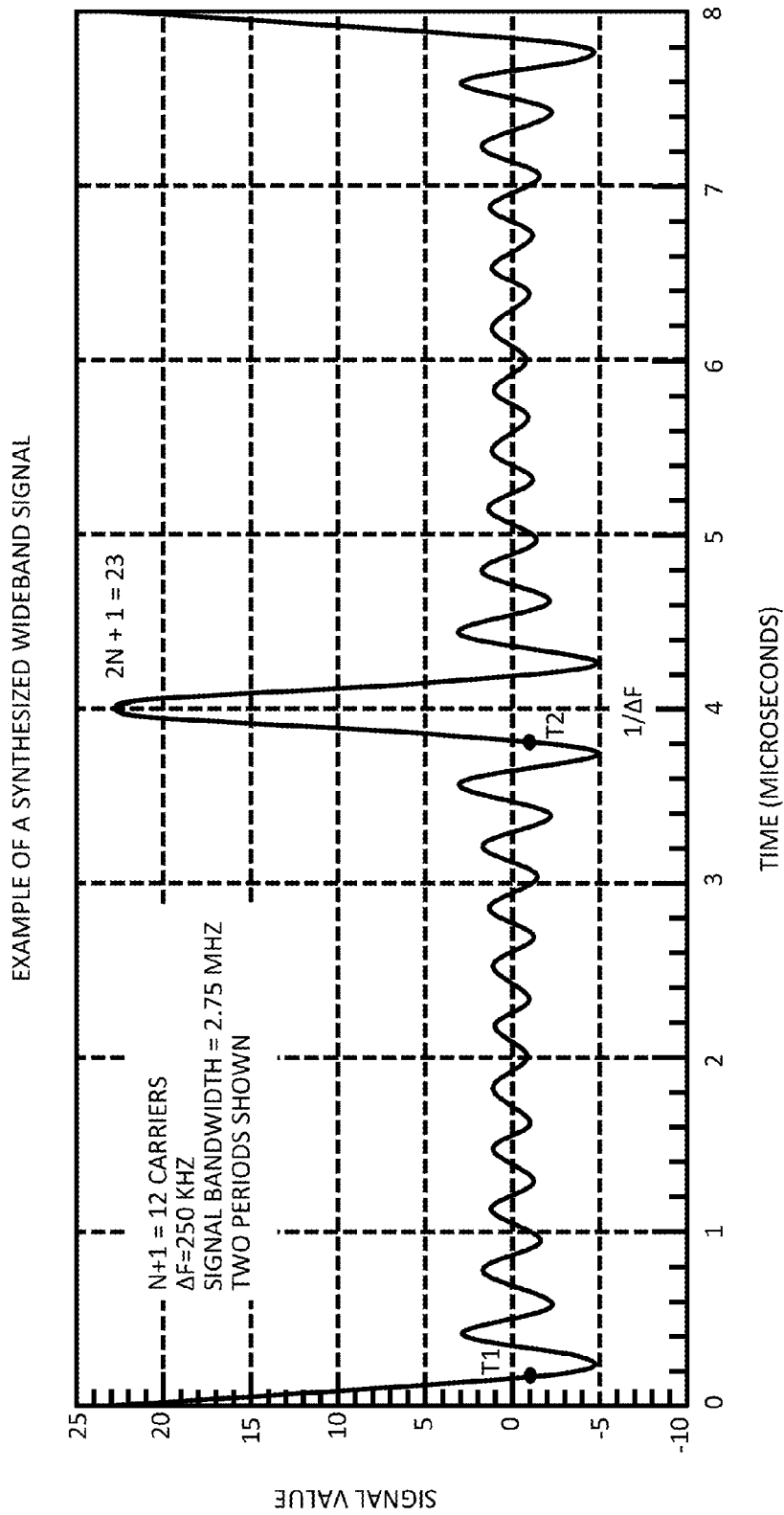
FIG. 4 illustrates an exemplary synthesized wideband base band ranging signal.

FIG. 4 shows two periods of s(t) for the case where $N=11$ and $\Delta f = 250$ kHz. The signal appears as a sequence of pulses of height $2N+1=23$ separated by $1/\Delta f=4$ microseconds. Between the pulses is a sinusoidal waveform with varying amplitude and 2N zeros. The wide bandwidth of the signal can be attributed to the narrowness of the tall pulses. It can be also seen that the bandwidth extends from zero frequency to $N\Delta f=2.75$ MHz.

The basic idea of the thresholded method that is used in the preferred embodiment is to enhance the artificially generated synthetic wider bandwidth ranging reliability and accuracy in distinguishing DLOS path from other MP paths. The threshold method detects when the start of the leading edge of a wideband pulse arrives at a receiver. Because of filtering in the transmitter and receiver, the leading edge does not rise instantaneously, but rises out of the noise with smoothly increasing slope. The TOA of the leading edge is measured by detecting when the leading edge crosses a predetermined threshold T.

A small threshold is desirable because it gets crossed sooner and the error delay r between the true start of the pulse and the threshold crossing is small. Thus, any pulse replica arriving due to multi-path has no effect if the start of the replica having a delay greater than r. However, the presence of noise places a limit on how small the threshold T can be. One way to decrease the delay r is to use the derivative of the received pulse instead of the pulse itself, because the derivative rises faster. The second derivative has an even faster rise. Higher order derivatives might be used, but in practice they can raise the noise level to an unacceptable value, so the thresholded second derivative is used.

Although the 2.75 MHz wide signal depicted in FIG. 4 has a fairly wide bandwidth, it is not suitable for measuring range by the abovementioned method. That method requires transmitted pulses each having a zero-signal precursor. However, it is possible to achieve that goal by modifying the signal so that the sinusoidal waveform between the pulses is essentially cancelled out. In the preferred embodiment it is done by constructing a waveform which closely approximates the signal on a chosen interval between the tall pulses, and then subtracting it from the original signal.

The technique can be illustrated by applying it to the signal in FIG. 1. The two black dots shown on the waveform are the endpoints of an interval I centered between the first two pulses. The left and right endpoints of the interval I, which have been experimentally determined to provide the best results, are respectively at:

$$t_1 = \frac{1.1}{(2N+1)\Delta f} = \frac{1.1}{23 \times 250{,}000} \cong 191.3 \text{ nsec} \quad (12)$$

$$t_2 = \frac{1}{\Delta f} - t_1 = \frac{1}{250{,}000} - \frac{1.1}{23 \times 250{,}000} \cong 3{,}808.7 \text{ nsec}$$

An attempt to generate a function g(t) which essentially cancels out the signal s(t) on this interval, but does not cause much harm outside the interval, is performed. Since the expression (11) indicates that s(t) is the sinusoid sin π(2N+1)Δft modulated by 1/sin πΔft, first a function h(t) which closely approximates 1/sin πΔft on the interval I is found, and then form g(t) as the product:

$$g(t)=h(t)\sin \pi(2N+1)\Delta ft \quad (13)$$

h(t) is generated by the following sum:

$$h(t) = \sum_{k=0}^{M} a_k \phi_k(t) dt, \, t \in I \quad (14)$$

where $$\varphi_0(t)=1, \varphi_k(t)=\sin k\pi\Delta ft \text{ for } k=1,2,\ldots,M \quad (15)$$

and the coefficients $a_k$ are chosen to minimize the least-square error $$J = \int_{t_1}^{t_2} \left( 1/\sin\pi\Delta ft - \sum_{k=0}^{M} a_k \phi_k(t) \right)^2 dt \quad (16)$$

over the interval I.

The solution is readily obtained by taking partial derivatives of J with respect to the $a_k$ and setting them equal to zero. The result is the linear system of M+1 equations $$\sum_{k=0}^{M} a_k R_{jk} = R_j, \, j = 0, 1, 2, \ldots, M \quad (17)$$

that can be solved for the $a_k$, where $$R_j = \int_{t_1}^{t_2} \phi_j \cdot 1/\sin\pi\Delta ft \, dt, \, R_{jk} = \int_{t_1}^{t_2} \phi_j(t)\phi_k(t) dt \quad (18)$$

Then, $$g(t) = h(t)\sin\pi(2N+1)\Delta ft \quad (19)$$

$$= \left( \sum_{k=0}^{M} a_k \phi_k(t) \right) \sin\pi(2N+1)\Delta ft$$

Using the definition of the functions $\varphi_k(t)$ given by (12)

$$g(t) = \left( a_0 + \sum_{k=0}^{M} a_k \sin k\pi\Delta ft \right) \sin\pi(2N+1)\Delta ft \quad (20)$$

Figure 5:
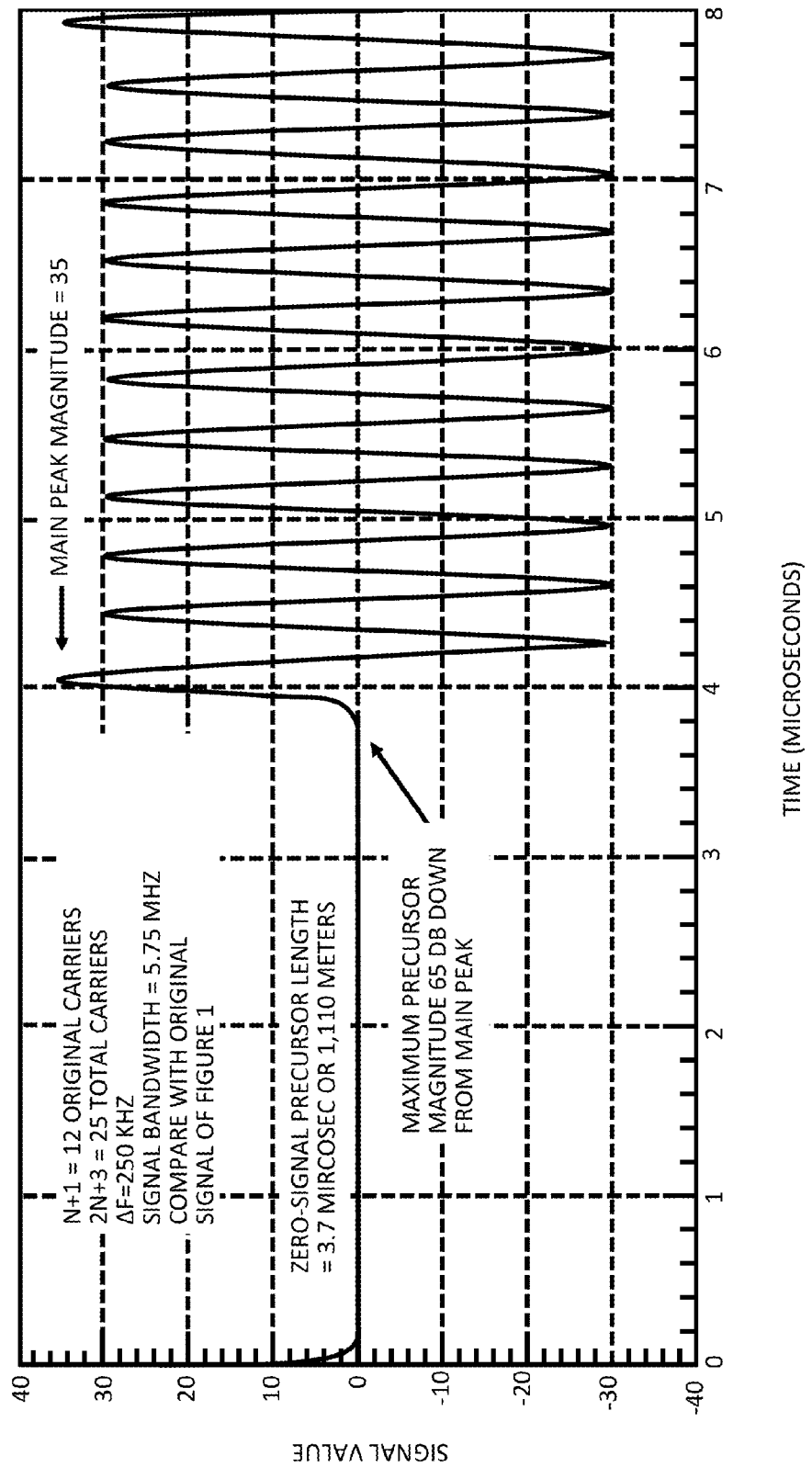
FIG. 5 illustrates elimination of signal precursor by cancellation, in accordance with the embodiment.

The g(t) is subtracted from s(t) to get a function r(t), which should essentially cancel s(t) on the interval I. As indicated in the Appendix, an appropriate choice for the upper limit M for the summation in the equation (20) is M=2N+1. Using this value and the results from the Appendix, $$r(t) = s(t) - g(t) \quad (21)$$

$$= b_0 + \sum_{k=1}^{2N+1} b_k \cos 2\pi k \Delta ft + c\sin 2\pi \left( N + \frac{1}{2} \right) \Delta ft$$

where $b_0 = 1 - \frac{1}{2}a_{2N+1}$ $b_k = 2 - \frac{1}{2}a_{2(N-k)+1}$ for $k=1,2,\ldots,N$ $b_k = -\frac{1}{2}a_{2(k-N)-1}$ for $k=N+1, N+2, \ldots, 2N+1$ $c = -a_0 \quad (22)$ From the equation (17) it is seen that a total of 2N+3 frequencies (including the zero-frequency DC term) are required to obtain the desired signal r(t). FIG. 5 shows the resulting signal r(t) for the original signal s(t) shown in FIG. 1, where N=11. In this case the construction of r(t) requires 25 carriers (including the DC term $b_0$).

The important characteristics of r(t) as constructed above are as follows:

1. The lowest frequency is zero Hz and the highest frequency is (2N+1)Δf Hz, as seen from (14). Thus, the total bandwidth is (2N+1)Δf Hz.

2. All carriers are cosine functions (including DC) spaced Δf apart, except for one carrier, which is a sine function located at frequency (N+½)Δf.

3. Although the original signal s(t) has period 1/Δf, r(t) has period 2/Δf. The first half of each period of r(t), which is a full period of s(t), contains a cancelled portion of the signal, and the second half-period of r(t) is a large oscillatory segment. Thus, cancellation of the precursor occurs only in every other period of s(t).

This occurs because the canceling function g(t) actually strengthens s(t) in every other period of s(t). The reason is that g(t) reverses its polarity at every peak of s whereas s(t) does not. A method of making every period of s(t) contain a cancelled portion to increase processing gain by 3 dB is described below.

4. The length of the cancelled portion of s(t) is about 80-90% of $1/\Delta f$. Therefore, $\Delta f$ needs to be small enough to make this length long enough to eliminate any residual signal from previous non-zero portions of r(t) due to multi-path.

5. Immediately following each zero portion of r(t) is the first cycle of an oscillatory portion. In the preferred embodiment, in the TOA measurement method as described above, the first half of this cycle is used for measuring TOA, specifically the beginning of its rise. It is interesting to note that the peak value of this first half-cycle (which will be called the main peak) is somewhat larger than the corresponding peak of s(t) located at approximately the same point in time. The width of the first half-cycle is roughly inversely proportional to $N\Delta f$.

6. A large amount of processing gain can be achieved by:
(a) Using the repetitions of the signal r(t), because r(t) is periodic with period $2/\Delta f$. Also, an additional 3 dB of processing gain is possible by a method to be described later.
(b) Narrowband filtering. Because each of the 2N+3 carriers is a narrowband signal, the occupied bandwidth of the signal is much smaller than that of a wideband signal spread out across the entire allocated band of frequencies.

For the signal r(t) shown in FIG. 5, where N=11 and $\Delta f$=250 kHz, the length of the cancelled portion of s(t) is about 3.7 microseconds or 1,110 meters. This is more than enough to eliminate any residual signal from previous non-zero portions of r(t) due to the multi-path. The main peak has value of approximately 35, and the largest magnitude in the precursor (i.e., cancellation) region is about 0.02, which is 65 dB below the main peak. This is desirable for getting good performance using the TOA measurement thresholded technique as described above.

Figure 6:
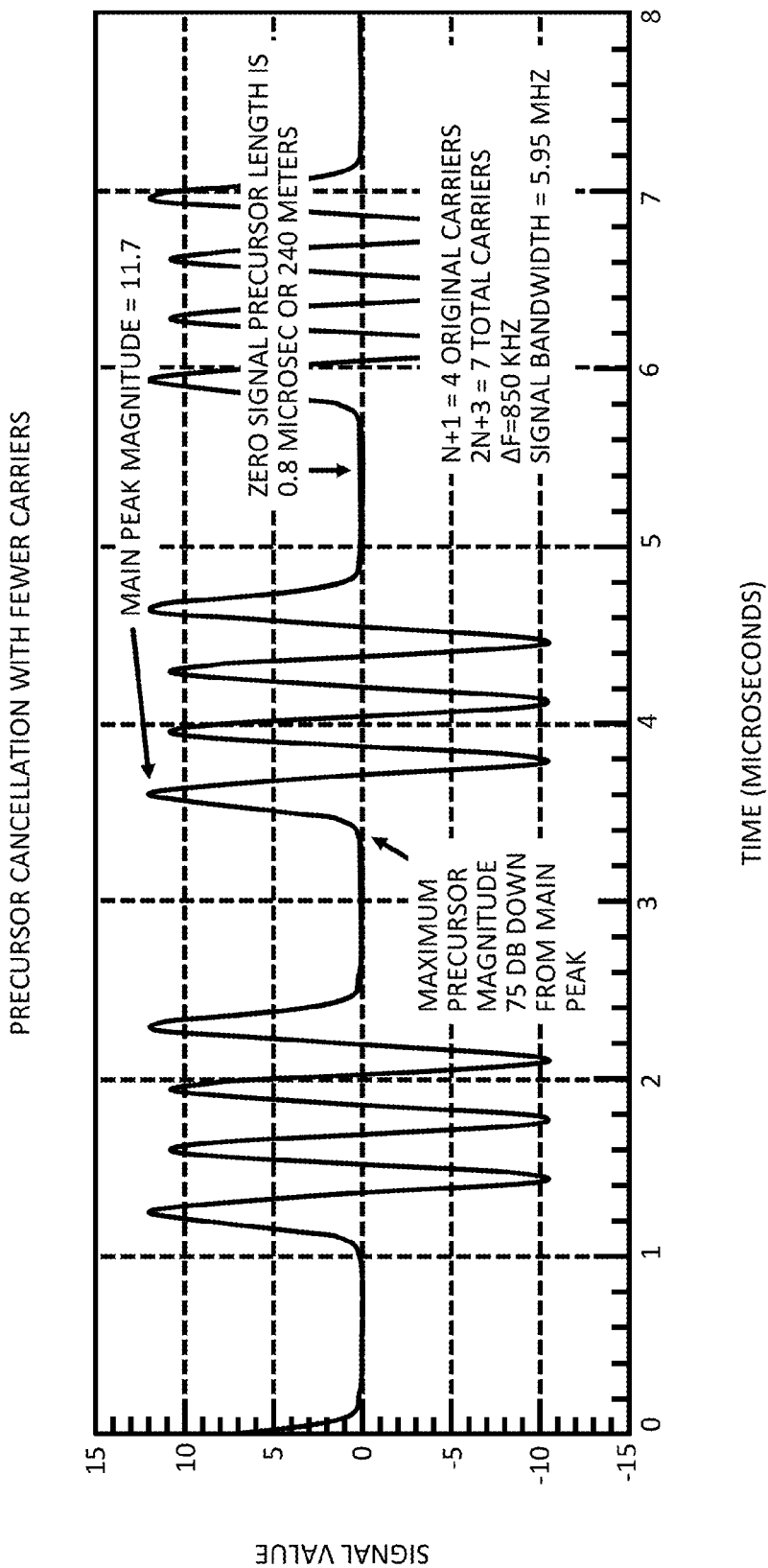
FIG. 6 illustrates precursor cancellation with fewer carriers, in accordance with the embodiment.

Use of fewer carriers is depicted in FIG. 6, which illustrates a signal that is generated using $\Delta f$=850 kHz, N=3, and M=2N+1=7, for a total of only 2N+3=9 carriers. In this case, the period of the signal is only $2/\Delta f \cong 2.35$ microseconds as compared to the signal in FIG. 5, where the period is 8 microseconds. Since this example has more periods per unit time, one might expect that more processing gain could be achieved.

However, since fewer carriers are used, the amplitude of the main peak is about ⅓ as large as before, which tends to cancel the expected extra processing gain. Also, the length of the zero-signal precursor segments is shorter, about 0.8 microseconds or 240 meters. This should still be enough to eliminate any residual signal from previous non-zero portions of r(t) due to the multi-path. Note that the total bandwidth of $(2N+1)\Delta f$=5.95 MHz is about the same as before, and that the width of the half-cycle of the main peak is also roughly the same. Since fewer carriers are used, there should be some extra processing gain when each carrier is narrowband filtered at the receiver. Moreover, the largest magnitude in the precursor (i.e., cancellation) region is now about 75 dB below the main peak, a 10 dB improvement from the previous example.

Transmission at RF Frequencies: up to this point r(t) has been described as a base-band signal for purposes of simplicity. However, it can be translated up to RF, transmitted, received, and then reconstituted as a base-band signal at the receiver. To illustrate, consider what happens to one of the frequency components $\omega_k$ in the base-band signal r(t) traveling via one of the multi-path propagation paths having index j (radian/sec frequencies are used for notational simplicity):

$b_k \cos \omega_k t$ (at baseband in transmitter)

$b_k \cos(\omega+\omega_k)t$ (translated by frequency $\omega$ up to RF)

$a_j b_k \cos [(\omega+\omega_k)(t-\tau_j)+\varphi_j]$ (at receiver antenna)

$a_j b_k \cos [\omega_k(t-\tau_j)+\varphi_j+\theta]$ (translated by frequency $-\omega$ to baseband) (23)

It is assumed here that the transmitter and receiver are frequency synchronized. The parameter $b_k$ is the $k^{th}$ coefficient in expression (21) for r(t). The parameters $\tau_j$ and $\varphi_j$ are respectively the path delay and phase shift (due to dielectric properties of a reflector) of the $j^{th}$ propagation path. The parameter $\theta$ is the phase shift occurring in the down-conversion to base-band in the receiver. A similar sequence of functions can be presented for the sine component of the equation (21).

It is important to note that as long as the zero-signal precursors in r(t) have length sufficiently larger than the largest significant propagation delay, the final base-band signal in the equation (20) will still have zero-signal precursors. Of course, when all frequency components (index k) over all paths (index j) are combined, the base-band signal at the receiver will be a distorted version of r(t), including all phase shifts.

Sequential Carrier Transmissions and Signal Reconstruction are illustrated in FIG. 1 and FIG. 1A. It is assumed that the transmitter and the receiver are time and frequency synchronized, the 2N+3 transmitted carriers need not be transmitted simultaneously. As an example, consider the transmission of the signal whose base-band representation is that of FIG. 1A and FIG. 6.

In FIG. 6 N=3, and suppose each of the 9 frequency components for 1 millisecond are sequentially transmitted. The start and the end times for each frequency transmission are known at the receiver, so it can sequentially start and end its reception of each frequency component at those respective times. Since the signal propagation time is very short compared to 1 millisecond (it will normally be less than several microseconds in the intended application), a small portion of each received frequency component should be ignored, and the receiver can easily blank it out.

The entire process of receiving 9 frequency components can be repeated in 9-millisecond blocks of additional reception to increase the processing gain. In one second of total reception time there would be about 111 such 9-millisecond blocks available for processing gain. Additionally, within each block there would be additional processing gain available from $0.009/(2/\Delta f)=383$ main peaks.

It is worth noting that in general the signal reconstruction can be made very economical, and will inherently permit all possible processing gain. For each of the 2N+3 received frequencies:
1. Measure the phase and amplitude of each 1-millisecond reception of that frequency to form a sequence of stored vectors (phasors) corresponding to that frequency.
2. Average the stored vectors for that frequency.
3. Finally, use the 2N+3 vector averages for the 2N+3 frequencies to reconstruct 1 period of base-band signal having duration $2/\Delta f$, and use the reconstruction to estimate signal TOA.

This method is not restricted to 1-millisecond transmissions, and the length of the transmissions may be increased or decreased. However, the total time for all transmissions should be short enough to freeze any motion of the receiver or transmitter.

Obtaining Cancellation on Alternate Half-Cycles of r(t): by simply reversing the polarity of the canceling function g(t), cancellation between the peaks of s(t) is possible where r(t) was formerly oscillatory. However, to obtain cancellation between all peaks of s(t), the function g(t) and its polarity reversed version must be applied at the receiver, and this involves coefficient weighting at the receiver.

Coefficient Weighting at the Receiver: if desired, the coefficients $b_k$ in the equation (21) are used for construction of r(t) at the transmitter and may be introduced at the receiver instead. This is easily seen by considering the sequence of signals in the equation (20) in which the final signal is the same if $b_k$ is introduced at the last step instead of at the beginning. Ignoring noise, the values are as follows:

$\cos \omega_k t$ (at baseband in transmitter)

$\cos(\omega+\omega_k)t$ (translated by frequency $\omega$ up to RF)

$a_j \cos [(\omega+\omega_k)(t-\tau_i)+\varphi_j]$ (at receiver antenna)

$a_j \cos [\omega_k(t-\tau_j)+\varphi_j+\theta]$ (translated by frequency $-\omega$ to baseband)

$a_j b_k \cos [\omega_k(t-\tau_j)+\varphi_j+\theta]$ (weighted by coefficient $b_k$ at baseband) (24)

The transmitter can then transmit all frequencies with the same amplitude, which simplifies its design. It should be noted, that this method also weights the noise at each frequency, the effect of which should be considered. It should also be noted that coefficient weighting should be done at the receiver in order to effect the polarity reversal of g(t) to get twice as many useable main peaks.

Scaling of $\Delta f$ to Center Frequencies in Channels: to meet the FCC requirements at the VHF or lower frequencies a channelized transmission with constant channel spacing will be required. In a channelized transmission band with constant channel spacing that is small compared to the total allocated band, which is the case for the VHF and lower frequencies band(s), small adjustments to $\Delta f$, if necessary, permit all transmitted frequencies to be at channel centers without materially changing performance from original design values. In the two examples of base-band signals previously presented, all frequency components are multiples of $\Delta f/2$, so if the channel spacing divides $\Delta f/2$, the lowest RF transmitted frequency can be centered in one channel and all other frequencies fall at the center of channels.

In some Radio Frequency (RF)-based identification, tracking and locating systems in addition to performing the distance measurement function, both: the Master Unit and the Tag Unit also perform voice, data and control communication functions. Similarly, in the preferred embodiment both the Master Unit and the Tag perform voice, data and control communication functions in addition to the distance measurement function.

According to the preferred embodiment, the ranging signal(s) are subject to the extensive sophisticated signal processing techniques, including the multi-path mitigation. However, these techniques may not lend themselves to the voice, data and control signals. As a result, the operating range of the proposed system (as well as other existing systems) may be limited not by its ability to measure distance reliably and accurately, but by being out of range during voice and/or data and/or control communications.

In other Radio Frequency (RF)-based identification, tracking and locating systems the distance measurement functionality is separated from the voice, data and control communication functionality. In these systems separate RF Transceivers are used to perform voice, data and control communication functions. The drawback of this approach is system increased cost, complexity, size, etc.

To avoid abovementioned drawbacks, in the preferred embodiment, a narrow bandwidth ranging signal or baseband narrow bandwidth ranging signal several individual frequency components are modulated with the identical data/control signals and in case of voice with digitized voice packets data. At the receiver the individual frequency components that have the highest signal strength are demodulated and the obtained information reliability may be further enhanced by performing "voting" or other signal processing techniques that utilize the information redundancy.

This method allows to avoid the "null" phenomena, wherein the incoming RF signals from multiple paths are destructively combining with the DLOS path and each other, thus significantly reducing the received signal strength and associated with it SNR. Moreover, such method allows to find a set of frequencies at which the incoming signals from multiple paths are constructively combining with DLOS path and each other, thus increasing the received signal strength and associated with it SNR.

As mentioned earlier, spectrum estimation-based super-resolution algorithms generally use the same model: a linear combination of complex exponentials and their complex amplitudes of frequencies. This complex amplitude is given by equation 3 above.

All spectrum estimation-based super-resolution algorithms require a priori knowledge of number of complex exponentials, i.e., the number of multipath paths. This number of complex exponentials is called the model size and is determined by the number of multi-path components L as shown in equations 1-3. However, when estimating path delay, which is the case for RF track-locate applications, this information is not available. This adds another dimension, i.e., the model size estimation, to the spectrum estimation process via super-resolution algorithms.

It has been shown (Kei Sakaguchi et al., Influence of the Model Order Estimation Error in the ESPRIT Based High Resolution Techniques) that in case of model size underestimation the accuracy of frequency estimation is impacted and when the model size is overestimated the algorithm generates spurious, e.g., non-existent, frequencies. Existing methods of model size estimation such as AIC (Akaikes Information Criterion), MDL (Minimum Description Length), etc. have a high sensitivity to correlation between signals (complex exponentials). But in the case of RF multipath, this is always the case. Even, for example, after Forward-Backward smoothing algorithms are applied, there will always be a residual amount of correlation.

In the Sakaguchi paper, it is suggested to use an overestimated model and differentiating actual frequencies (signals) from spurious frequencies (signals) by estimating these signals power (amplitude) and then rejecting the signals with very low power. Although this method is an improvement over existing methods, it is not guaranteed. The inventors implemented the Kei Sakaguchi et al. method and ran simulations for more complex cases with a larger model size. It was observed that, in some cases, a spurious signal may have amplitude that is very close to actual signals amplitude.

All spectrum estimation-based super-resolution algorithms work by splitting the incoming signal complex amplitude data into two sub-spaces: the noise sub-space and signals sub-space. If these sub-spaces are properly defined (separated), then the model size is equal to the signal sub-space size (dimension).

In one embodiment, the model size estimation is accomplished using an "F" statistic. For example, for ESPRIT algorithm, the singular value decomposition of the estimate of the covariance matrix (with forward/backward correlation smoothing) is ordered in ascending order. Thereafter, a division is made whereby the (n+1) eigenvalue is divided by the n-th eigenvalue. This ratio is an "F" random variable. The worst case is an "F" random variable of (1,1) degree of freedom. The 95% confidence interval for a "F" random variable with (1,1) degrees of freedom is 161. Setting that value as a threshold determines the model size. Note also that for the noise subspace, the eigenvalues represent an estimate of the noise power.

This method of applying "F" statistics to the ratio of the eigenvalues is a more accurate method of estimating the model size. It should be noted that other degrees of freedom in "F" statistics can be also used for threshold calculation and consequently model size estimation.

Nevertheless, in some cases, two or more very closely spaced (in time) signals can degenerate into one signal because of real-world measurement imperfections. As a result, the above mentioned method will underestimate the number of signals, i.e., the model size. Since model size underestimation reduces the frequency estimation accuracy, it is prudent to increase the model size by adding a certain number. This number can be determined experimentally and/or from simulations. However, when signals are not closely spaced, the model size will be overestimated.

In such cases spurious, i.e., non-existent, frequencies may appear. As noted earlier, using signal amplitude for spurious signals detection does not always work because in some cases a spurious signal(s) was observed to have amplitude that is very close to actual signal(s) amplitude. Therefore, in addition to the amplitude discrimination, filters can be implemented to improve spurious frequencies elimination probability.

The frequencies that are estimated by super-resolution algorithms are artificial frequencies (equation 2). In fact, these frequencies are individual paths delays of the multipath environment. As a result, there should be no negative frequencies and all negative frequencies that are produced by a super-resolution algorithm are spurious frequencies to be rejected.

Furthermore, a DLOS distance range can be estimated from the complex amplitude $\hat{A}(f_n)$ values obtained during measurements using methods that are different from super-resolution methods. While these methods have lower accuracy, this approach establishes range that is used to discriminate delays, i.e., frequencies. For example, the ratio of $$\frac{\Delta[\angle\hat{A}(2\pi\Delta f)]}{2\pi\Delta f}$$

in $\Delta f$ intervals where the signal amplitude $|\hat{A}(f_n)|$ is close to maximum, i.e., avoiding nulls, provides a DLOS delay range. Although actual DLOS delay can be up to two times larger or smaller, this defines a range that helps to reject spurious results.

In the embodiment, the ranging signal makes a round-trip. In other words, it travels both ways: from a master/reader to a target/slave and from the target/slave back to the master/reader:

Master transmits a tone: $\alpha \times e^{-j\omega t}$, where $\omega$ is an operating frequency in the operating band and $\alpha$ is the tone signal amplitude.

At the target's receiver, the received signal (one-way) is as follows:

$$S_{one-way}(t) = \alpha \times \sum_{m=0}^{m=N} K_m \times e^{-j\omega t} \times e^{-j\omega \tau_m} \quad (25)$$

Where: N is number of signal paths in the multipath environment; K0 and $\tau_0$ are amplitude and time-of-flight of the DLOS signal; $|K_0|=1$, $K_0>0$, $|K_{m \neq 0}| \leq 1$ and $K_{m \neq 0}$ can be positive or negative.

$$S_{one-way}(t) = \alpha \times e^{-j\omega t} \times A(\omega) \times e^{-j\theta(\omega)} \quad (26)$$

Where:

$$A(\omega) \times e^{-j\theta(\omega)} = \sum_{m=0}^{m=N} K_m \times e^{-j\omega \tau_m}$$

is one way multipath RF channel transfer function in the frequency domain; and $A(\omega) \geq 0$.

Target retransmits the received signal:

$$S_{retransmit} = \alpha \times e^{-j\omega t} \times A(\omega) \times e^{-j\theta(\omega)} \quad (27)$$

At the master receiver, the round-trip signal is:

$$S_{round\_trip}(t) = \alpha \times e^{-j\omega t} \times A(\omega) \times e^{-j\theta(\omega)} \times \sum_{m=0}^{m=N} K_m \times e^{-j\omega \tau_m}$$

Or:

$$S_{round\_trip}(t) = \alpha \times e^{-j\omega t} \times A^2(\omega) \times e^{-j2\theta(\omega)} \quad (28)$$

On the other hand from equations (26) and (28):

$$S_{round\_trip}(t) = \alpha \times e^{-j\omega t} \times A^2(\omega) \times \left(\sum_{m=0}^{m=N} K_m \times e^{-j\omega \tau_m}\right)^2 \quad (29)$$

Where:

$$A^2(\omega) \times \left(\sum_{m=0}^{m=N} K_m \times e^{-j\omega \tau_m}\right)^2 = A^2(\omega) \times e^{-j2\theta(\omega)}$$

is roundtrip multipath RF channel transfer function in the frequency domain.

From equation 29, the roundtrip multipath channel has a larger number of paths than one-way channel multipath because the $$\left(\sum_{m=0}^{m=N} K_m \times e^{-j\omega \tau_m}\right)^2$$

expression in addition to the $\tau_0 \div \tau_N$ paths delays, includes combinations of these paths delays, for example: $\tau_0+\tau_1$, $\tau_0+\tau_2 \ldots$, $\tau_1+\tau_2$, $\tau_1+\tau_2$, ..., etc.

These combinations dramatically increase the number of signals (complex exponentials). Hence the probability of very closely spaced (in time) signals will also increase and may lead to significant model size underestimation. Thus, it is desirable to obtain one-way multipath RF channel transfer function.

In preferred embodiment, the one-way amplitude values $|\hat{A}(f_n)|$ are directly obtainable from target/slave device. However, the one-way phase values $\angle \hat{A}(f_n)$ cannot be measured directly. It is possible to determine the phase of the one-way from the roundtrip phase measurements observation:

$$\left(\sum_{m=0}^{m=N} K_m \times e^{-j\omega\tau_m}\right)^2 = e^{-j2\theta(\omega)} \text{ and } \left(\sum_{m=0}^{m=N} K_m \times e^{-j\omega\tau_m}\right) = e^{-j\theta(\omega)}$$

However, for each value of $\omega$, there are two values of phase $\alpha(\omega)$ such that $$e^{j2\alpha(\omega)} = e^{j\beta(\omega)}$$

A detailed description of resolving this ambiguity is shown below. If the ranging signal different frequency components are close to each other, then for most part the one-way phase can be found by dividing the roundtrip phase by two. Exceptions will include the areas that are close to the "null", where the phase can undergo a significant change even with small frequency step. Note: the "null" phenomena is where the incoming RF signals from multiple paths are destructively combining with the DLOS path and each other, thus significantly reducing the received signal strength and associated with it SNR.

Let h(t) be the one-way impulse response of a communications channel. The corresponding transfer function in the frequency domain is $$H(\omega) = \int_{-\infty}^{\infty} h(t)e^{-j\omega t} dt = A(\omega)e^{j\alpha(\omega)} \tag{30}$$

where $A(\omega) \geq 0$ is the magnitude and $\alpha(\omega)$ is the phase of the transfer function. If the one-way impulse response is retransmitted back through the same channel as it is being received, the resulting two-way transfer function is $$G(\omega) = B(\omega)e^{j\beta(\omega)} = H^2(\omega) = A^2(\omega)e^{j2\alpha(\omega)} \tag{31}$$

where $B(\omega) \geq 0$. Suppose the two-way transfer function $G(\omega)$ is known for all $\omega$ in some open frequency interval $(\omega_1, \omega_2)$. Is it possible to determine the one-way transfer function $H(\omega)$ defined on $(\omega_1, \omega_2)$ that produced $G(\omega)$?

Since the magnitude of the two-way transfer function is the square of the one-way magnitude, it is clear that $$A(\omega) = \sqrt{B(\omega)} \tag{32}$$

However, in trying to recover the phase of the one-way transfer function from observation of $G(\omega)$, the situation is more subtle. For each value of $\omega$, there are two values of phase $\alpha(\omega)$ such that $$e^{j2\alpha(\omega)} = e^{j\beta(\omega)} \tag{33}$$

A large number of different solutions might be generated by independently choosing one of two possible phase values for each different frequency $\omega$.

The following theorems, which assume that any one-way transfer function is continuous at all frequencies, help resolve this situation.

Theorem 1:

Let I be an open interval of frequencies $\omega$ containing no zeros of the two-way transfer function $G(\omega) = B(\omega)e^{j\beta(\omega)}$. Let $J(\omega) = \sqrt{B(\omega)}e^{j\gamma(\omega)}$ be a continuous function on I where $\beta(\omega) = 2\gamma(\omega)$. Then $J(\omega)$ and $-J(\omega)$ are the one-way transfer functions which produce $G(\omega)$ on I, and there are no others.

Proof: One of the solutions for the one-way transfer function is the function $H(\omega) = \sqrt{B(\omega)}e^{j\alpha(\omega)}$, continuous on I since it is differentiable on I, and where $\beta(\omega) = 2\alpha(\omega)$. Since $G(\omega) \neq 0$ on I, $H(\omega)$ and $J(\omega)$ are nonzero on I. Then, $$\frac{H(\omega)}{J(\omega)} = \frac{\sqrt{B(\omega)}\,e^{j\alpha(\omega)}}{\sqrt{B(\omega)}\,e^{j\gamma(\omega)}} = e^{j[\alpha(\omega)-\gamma(\omega)]} \tag{34}$$

Since $H(\omega)$ and $J(\omega)$ are continuous and nonzero on I, their ratio is continuous on I, hence the right side of (34) is continuous on I. The conditions $\beta(\omega) = 2\alpha(\omega) = 2\gamma(\omega)$ imply that for each $\omega \in I$, $\alpha(\omega) - \gamma(\omega)$ is either 0 or $\pi$. However, $\alpha(\omega) - \gamma(\omega)$ cannot switch between these two values without causing a discontinuity on the right side of (34). Thus, either $\alpha(\omega) - \gamma(\omega) = 0$ for all $\omega \in I$, or $\alpha(\omega) - \gamma(\omega) = \pi$ for all $\omega \in I$. In the first case, we get $J(\omega) = H(\omega)$, and in the second we get $J(\omega) = -H(\omega)$.

This theorem proves that to get a one-way solution on any open interval I containing no zeros of the transfer function $G(\omega) = B(\omega)e^{j\beta(\omega)}$, we form the function $J(\omega) = \sqrt{B(\omega)}e^{j\gamma(\omega)}$, choosing the values of $\gamma(\omega)$ satisfying $\beta(\omega) = 2\gamma(\omega)$ in such a way as to make $J(\omega)$ continuous. Since it is known that there is a solution having this property, namely $H(\omega)$, it is always possible to do this.

An alternate procedure for finding a one-way solution is based on the following theorem:

Theorem 2:

Let $H(\omega) = A(\omega)e^{j\alpha(\omega)}$ be a one-way transfer function and let I be an open interval of frequencies $\omega$ containing no zeros of $H(\omega)$. Then the phase function $\alpha(\omega)$ of $H(\omega)$ must be continuous on I.

Figure 7:
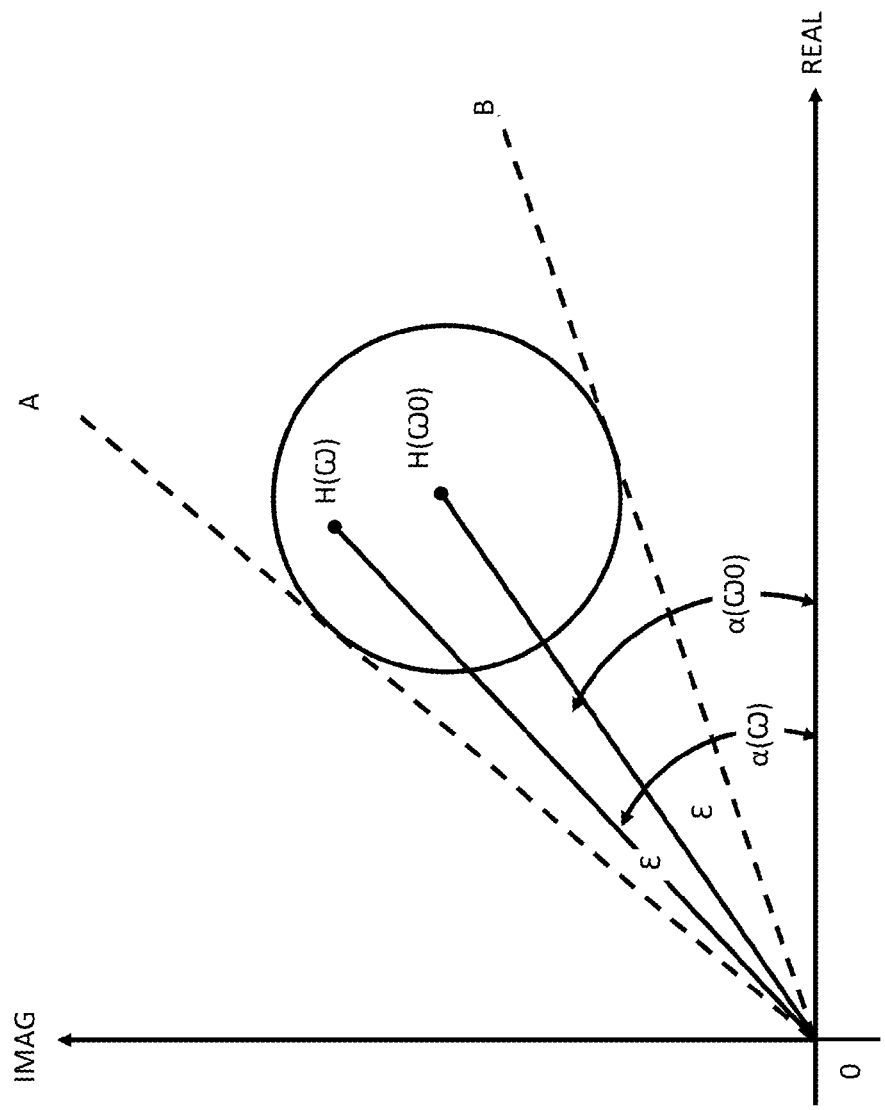
FIG. 7 illustrates a one-way transfer function phase.
Figure 8:
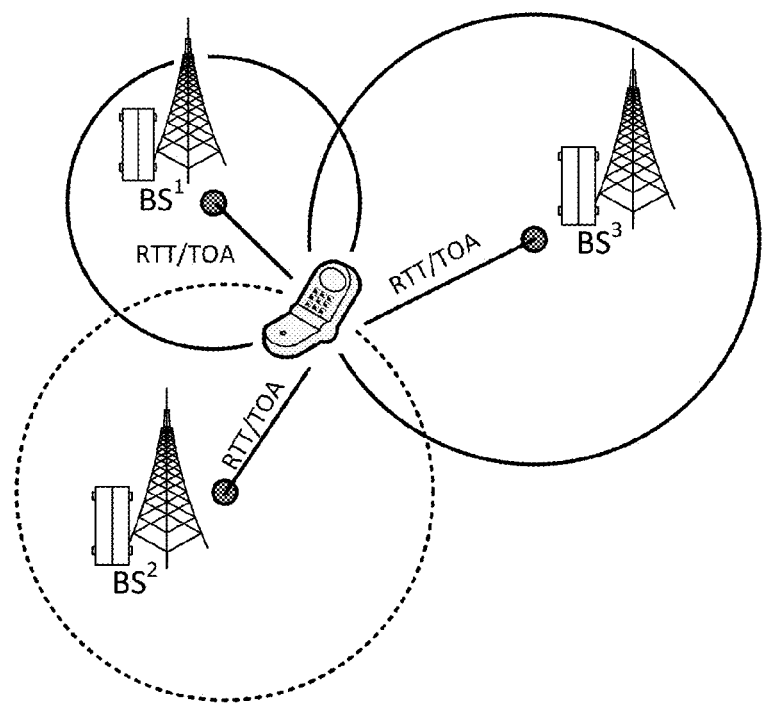
FIG. 8 illustrates an embodiment location method.

Proof: Let $\varphi_0$ be a frequency in the interval I. In FIG. 7, the complex value $H(\omega_0)$ has been plotted as a point in the complex plane, and by hypothesis, $H(\omega_0) \neq 0$. Let $\in > 0$ be an arbitrarily small real number, and consider the two angles of measure $\in$ shown in the FIG. 7, as well as the circle centered at $H(\omega_0)$ and tangent to the two rays OA and OB. By assumption, $H(\omega)$ is continuous for all $\omega$. Thus, if $\omega$ is sufficiently close to $\omega_0$, the complex value $H(\omega)$ will lie in the circle, and it is seen that $|\alpha(\omega) - \alpha(\omega_0)| < \in$. Since $\in > 0$ was chosen arbitrarily, we conclude that $\alpha(\omega) \to \alpha(\omega_0)$ as $\omega > \omega_0$, so that the phase function $\alpha(\omega)$ is continuous at $\omega_0$.

Theorem 3:

Let I be an open interval of frequencies $\omega$ containing no zeros of the two-way transfer function $G(\omega) = B(\omega)e^{j\beta(\omega)}$. Let $J(\omega) = \sqrt{B(\omega)}e^{j\gamma(\omega)}$ be a function on I where $\beta(\omega) = 2\gamma(\omega)$ and $\gamma(\omega)$ is continuous on I. Then $J(\omega)$ and $-J(\omega)$ are the one-way transfer functions which produce $G(\omega)$ on I, and there are no others.

Proof: The proof is similar to the proof of Theorem 1. We know that one of the solutions for the one-way transfer function is the function $H(\omega) = \sqrt{B(\omega)}e^{j\alpha(\omega)}$, where $\beta(\omega) = 2\alpha(\omega)$. Since $G(\omega) \neq 0$ on I, $H(\omega)$ and $J(\omega)$ are nonzero on I. Then, $$\frac{H(\omega)}{J(\omega)} = \frac{\sqrt{B(\omega)}\,e^{j\alpha(\omega)}}{\sqrt{B(\omega)}\,e^{j\gamma(\omega)}} = e^{j[\alpha(\omega)-\gamma(\omega)]} \tag{35}$$

By hypothesis γ(ω) is continuous on I and by Theorem 2 α(ω) is also continuous on I. Thus, α(ω)–γ(ω) is continuous on I. The conditions β(ω)=2α(ω)=2γ(ω) imply that for each ω∈I, α(ω)–γ(ω) is either 0 or π. However, α(ω)–γ(ω) cannot switch between these two values without becoming discontinuous on I. Thus, either α(ω)–γ(ω)=0 for all ω∈I, or α(ω)–γ(ω)=π for all ω∈I. In the first case, we get J(ω)=H(ω), and in the second J(ω)=–H(ω).

Theorem 3 tells us that to get a one-way solution on any open interval I containing no zeros of the transfer function G(ω)=B(ω)e$^{jβ(ω)}$, we simply form the function J(ω)=√B(ω)e$^{jγ(ω)}$, choosing the values of γ(ω) satisfying β(ω)=2γ(ω) in such a way as to make the phase function γ(ω) continuous. Since it is known that there is a solution having this property, namely H(ω), it is always possible to do this.

Although the above theorems show how to reconstruct the two one-way transfer functions which generate the two-way function G(ω), they are useful only on a frequency interval I containing no zeros of G(ω). In general, G(ω) will be observed on a frequency interval ($ω_1$, $ω_2$) which may contain zeros. The following is a method that might get around this problem, assuming that there are only a finite number of zeros of G(ω) in ($ω_1$, $ω_2$), and that a one-way transfer function has derivatives of all orders on ($ω_1$,$ω_2$), not all of which are zero at any given frequency ω:

Let H(ω) be a one-way function that generates G(ω) on the interval ($ω_1$,$ω_2$) and assume that G(ω) has at least one zero on ($ω_1$,$ω_2$). The zeros of G(ω) will separate ($ω_1$,$ω_2$) into a finite number of abutting open frequency intervals $J_1$, $J_2$, ..., $J_n$. On each such interval the solution H(ω) or –H(ω) will be found using either Theorem 1 or Theorem 3. We need to "stitch together" these solutions so that the stitched solution is either H(ω) or –H(ω) across all of ($ω_1$,$ω_2$). In order to do this, we need to know how to pair the solutions in two adjacent subintervals so that we aren't switching from H(ω) to –H(ω)) or from –H(ω) to H(ω) in moving from one subinterval to the next.

We illustrate the stitching procedure starting with the first two adjacent open subintervals $J_1$ and $J_2$. These subintervals will abut at a frequency $ω_1$ which is a zero of G(ω) (of course, $ω_1$ is not contained in either subinterval). By our above assumption about the properties of a one-way transfer function, there must be a minimum positive integer n such that H$^{(n)}$($ω_1$)≠0, where the superscript (n) denotes the $n^{th}$ derivative. Then the limit of the $n^{th}$ derivative of our one-way solution in $J_1$ as ω→$ω_1$ from the left will be either H$^{(n)}$($ω_1$) or –H$^{(n)}$($ω_1$) according to whether our solution in $J_1$ is H(ω) or –H(ω). Similarly, the limit of the $n^{th}$ derivative of our one-way solution in $J_2$ as ω→$ω_1$ from the right will be either H$^{(n)}$($ω_1$) or –H$^{(n)}$($ω_1$) according to whether our solution in $J_2$ is H(ω) or –H(ω). Since H$^{(n)}$($ω_1$)≠0, the two limits will be equal if and only if the solutions in $J_1$ and $J_2$ are both H(ω) or both –H(ω). If the left and right hand limits are unequal, we invert the solution in subinterval $J_2$. Otherwise, we don't.

After inverting the solution in subinterval $J_2$ (if necessary), we perform an identical procedure for subintervals $J_2$ and $J_3$, inverting the solution in subinterval $J_3$ (if necessary). Continuing in this fashion, we eventually build up a complete solution on the interval ($ω_1$,$ω_2$).

It would be desirable that high-order derivatives of H(ω) not be required in the above reconstruction procedure, since they are difficult to compute accurately in the presence of noise. This problem is unlikely to occur, because at any zero of G(ω) it seems very likely that the first derivative of H(ω) will be nonzero, and if not, very likely that the second derivative will be nonzero.

In a practical scheme, the two-way transfer function G(ω) will be measured at discrete frequencies, which must be close enough together to enable reasonably accurate computation of derivatives near the zeros of G(ω).

For RF-based distance measurements it is necessary to resolve an unknown number of closely spaced, overlapping, and noisy echoes of a ranging signal with a priori known shape. Assuming that ranging signal is a narrow-band, in frequency domain this RF phenomena can be described (modeled) as a sum of a number of sine waves, each per multipath component, and each with the complex attenuation and propagation delay of the path.

Taking the Fourier transform of the above mentioned sum will express this multipath model in the time domain. Exchanging the role of time and frequency variables in this time domain expression, this multipath model will become harmonic signals spectrum in which the propagation delay of the path is transformed to a harmonic signal.

The super (high) resolution spectral estimation methods are designed to distinguish closely placed frequencies in the spectrum and used for estimating the individual frequencies of multiple harmonic signals, e.g., paths delays. As a result, path delays can be accurately estimated.

The super resolution spectral estimation makes use of the eigen-structure of the covariance matrix of the baseband ranging signal samples and covariance matrix intrinsic properties to provide a solution to an underlying estimation of individual frequencies, e.g. paths delays. One of the eigen-structure properties is that the eigenvalues can be combined and consequently divided into orthogonal noise and signal eigenvectors, aka subspaces. Another eigen-structure property is the rotation-invariant signal subspaces property.

The subspace decomposition technology (MUSIC, root-MUSIC, ESPRIT, etc.) relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The spectral estimation methods assume that signals are narrow-band, and the number of harmonic signals is also known, i.e., the size of the signal subspace needs to be known. The size of the signal subspace is called as the model size. In general, it cannot be known in any detail and can change rapidly—particularly indoors—as the environment changes. One of the most difficult and subtle issues when applying any subspace decomposition algorithm is the dimension of the signal subspace that can be taken as the number of frequency components present, and which is the number multipath reflections plus the direct path. Because of real-world measurement imperfections there always will be an error in the model size estimation, which in turn will result in loss of accuracy of frequencies estimation, i.e., distances.

To improve the distance measurement accuracy, one embodiment includes six features that advance the state of the art in the methodology of subspace decomposition high resolution estimation. Included is combining two or more algorithms estimating individual frequencies by using different eigen-structure properties that further reduces the delay path determination ambiguity.

Root Music finds the individual frequencies, that when the observable is projected onto the noise subspace, minimizes the energy of the projection. The Esprit algorithm determines the individual frequencies from the rotation operator. And in many respects this operation is the conjugate of Music in that it finds the frequencies that, when the observable is projected onto the signal subspace, maximizes the energy of the projection.

The model size is the key to both of these algorithms, and in practice, in a complex signal environment such as seen in indoor ranging the model size which provides the best performance for Music and Esprit are in general not equal, for reasons that will be discussed below.

For Music it is preferable to err on the side of identifying a basis element of the decomposition as a "signal eigen value" (Type I Error). This will minimize the amount of signal energy that is projected on the noise subspace and improve the accuracy. For Esprit the opposite is true it is preferable to err on the side of identifying a basis element of the decomposition as a "noise eigenvalue." This is again a Type I Error. This will minimize the impact of noise on the energy projected onto the signal subspace. Therefore, the model size for Music will, in general, be somewhat larger than that for Esprit.

Secondly, in a complex signal environment, there arise occasions where, with the strong reflections and the potential that the direct path is in fact much weaker than some of the multipath reflections, the model size is difficult to estimate with sufficient statistical reliability. This issue is addressed by estimating a "base" model size for both Music and Esprit and the processing the observable data using Music and Esprit in a window of model sizes defined by the base model size for each. This results in multiple measurements for each measurement.

The first feature of the embodiment is the use of the F-statistic to estimate the model size (see above). The second feature is the use of different Type I Error probabilities in the F-statistic for Music and Esprit. This implements the Type I Error differences between Music and Esprit as discussed above. The third feature is the use of a base model size and a window in order to maximize the probability of detecting the direct path.

Because of the potentially rapidly changing physical and electronic environment, not every measurement will provide robust answers. This is addressed by using cluster analysis on multiple measurements to provide a robust range estimate. The fourth feature of the embodiment is the use of multiple measurements.

Because there are multiple signals present, the probability distribution of the multiple answers resulting from multiple measurements, each using multiple model sizes from both a Music and Esprit implementation, will be multimodal. Conventional cluster analysis will not be sufficient for this application. The fifth feature is the development of multi-modal cluster analysis to estimate the direct range and equivalent range of the reflected multipath components. The sixth feature is the analysis of the statistics of the range estimates provided by the cluster analysis (range and standard deviation and combing those estimates that are statistically identical. This results in a more accurate range estimate.

The abovementioned methods can be also used in wide bandwidth ranging signal location-finding systems.

For the derivation of r(t) in the thresholded method, starting with expression (20), we obtain $$g(t) = \left(a_0 + \sum_{k=1}^{M} a_k \sin k\pi\Delta ft\right) \sin\pi(2N+1)\Delta ft \quad (A1)$$

$$= a_0 \sin\pi(2N+1)\Delta ft + \sum_{k=1}^{M} a_k \sin\pi(2N+1)\Delta ft \sin k\pi\Delta ft$$

$$= a_0 \sin\pi(2N+1)\Delta ft + \sum_{k=1}^{M} \frac{1}{2}a_k \cos\pi(2N+1-k)\Delta ft -$$

$$\sum_{k=1}^{M} \frac{1}{2}a_k \cos\pi(2N+1+k)\Delta ft$$

$$= a_0 \sin 2\pi\left(N+\frac{1}{2}\right)\Delta ft + \sum_{k=1}^{M} \frac{1}{2}a_k \cos 2\pi\left(N+\frac{1}{2}-\frac{k}{2}\right)\Delta ft -$$

$$\sum_{k=1}^{M} \frac{1}{2}a_k \cos 2\pi\left(N+\frac{1}{2}+\frac{k}{2}\right)\Delta ft$$

where the trigonometric identity sin x sin y=½ cos(x−y)−½ cos(x+y) is used.

Except for $a_0$, the coefficients $a_k$ are zero for even k. The reason for this is that on the interval I, the function 1/sin π∆ft that we are trying to approximate by h(t) is even about the center of I, but the basis functions sin kπ∆ft for even k, k≠0, are odd about the center of I, hence are orthogonal to 1/sin π∆ft on I. Thus, we can make the substitution k=2n+1 and let M be an odd positive integer. In fact, we will let M=2N+1. This choice has been experimentally determined to provide a good amount of cancellation of the oscillations in the interval I.

$$g(t) = a_0 \sin 2\pi\left(N+\frac{1}{2}\right)\Delta ft + \quad (A2)$$

$$\sum_{n=0}^{N} \frac{1}{2}a_{2n+1} \cos 2\pi(N-n)\Delta ft - \sum_{n=0}^{N} \frac{1}{2}a_{2n+1} \cos 2\pi(N+n+1)\Delta ft$$

Now we make the substitution k=N−n in the first summation and k=N+n+1 in the second summation to obtain $$g(t) = a_0 \sin 2\pi\left(N+\frac{1}{2}\right)\Delta ft + \quad (A3)$$

$$\sum_{k=0}^{N} \frac{1}{2}a_{2(N-k)+1} \cos 2\pi k\Delta ft - \sum_{k=N+1}^{2N+1} \frac{1}{2}a_{2(k-N)-1} \cos 2\pi k\Delta ft$$

$$= a_0 \sin 2\pi\left(N+\frac{1}{2}\right)\Delta ft +$$

$$\frac{1}{2}a_{2N+1} + \sum_{k=1}^{N} \frac{1}{2}a_{2(N-k)+1} \cos 2\pi k\Delta ft -$$

$$\sum_{k=N+1}^{2N+1} \frac{1}{2}a_{2(k-N)-1} \cos 2\pi k\Delta ft$$

Subtracting g(t) from s(t) results in $$r(t) = s(t) - g(t) \quad (A4)$$

$$= 1 + 2\sum_{k=1}^{N} \cos 2\pi k\Delta ft - \frac{1}{2}a_{2N+1} - \sum_{k=1}^{N} \frac{1}{2}a_{2(N-k)+1} \cos 2\pi k\Delta ft +$$

$$\sum_{k=N+1}^{2N+1} \frac{1}{2}a_{2(k-N)-1} \cos 2\pi k\Delta ft - a_0 \sin 2\pi\left(N+\frac{1}{2}\right)\Delta ft$$

Now let $$b_0 = 1 - \tfrac{1}{2}a_{2N+1}$$

$$b_k = 2 - \tfrac{1}{2}a_{2(N-k)+1} \text{ for } k=1,2,\ldots,N$$

$$b_k = \tfrac{1}{2}a_{2(k-N)-1} \text{ for } k=N+1,N+2,\ldots,2N+1$$

$$c = -a_0 \quad (A5)$$

Then (A4) can be written as $$r(t) = b_0 + \sum_{k=1}^{2N+1} b_k \cos 2\pi k \Delta \mathrm{ft} + c \sin 2\pi \left(N + \tfrac{1}{2}\right) \Delta \mathrm{ft} \quad (A6)$$

The present embodiments relate to a positioning/locating method in wireless communication and other wireless networks that substantially obviate one or more of the disadvantages of the related art. The present embodiments advantageously improve the accuracy of tracking and locating functionality in multiple types of wireless network by utilizing multi-path mitigation processes, techniques and algorithms, described in U.S. Pat. No. 7,872,583. These wireless networks include Wireless Personal Area Networks (WPGAN) such as ZigBee and Blue Tooth, wireless local area network (WLAN) such as WiFi and UWB, Wireless Metropolitan Area Networks, (WMAN) typically consisting of multiple WLANs, WiMax being the primary example, wireless Wide Area Networks (WAN) such as White Space TV Bands, and Mobile Devices Networks (MDN) that are typically used to transmit voice and data. MDNs are typically based on Global System for Mobile Communications (GSM) and Personal Communications Service (PCS) standards. A more recent MDN is based on the Long Term Evolution (LTE) standard. These wireless networks are typically comprised of a combination of devices, including base stations, desktop, tablet and laptop computers, handsets, smartphones, actuators, dedicated tags, sensors as well as other communication and data devices (generally, all these devices are referred to as "wireless network devices").

Existing location and positioning information solutions use multiple technologies and networks, including GPS, AGPS, Cell Phone Tower Triangulation, and Wi-Fi. Some of the methods used to derive this location information include RF Fingerprinting, RSSI, and TDOA. Although acceptable for the current E911 requirements, existing location and ranging methods do not have the reliability and accuracy required to support the upcoming E911 requirements as well as LBS and/or RTLS applications requirements, especially indoors and urban environments.

Figure 10:
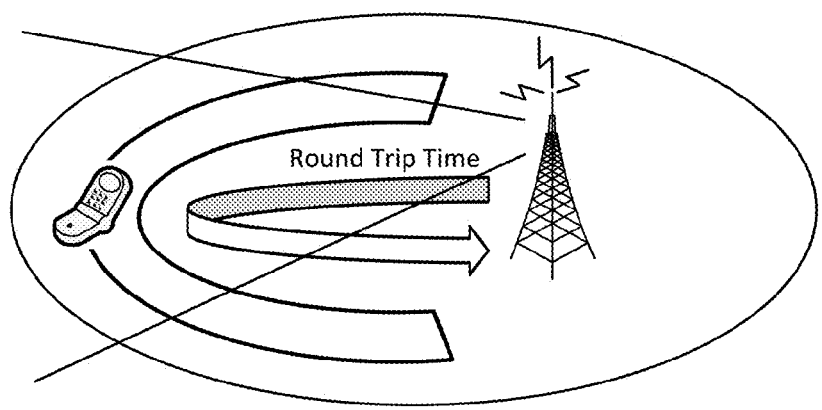
FIG. 10 illustrates an exemplary enhanced Cell ID+RTT locating technique.

The methods described in U.S. Pat. No. 7,872,583 significantly improve the ability to accurately locate and track targeted devices within a single wireless network or a combination of multiple wireless networks. The embodiment is a significant improvement to the existing implementation of tracking and location methods used by wireless networks that use Enhanced Cell-ID and OTDOA (Observed Time Difference of Arrival), including DL-OTDOA (Downlink OTDOA), U-TDOA, UL-TDOA and others Cell ID location technique allows estimating the position of the user (UE—User Equipment) with the accuracy of the particular sector coverage area. Thus, the attainable accuracy depends on the cell (base station) sectoring scheme and antenna beam-width. In order to improve accuracy the Enhanced Cell ID technique adds RTT (Round Trip Time) measurements from the eNB. Note: Here, the RTT constitutes the difference between transmission of a downlink DPCH Dedicated Physical Channel, (DPDCH)/DPCCH: Dedicated Physical Data Channel/Dedicated Physical Control Channel) frame and the beginning of a corresponding uplink physical frame. In this instance the abovementioned frame(s) act as a ranging signal. Based on the information of how long this signal propagates from eNB to the UE, the distance from eNB can be calculated (see FIG. 10).

Figure 11:
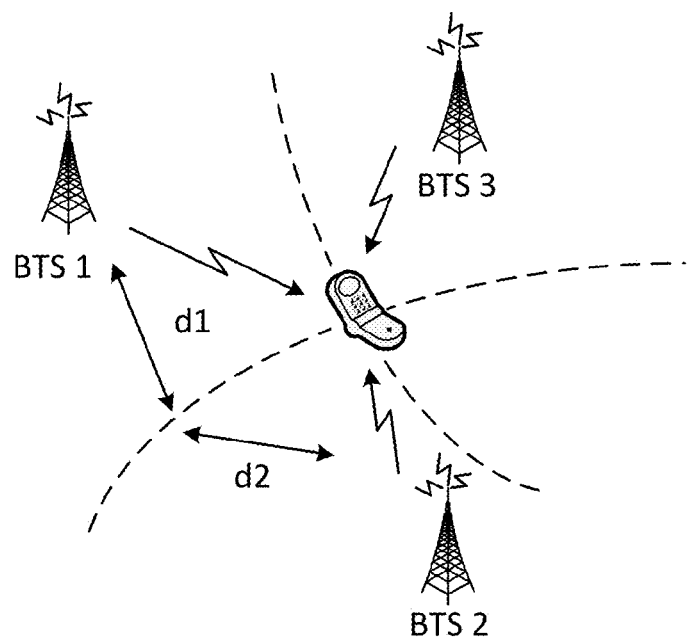
FIG. 11 illustrates an exemplary OTDOA locating technique.

In the Observed Time Difference of Arrival (OTDOA) technique the time of arrival of the signal coming from neighboring base stations (eNB) is calculated. The UE position can be estimated in the handset (UE-based method) or in the network (NT-based, UE-assisted method) once the signals from three base stations are received. The measured signal is the CPICH (Common Pilot Channel). The propagation time of signals is correlated with a locally generated replica. The peak of correlation indicates the observed time of propagation of the measured signal. Time difference of arrival values between two base stations determines a hyperbola. At least three reference points are needed to define two hyperbolas. The location of the UE is in the intersection of these two hyperbolas (see FIG. 11).

Idle Period Downlink (IPDL) is further OTDOA enhancement. The OTDOA-IPDL technique is based on the same measurements as the regular OTDOA Time measurements are taken during idle periods, in which serving eNB ceases its transmissions and allows the UE within the coverage of this cell to hear pilots coming from distant eNB(s). Serving eNB provides idle periods in continuous or burst mode. In the continuous mode, one idle period is inserted in every downlink physical frame (10 ms). In the burst mode, idle periods occur in a pseudo-random way. Further improvement is obtained via Time Aligned IPDL (TA-IPDL). Time alignment creates a common idle period, during which, each base station will either cease its transmission or transmit the common pilot. The pilot signal measurements will occur in idle period. There are several other techniques that may further enhance the DL OTDOA-IPDL method, for example Cumulative Virtual Blanking, UTDOA (Uplink TDOA), etc. All these techniques improve the ability to hear other (non-serving) eNB(s).

One significant drawback of the OTDOA based techniques is that the base stations timing relationships must be known, or measured (synchronized), for this method to be viable. For unsynchronized UMTS networks the 3GPP standard offers suggestion of how this timing may be recovered. However, networks operators are not implementing such solution. As a result, an alternative that uses the RTT measurements in lieu of the CPICH signal measurements was proposed (see U.S. Patent Publication No. 2008/0285505, John Carlson et al., SYSTEM AND METHOD FOR NETWORK TIMING RECOVERY IN COMMUNICATIONS NETWORKS).

All abovementioned methods/techniques are based on the terrestrial signals time of arrival and/or time difference of arrival measurements (RTT, CPICH, etc.). An issue with such measurements is that these are severely impacted by the multi-path. This, in turn, significantly degrades the abovementioned methods/techniques locate/track accuracy (see Jakub Marek Borkowski: Performance of Cell ID+RTT Hybrid Positioning Method for UMTS).

One Multi-path mitigation technique uses detections/measurements from excess number of eNB(s) or Radio Base Stations (RBS). The minimum is three, but for multipath mitigation the number of RBS's required is at least six to eight (see METHOD AND ARRANGEMENT FOR DL-OTDOA (DOWNLINK OBSERVED TIME DIFFERENCE OF ARRIVAL) POSITIONING IN A LTE (LONG TERM EVOLUTION) WIRELESS COMMUNICATIONS SYSTEM, WO/2010/104436). However, the probability of an UE hearing from this large number of eNB(s) is much lower than from three eNB(s). This is because with large number of RBS (eNBs) there will be several ones that are far away from the UE and the received signal from these RBS (es) may fall below the UE receiver sensitivity level or the received signal will have low SNR.

In case of RF reflections (e.g., multi-path), multiple copies of the RF signal with various delay times are superimposed onto the DLOS (Direct Line of Site) signal. Because CPICH, uplink DPCCH/DPDCH and other signals that are used in various CELL ID and OTDOA methods/techniques, including the RTT measurements, are of a limited bandwidth the DLOS signal and reflected signals cannot be differentiated without proper multi-path processing/mitigation; and without this multi-path processing these reflected signals will induce an error in the estimated time difference of arrival (TDOA) and time of arrival (TOA) measurements, including RTT measurements.

For example, 3 G TS 25.515 v.3.0.0 (199-10) standards define the RTT as " . . . the difference between transmission of a downlink DPCH frame (signal) and the reception of the beginning (first significant path) of the corresponding uplink DPCCH/DPDCH frame (signal) from UE". The standard does not define what constitutes this "first significant path". The standard goes on noting that "The definition of the first significant path needs further elaboration". For example, in heavy multipath environment it is a common occurrence whereby the DLOS signal, which is the first significant path, is severely attenuated (10 dB-20 dB) relatively to one or more reflected signal(s). If the "first significant path" is determined by measuring the signal strength, it may be one of the reflected signal(s) and not the DLOS signal. This will result in erroneous TOA/DTOA/RTT measurement(s) and loss of locating accuracy.

In prior wireless networks generations the locating accuracy was also impacted by the low sampling rate of frames (signals) that are used by the locate methods—RTT, CPCIH and other signals. The current third and following wireless network generations have much higher sampling rate. As a result, in these networks the locating accuracy real impact is from the terrestrial RF propagation phenomena (multipath).

The embodiment can be used in all wireless networks that employ reference and/or pilot signals, and/or synchronization signals, including simplex, half-duplex and full duplex modes of operation. For example, the embodiment operates with wireless networks that employ OFDM modulation and/or its derivatives. Thus, the embodiment operates with LTE networks.

It is also applicable to other wireless networks, including WiMax, WiFi, and White Space. Other wireless networks that do not use reference and/or pilot or synchronization signals may employ one or more of the following types of alternate modulation embodiments as described in U.S. Pat. No. 7,872,583: 1) where a portion of frame is dedicated to the ranging signal/ranging signal elements as described in U.S. Pat. No. 7,872,583; 2) where the ranging signal elements (U.S. Pat. No. 7,872,583) are embedded into transmit/receive signals frame(s); and 3) where the ranging signal elements (described in U.S. Pat. No. 7,872,583) are embedded with the data.

These alternate embodiments employ multi-path mitigation processor and multi-path mitigation techniques/algorithms described in U.S. Pat. No. 7,872,583 and can be used in all modes of operation: simplex, half-duplex and full duplex.

It is also likely that multiple wireless networks will, at the same time, utilize the preferred and/or alternate embodiments. By way of example, a smart phone can have Blue Tooth, WiFi, GSM and LTE functionality with the capability of operating on multiple networks at the same time. Depending on application demands and/or network availability, different wireless networks can be utilized to provide positioning/locating information.

The proposed embodiment method and system leverages the wireless network reference/pilot and/or synchronization signals. Furthermore, the reference/pilot signal/synchronization signals measurements might be combined with RTT (Round Trip Time) measurements or system timing. According to an embodiment, RF-based tracking and locating is implemented on 3GPP LTE cellular networks, but could be also implemented on other wireless networks, for example WiMax, Wi-Fi, LTE, sensors networks, etc. that employ a variety of signaling techniques. Both the exemplary and mentioned above alternative embodiments employ multi-path mitigation method/techniques and algorithms that are described in U.S. Pat. No. 7,872,583 The proposed system can use software implemented digital signal processing.

The system of the embodiment leverages User Equipment (UE), e.g. cell phone or smart phone, hardware/software as well as Base Station (Node B)/enhanced Base Station (eNB) hardware/software. A base station generally consists of transmitters and receivers in a cabin or cabinet connected to antennas by feeders. These base stations include, Micro Cell, Pico Cell, Macro Cell, Umbrella Cell, Cell Phone towers, Routers and Femtocells. As a result, there will be little or no incremental cost to the UE device and overall system. At the same time the locate accuracy will be significantly improved.

The improved accuracy comes from the multipath mitigation that is provided by the present embodiments and U.S. Pat. No. 7,872,583. The embodiments use multi-path mitigation algorithms, network reference/pilot and/or synchronization signals and network node (eNB). These might be supplemented with RTT (Round Time Trip) measurements. The multi-path mitigation algorithms are implemented in UE and/or base station (eNB), or both: UE and eNB The embodiments advantageously use the multi-path mitigation processor/algorithms (see U.S. Pat. No. 7,872,583) that allow separating the DLOS signal and reflected signals, even when DLOS signal is significantly attenuated (10 dB 20 dB lower) relatively to one or more reflected signals. Thus, the embodiments significantly lower the error in the estimated ranging signal DLOS time-of-flight and consequently TOA, RTT and DTOA measurements. The proposed multi-path mitigation and DLOS differentiating (recognizing) method can be used on all RF bands and wireless systems/networks. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (e.g., Viterbi Algorithm), minimal variance estimation (Kalman Filter), etc.

In present embodiments the multi-path mitigation processor and multi-path mitigation techniques/algorithms do not change the RTT, CPCIH and other signals and/or frames. The present embodiments leverage wireless network reference, pilot and/or synchronization signals that are used to obtain the channel response/estimation. The invention uses the channel estimation statistics that is generated by UE and/or eNB (see Iwamatsu et al., APPARATUS FOR ESTIMATING PROPAGATION PATH CHARACTERISTICS, US 2003/008156; U.S. Pat. No. 7,167,456 B2).

Figure 9:
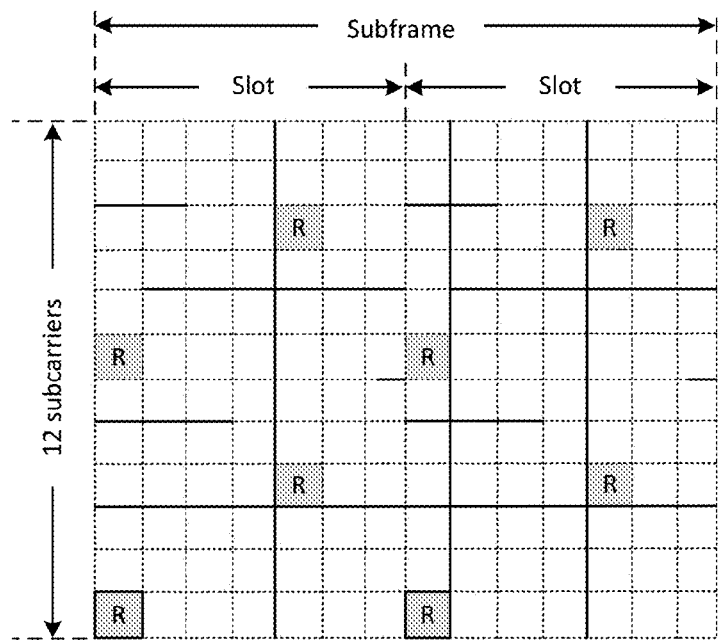
FIG. 9 illustrates LTE reference signals mapping.

LTE networks use specific (non-data) reference/pilot and/or synchronization s signals (known signals) that are transmitted in every downlink and uplink subframe, and might span entire cell bandwidth. For simplicity from now on we will refer to reference/pilot and synchronization signals as reference signals. An example of the LTE reference signals is in FIG. 9 (these signals are interspersed among LTE resource elements). From FIG. 2, reference signals (symbols) are transmitted every sixth subcarrier. Further, reference signals (symbols) are staggered in both time and frequency. In total, reference signals are covering every third subcarrier.

These reference signals are used in the initial cell search by the UE, downlink signal strength measurements, scheduling and handover, etc. Included in the reference signals are UE-specific reference signals for channel estimation (response determination) for coherent demodulation. In addition to the UE-specific reference signals, other reference signals may be also used for channel estimation purposes, (see Chen et al., US patent publication No. 2010/0091826 A1).

LTE employs the OFDM (Orthogonal Frequency Division Multiplexing) modulation (technique). In LTE the ISI (Inter Symbol Interference) caused by multipath is handled by inserting Cyclic prefix (CP) at the beginning of each OFDM symbol. The CP provides enough delay so that delayed reflected signals of the previous OFDM symbol will die out before reaching the next OFDM symbol.

An OFDM symbol consists of multiple very tightly spaced subcarriers. Inside the OFDM symbol time-staggered copies of the current symbol (caused by multipath) result in Inter Carrier Interference (ICI). In LTE the ICI is handled (mitigated) by determining the multipath channel response and correcting the channel response in the receiver.

In LTE the multipath channel response (estimation) is computed in the receiver from subcarriers bearing the reference symbols. Interpolation is used to estimate the channel response on the remaining subcarriers. The channel response is calculated (estimated) in form of channel amplitude and phase. Once the channel response is determined (by periodic transmission of known reference signals), the channel distortion caused by multipath is mitigated by applying an amplitude and phase shift on a subcarrier-by-subcarrier basis (see Jim Zyren, Overview of the 3GPP Long Term Evolution Physical Layer, white paper).

LTE multipath mitigation is designed to remove the ISI (by inserting a Cyclic Prefix) and ICI, but not to separate the DLOS signal from reflected signals. For example, time-staggered copies of the current symbol make each modulated subcarrier signals spread in time, thus causing ICI. Correcting multipath channel response using the abovementioned LTE technique will shrink modulated subcarrier signals in time, but this type of correction does not guarantee that the resulting modulated subcarrier signals (inside the OFDM symbol) are DLOS signals. If DLOS modulated subcarrier signals are significantly attenuated relatively to delayed reflected signal(s), the resulting output signal will be the delayed reflected signal(s) and the DLOS signal will be lost.

In LTE compliant receiver, further signal processing includes DFT (Digital Fourier Transformation). It is well known that DFT technique(s) can resolve (remove) only copies of signal(s) that are delayed for times that are longer than or equal to the time that is inversely proportional to the signal and/or channel bandwidth. This method accuracy may be adequate for an efficient data transfer, but not accurate enough for precise distance measurement in a heavy multipath environment. For example, to achieve thirty meters accuracy, the signal and receiver channel bandwidths should be larger than or equal to ten megahertz (1/10 MHz=100 ns.). For better accuracy the signal and receiver channel bandwidths should be wider one hundred megahertz for three meters.

However, CPICH, uplink DPCCH/DPDCH and other signals that are used in various CELL ID and OTDOA methods/techniques, including the RTT measurements, as well as the LTE received signal subcarriers have bandwidths that are significantly lower than ten megahertz. As a result, the currently employed (in LTE) method/technique will produce locating errors in the range of 100 meters.

To overcome the abovementioned limitations the embodiments use a unique combination of implementations of subspace decomposition high resolution spectral estimation methodologies and multimodal cluster analysis. This analysis and related multi-path mitigation method/techniques and algorithms, described in U.S. Pat. No. 7,872,583, allow a reliable and accurate separation of DLOS path from other reflected signals paths.

Compared to methods/techniques used in the LTE, in a heavy multipath environment this method/techniques and algorithms (U.S. Pat. No. 7,872,583) deliver 20× to 50× accuracy improvement in the distance measurement via reliable and accurate separation of DLOS path from other multi-path (MP) paths.

Methods/techniques and algorithms described in U.S. Pat. No. 7,872,583 require ranging signal complex amplitude estimation. Accordingly, the LTE reference signals used for channel estimation (response determination) as well as other reference signals (including pilot and/or synchronization signals, can be also construed as a ranging signal in methods/techniques and algorithms described in U.S. Pat. No. 7,872,583. In this case the ranging signal complex amplitude is the channel response that is calculated (estimated) by the LTE receiver in form of amplitude and phase. In other words, the channel response statistics that is calculated (estimated) by the LTE receiver can provide complex amplitude information that is required by the method/techniques and algorithms described in U.S. Pat. No. 7,872,583.

In ideal open space RF propagation environment with no multipath the phase change of the received signal (ranging signal), e.g. channel response phase, will be directly proportional to the signal's frequency (a straight line); and the RF signal time-of-flight (propagation delay) in such environment can be directly computed from the phase vs. frequency dependency by computing first derivative of the phase vs. frequency dependency. The result will be the propagation delay constant.

In this ideal environment the absolute phase value at initial (or any) frequency is not important because the derivative is not affected by the phase absolute values.

In a heavy multipath environment the received signal phase change vs. frequency is a complicated curve (not a straight line); and the first derivative does not provide information that could be used for accurate separation of DLOS path from other reflected signals paths. This is the reason for employing multipath mitigation processor and method(s)/techniques and algorithms described in U.S. Pat. No. 7,872,583.

If the phase and frequency synchronization (phase coherency) achieved in a given wireless network/system is very good, then multipath mitigation processor and method(s)/techniques and algorithms described in U.S. Pat. No. 7,872,583 will accurately separate DLOS path from other reflected signals paths and determine this DLOS path length (time-of-flight).

In this phase coherent network/system no additional measurements are required. In other words, one way ranging (simplex ranging) can be realized.

However, if the degree of synchronization (phase coherency) achieved in a given wireless network/system is not accurate enough, then in a heavy multipath environment the received signal phase and amplitude change vs. frequency might be very similar for measurements conducted at two or more different locations (distances). This phenomenon might lead to an ambiguity in received signal DLOS distance (time-of-flight) determination.

To resolve this ambiguity it is necessary to know the actual (absolute) phase value for at least one frequency.

However, the amplitude and phase vs. frequency dependency that is computed by the LTE receiver does not include an actual phase value because all amplitude and phase values are computed from the downlink/uplink reference signals, e.g. relative to each other. Thus, the amplitude and phase of the channel response that is calculated (estimated) by the LTE receiver needs actual phase value at least at one frequency (subcarrier frequency).

In LTE this actual phase value can be determined from one or more RTT measurement(s), TOA measurements; or from time-stamping of one or more received reference signals, provided that 1) these time stamps of transmitting these signals by eNB are also known at the receiver (or vice versa), 2) the receiver and eNB clocks are well synchronized in time, and/or 3) by using multilateration techniques.

All of the above methods provide the time-of-flight values of one or more reference signals. From the time-of-flight values and frequencies of these reference signals actual phase values at one or more frequencies can be calculated.

The present embodiments achieve a highly accurate DLOS distance determination/locating in a heavy multipath environment by combining multi-path mitigation processor, method(s)/techniques and algorithms described in U.S. Pat. No. 7,872,583 with: 1) the amplitude and phase vs. frequency dependency that is computed by the LTE UE and/or eNB receiver or 2) a combination of the amplitude and phase vs. frequency dependency that is computed by the LTE UE and/or eNB receiver and actual phase value(s) for one or more frequencies obtained via RTT and/or TOA; and/or time-stamping measurements.

In these cases the actual phase value(s) is affected by the multipath. However, this does not impact the performance of methods/techniques and algorithms described in U.S. Pat. No. 7,872,583.

In LTE RTT/TOA/TDOA/OTDOA, including DL-OTDOA, U-TDOA, UL-TDOA, etc., measurements can be carried out with the resolution of 5 meters. RTT measurements are carried during dedicated connections. Thus, multiple simultaneous measurements are possible when UE is in handover state and times when UE periodically collects and reports measurements back to the UE, in which the DPCH frames are exchanged between the UE and different networks (base stations). Similar to RTT, TOA measurements provide the signal's time-of-flight (propagation delay), but TOA measurements cannot be made simultaneously (Jakub Marek Borkowski: Performance of Cell ID+RTT Hybrid Positioning Method for UMTS).

In order to locate UE on plane DLOS distances have to be determined at least from/to three eNB(s). To locate UE in three-dimensional space minimum four DLOS distances from/to four eNB(s) would have to be determined (assuming that at least one eNB is not on the same plane).

An example of UE positioning method is shown in FIG. 1.

In case of very good synchronization RTT measurements are not required.

If the degree of synchronization is not accurate enough, then methods like OTDOA, Cell ID+RTT and others, for example AOA (Angle-of-Arrival) and its combinations with other methods, can be used for the UE locating.

The Cell ID+RTT track-locate method accuracy is impacted by the multipath (RTT measurements) and the eNB (base station) antenna beamwidth. Base stations antennas beamwidths are between 33 and 65 degrees. These wide beamwidths results in locating error of 50-150 meters in urban areas (Jakub Marek Borkowski: Performance of Cell ID+RTT Hybrid Positioning Method for UMTS). Considering that in a heavy multipath environment the current LTE RTT distance measurement average error is approximately 100 meters, the overall expected average locate error of the currently employed by LTE Cell ID+RTT method is approximately 150 meters.

One of the embodiments is the UE locating based on the AOA method, whereby one or more reference signals from the UE is used for the UE locate purposes. It involves an AOA determination device location for determining the DLOS AOA. The device can be collocated with the base station and/or installed at another one or more locations independent from the base station location. The coordinates of these locations are presumably known. No changes are required on the UE side.

This device includes a small antenna array and is based on a variation of the same multipath mitigation processor, method(s)/techniques and algorithms described in U.S. Pat. No. 7,872,583. This one possible embodiment has the advantage of precise determination (very narrow beamwidth) of the AOA of the DLOS RF energy from an UE unit.

In one other option this added device is receive only device. As a result, its size/weight and cost are very low.

The combination of embodiments in which accurate DLOS distance measurements are obtained and embodiments in which an accurate DLOS AOA determination can be made will greatly improve the Cell ID+RTT track-locate method precision 10× or greater. Another advantage of this approach is that the UE location can be determined at any moment with a single tower, (does not require placing UE in soft handover mode). Because an accurate location fix can be obtained with a single tower there is no need to synchronize multiple cell towers. Another option of determining the DLOS AOA is to use the existing eNB antenna array and the eNB equipment. This option may further lower the cost of implementation of the improved Cell ID+RTT method. However, because eNB antennas are not designed for the locating applications, the positioning accuracy may be degraded. Also, network operators may be unwilling to implement required changes in base station (software/hardware).

In the LTE (Evolved Universal Terrestrial Radio Access (E-UTRA); Physical channels and modulation; 3GPP TS 36.211 Release 9 technical Specification) Positioning Reference Signals (PRS), were added. These signals are to be used by the UE for the DL-OTDA (Downlink OTDOA), positioning. Also, this release 9 requires eNB(s) to be synchronized. Thus, clearing the last obstacle for OTDOA methods (see paragraph 274 above). The PRS improves UE hear-ability at UE of multiple eNBs. Note: the Release 9 did not specify the eNB synchronization accuracy (some proposals: 100 ns.).

The U-TDOA/UL-TDOA are in a study phase; to be standardized in 2011.

The DL-OTDOA method (in Release 9) is detailed in the US patent US 2011/0124347 A1 (Method and Apparatus for UE positioning in LTE networks, Chen, at al.). The Release 9 DL-OTDOA suffers from the multipath. Some of the multipath mitigation can be achieved via increased PRS signal bandwidth. However, the trade-off is increased scheduling complexity and longer times between UE positions fixes. Moreover, for networks with limited operating bandwidth, for example 10 MHz, the best possible accuracy is 100 meters, see Chen, Table 1.

The above numbers are the best possible case. Other cases, especially when the DLOS signal strength is significantly lower (10-20 dB) compared to the reflected signal(s) strength, result in significantly larger (2×4×) of the above-mentioned locate/ranging errors.

Embodiments described herein allow for up to 50× ranging/locate accuracy improvement for a given signal bandwidth over the performance achieved by the Release 9 DL-OTDOA method and the UL-PRS method of Chen et al. described in the Background section. Thus, applying embodiments of the methods described herein to the Release 9 PRS processing reduces the locate error down to 3 meters or better in 95% of all possible cases. In addition, this accuracy gain will reduce the scheduling complexity and the time between UE position fixes.

With the embodiments described herein further improvements for the OTDOA method are possible. For example, the ranging to the serving cell can be determined from other serving cells' signals, thus improving the neighboring cells hearability and reducing the scheduling complexity, including the time between UE positions fixes.

Embodiments also enable the accuracy of the U-TDOA method and UL-TDOA from Chen et al. (described in the Background) to be improved up to 50 times. Applying embodiments to the Chen's UL-TDOA variant, reduces the locate error down to 3 meters or better in 95% of all possible cases. Moreover, this accuracy gain further reduces the scheduling complexity and the time between UE positions fixes.

Again, with the present embodiments, Chen's UL-TDOA method accuracy can be improved up to 50×. Thus, applying the present embodiments to the Chen's U-TDOA variant, will reduce the locate error down to 3 meters or better in 95% of all possible cases. Moreover, this accuracy gain will further reduce the scheduling complexity and the time between UE positions fixes.

The abovementioned DL-TDOA and U-TDOA/UL-TDOA methods rely on one-way measurements (ranging). Present embodiments and practically all other ranging technologies require that the PRS and/or other signals used in the process of one-way ranging would be frequency and phase coherent. The OFDM based systems, like LTE, are frequency coherent. However, the UE units and eNB(s) are not phase or time synchronized by a common source—like UTC, to a couple nanoseconds, e.g. there exists a random phase adder.

To avoid the phase coherency impact on the ranging accuracy, the embodiment of the multipath processor calculates the differential phase between the ranging signal(s), e.g. reference signals, individual components (subcarriers). This eliminates the random phase term adder.

As identified above in the discussion of Chen et al., applying the embodiments described herein result in significant accuracy improvement in indoor environments compared to the performance achieved by Chen et al. For example, according to Chen, at al. the DL-OTDOA and/or U-TDOA/UL-TDOA are mostly for outdoor environments, indoors (buildings, campuses, etc.) the DL-OTDOA and U-TDOA technologies may not perform well. Several reasons are noted (see Chen, #161-164), including the Distributed Antenna Systems (DAS) that are commonly employed indoors, whereby each antenna does not have a unique ID.]

The embodiment described below operates with wireless networks that employ OFDM modulation and/or its derivatives; and reference/pilot/and or synchronization signals. Thus, the embodiment described below operates with LTE networks and it is also applicable to other wireless systems and other wireless networks, including other types of modulation, with or without reference/pilot/and/or synchronization signals.

The approach described herein is also applicable to other wireless networks, including WiMax, WiFi, and White Space. Other wireless networks that do not use reference/pilot and/or synchronization signals may employ one or more of the following types of alternate modulation embodiments as described in U.S. Pat. No. 7,872,583: 1) where a portion of frame is dedicated to the ranging signal/ranging signal elements; 2) where the ranging signal elements are embedded into transmit/receive signals frame(s); and 3) where the ranging signal elements are embedded with the data.

Embodiments of the multipath mitigation range estimation algorithm described herein (also described in U.S. Pat. Nos. 7,969,311 and 8,305,215) works by providing estimates of the ranges in the ensemble made up of the direct path (DLOS) of a signal plus the multipath reflections.

The LTE DAS system produces multiple copies of the same signal seen at various time offsets to a mobile receiver (UE). The delays are used to uniquely determine geometric relationships between the antennas and the mobile receiver. The signal seen by the receiver resembles that seen in a multipath environment—except the major "multipath" components result from the sum of the offset signals from the multiple DAS antennas.

The signal ensemble seen by the receiver is identical to the type of signal ensemble embodiments are designed to exploit except that in this case the major multipath components are not traditional multipath. The present multipath mitigation processor (algorithms) is capable of determining the attenuation and propagation delay of the DLOS and each path, e.g. reflection, (see equations 1-3 and associated descriptions). While multipath can be present because of the dispersive RF channel (environment), the major multipath components in this signal ensemble are associated with transmissions from multiple antennas. Embodiments of the present multipath algorithm can estimate these multipath components, isolate the ranges of the DAS antennas to the receiver, and provide range data to the location processor (implemented in software). Depending on the antenna placing geometry, this solution can provide both X, Y and X, Y, Z location coordinates.

As a result, present embodiments do not require any hardware and/or new network signal(s) additions. Moreover, the positioning accuracy can be significantly improved by 1) mitigating the multipath and 2) in case of active DAS the lower bound of positioning error can be drastically reduced, such as reducing from approximately 50 meters to approximately 3 meters.

It is assumed that the position (location) of each antenna of a DAS is known. The signal propagation delay of each antenna (or relative to other antenna) also has to be determined (known).

For active DAS systems the signal propagation delay may be determined automatically, using the loopback techniques, whereby the known signal is sent round trip and this round trip time is measured. This loopback technique also eliminates the signal propagation delay changes (drift) with temperature, time, etc.

Using multiple macro cells and associated antennas, Pico cells and micro cells further enhance the resolution by providing additional reference points.

The embodiment described above of individual range estimates in a signal ensemble of multiple copies from multiple antenna can be further enhanced by changes to the signal transmit structure in the following two ways. The first is to time multiplex the transmissions from each antenna. The second approach is to frequency multiplex for each of the antennas. Using both enhancements, time and frequency multiplexing simultaneously, further improve the ranging and location accuracy of the system. Another approach is to add a propagation delay to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference).

The addition of a unique ID or unique identifier for each antenna increases the efficiency of the resulting solution. For example, it eliminates the need for the processor to estimate all the ranges from the signals from each of the antennas In one embodiment utilizing the LTE downlink, one or more reference signal(s) subcarriers, including pilot and or synchronization signal(s) subcarriers, are used to determine subcarriers phase and amplitude that are in turn applied to the multi-path processor for multipath interference mitigation and generation of range based location observables and locate estimate using multilateration and location consistency algorithms to edit out wild points.

Another embodiment takes advantage of the fact that the LTE uplink signaling also includes reference signals, mobile device to base, which also contains reference subcarriers. In fact there is more than one mode in which contain these subcarriers from a full sounding mode used by the network to assign a frequency band to the uplink device to a mode where are reference subcarriers are used to generate a channel impulse responses to aid in demodulation of the uplink signal, etc. Also, similarly to the DL PRS added in rel.9 additional UL reference signals might be added in the upcoming and future standard releases. In this embodiment, the uplink signal is processed by multiple base units (eNB) using the same range to phase, multipath mitigation processing to generate range related observables. In this embodiment, location consistency algorithms are used as established by the multilateration algorithm to edit wild point observables and generate a location estimate.

Yet another embodiment, relevant one or more reference (including pilot and/or synchronization) subcarriers of both the LTE downlink and LTE uplink are collected, the range to phase mapping is applied, multipath mitigation is applies and the range associated observable is estimated. These data would then be fused in such a way that would provide a more robust set of observables for location using the multilateration algorithm and location consistency algorithms. The advantage would be the redundancy that results in improved accuracy since the downlink and up link two different frequency bands or in case of the TDD (Time Division Duplexing) improving the system coherency.

In a DAS (Distributed Antenna System) environment where multiple antennas transmitting the same downlink signal from a microcell the location consistency algorithm(s) are extended to isolate the ranges of the DAS antennas from observables generated by the multipath mitigation processing from reference signal(s) (including pilot and/or synchronization) subcarriers and to obtain the location estimates from the multiple DAS emitters (antennas) ranges.

In a DAS system (environment) obtaining accurate location estimate is possible only if the signals paths from individual antennas can be resolved with a high accuracy, whereby the path error is only a fraction of the distance between antennas (accuracy of 10 meters or better). Because all existing techniques/methods cannot provide such accuracy in a heavy multipath environment (signals from multiple DAS antennas will appear as induced heavy multipath) the existing techniques/methods cannot take advantage of the abovementioned extension of the location consistency algorithm(s) and this locate method/technique in the DAS environment.

The InvisiTrack multi-path mitigation methods and systems for object identification and location finding, described in U.S. Pat. No. 7,872,583, is applied to the range to signal phase mapping, multipath interference mitigation and process to generate range based location observables utilizing the LTE downlink, uplink and/or both (downlink and uplink), one or more reference signal(s) subcarriers and using multilateration and location consistency to generate a location estimate.

In all above embodiments trilateration positioning algorithms can be also employed.

The DL-OTDOA locating was specified in the LTE release 9: Evolved Universal Terrestrial Radio Access (E-UTRA); Physical channels and modulation; 3GPP TS 36.211 Release 9 technical Specification. However, it has not been implemented by the wireless operators (carrier)s. In the meantime a Downlink locating can be implemented within current, e.g. unmodified, LTE network environment by using the existing physical layer measurements operation(s).

In LTE the UE and the eNB are required to make physical layer measurements of the radio characteristics. The measurement definitions are specified in 3GPP TS 36.214. These measurements are performed periodically and are reported to the higher layers and are used for a variety of purposes including intra- and inter-frequency handover, inter-radio access technology (inter-RAT) handover, timing measurements, and other purposes in support of RRM (Radio Resource Management).

For example, the RSRP (Reference Signal Received Power) is the average of the power of all resource elements which carry cell-specific reference signals over the entire bandwidth.

Another example is the RSRQ (Reference Signal Received Quality) measurement that provides additional information (RSRQ combines signal strength as well as interference level).

The LTE network provides the UE with eNB neighbor (to serving eNB) lists. Based on the network knowledge configuration, the (serving) eNodeB provides the UE with neighboring eNB's identifiers, etc. The UE then measures the signal quality of the neighbors it can receive. The UE reports results back to the eNodeB. Note: UE also measures the signal quality of the serving eNB.

According to the specification, the RSRP is defined as the linear average over the power contributions (in [W]) of the resource elements that carry cell-specific reference signals within the considered measurement frequency bandwidth. The measurement bandwidth that is used by the UE to determine RSRP is left up to the UE implementation with the limitation that corresponding measurement accuracy requirements have to be fulfilled.

Considering the measurement bandwidth accuracy requirements this bandwidth is fairly large and the cell-specific reference signals that are used in the RSRP measurements can be further processed to determine these reference signals subcarriers phase and amplitude that are in turn applied to the multi-path processor for multipath interference mitigation and generation of range based location observables. In addition, other reference signals that are used in the RSRP measurement, for example SSS (Secondary Synchronization Signal) might be also used.

Thereafter, based on range observables from three or more cells the location fix can be estimated using multilateration and location consistency algorithms.

As was mentioned previously while there are several causes of the RF fingerprinting database instability one of the major ones is the multipath (the RF signature is very sensitive to multipath). As a result, the RF Fingerprinting method(s)/technology locate accuracy is heavily impacted by multipath dynamics changes over time, environment (for example weather), people and/or objects movement, including vertical uncertainty: >100% variability depending upon device Z-height and/or antenna orientation (see Tsung-Han Lin, et al. Microscopic Examination of an RSSI-Signature-Based Indoor Localization System).

The present embodiments can significantly improve the RF Fingerprinting locate accuracy because of the ability (multipath processor) to find and characterize each individual path, including significantly attenuated DLOS. As a result, the RF Fingerprinting decision on the location fix can be supplemented with the real-time multipath distribution information As was mentioned above, the locate fix will require position references synchronization in time. In wireless networks these position references may include Access Points, Macro/Mini/Pico and Femto cells, as wells as so called Small cells (eNB). However, wireless operators do not implement the synchronization accuracy that is needed for an accurate position fix. For example, in case of LTE the standard does not require any time synchronization between eNB(s) for the FDD (Frequency Division Duplexing) networks. For LTE TDD (Time Division Duplexing) this time synchronization accuracy is limit is +/−1.5 microseconds. This is equivalent to 400+meters locate uncertainty. Although not required, the LTE FDD networks are also synchronized but use even larger (than 1.5 microseconds) limits.

Wireless LTE operators are using GPS/GNSS signals to synchronize eNB(s) in frequency and time. Note: The LTE eNB has to maintain a very accurate carrier frequency: 0.05 ppm for macro/mini cells and slightly less accurate for other type of cells (0.1-0.25 ppm). The GPS/GNSS signals can also enable a required (for locate) time synchronization accuracy of better than 10 nanoseconds. However, network operators and network equipment manufacturers are trying to reduce costs associated with the GPS/GNSS units in favor of Packet Transport/, e.g. Internet/Ethernet networking time synchronization by employing NTP (Network Time Protocol) and/or PTP (Precision Time Protocol), for example IEEE 1588v2 PTP.

The IP network based synchronization has a potential of meeting the minimum frequency and time requirements, but is lacking the GPS/GNSS precision that is needed for locate fix.

The approach described herein is based on the GPS/GNSS signals and signals generated by the eNB and/or AP, or other wireless networks equipment. It also can be based on the IP networking synchronization signals and Protocols and signals generated by the eNB and/or AP, or other wireless networks equipment. This approach is also applicable to other wireless networks, including WiMax, WiFi, and White Space.

Figure 12:
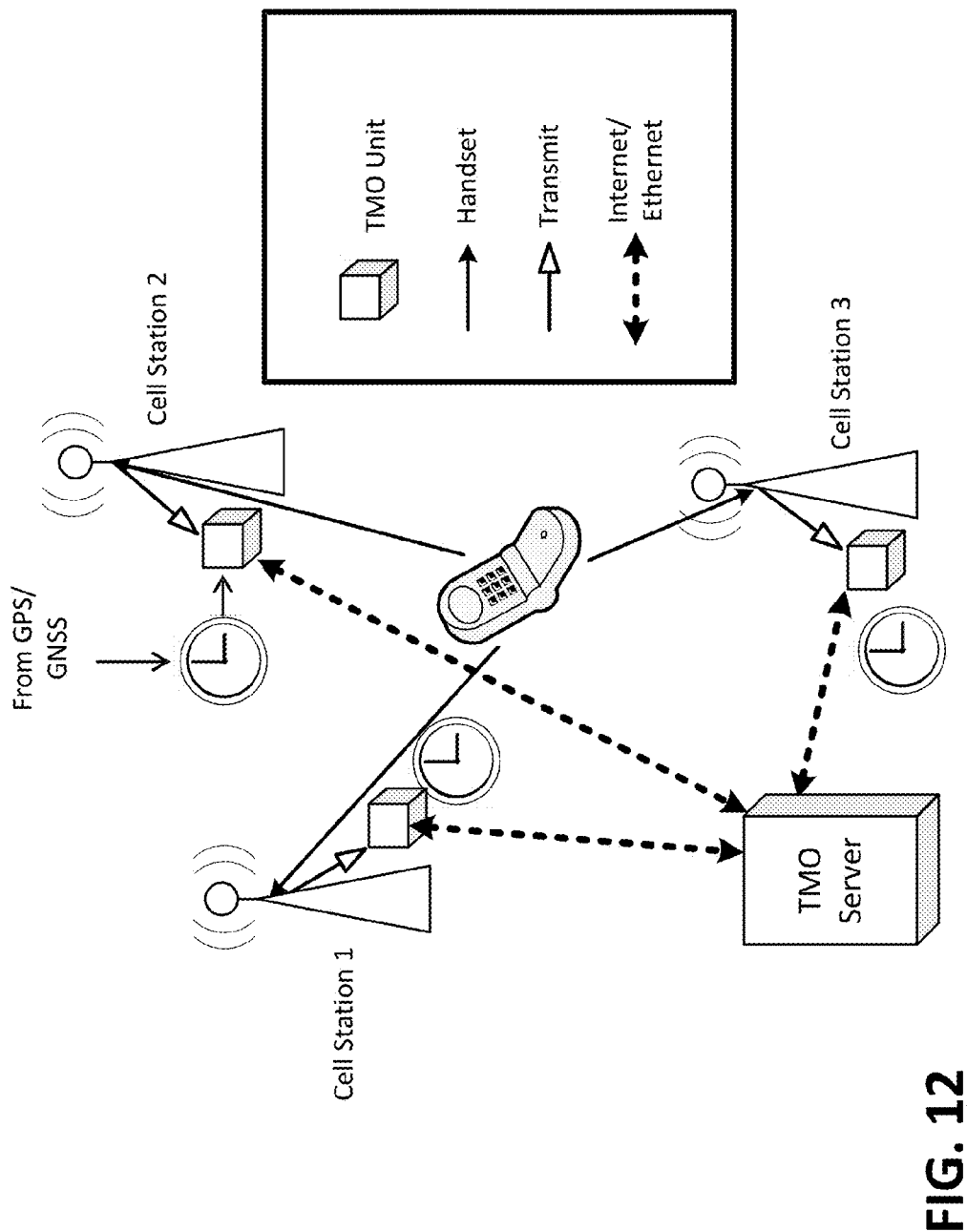
FIG. 12 illustrates the operation of a Time Observation Unit (TMO) installed at an operator's eNB facility.

The eNB signals are received by the Time Observation Unit (TMO) installed at the operator's eNB facility (FIG. 12). The TMO also include the External Synchronization Source input.

The eNB signals are processed by the TMO and are time stamped using clocks that are synchronized with the External Synchronization Source input.

The External Synchronization Source could be from the GPS/GNSS and/or Internet/Ethernet networking, for example PTP or NTP, etc.

The time-stamped processed signal, for example the LTE frame start (could be other signals, especially in other networks), also includes the eNB (cell) location and/or cell ID, is sent via the Internet/Ethernet backhaul to a central TMO Server that creates, maintains and updates a data base of all eNBs.

The UE and/or eNB(s) involved in the process of ranging and obtaining a location fix will quire the TMO Server and the server will return the time synchronization offsets between the eNB(s) involved. These time synchronization offsets will be used by the UE and/or eNB(s) involved in the process of obtaining a location fix to adjust the location fix.

Alternatively, the location fix calculations and adjustment can be carried out by the TMO Server when UE and/or eNB(s) involved in the process of ranging will also supply the obtained ranging information to the TMO Server. The TMO Server will then return an accurate (adjusted) position (locate) fix.

If more than one cell eNB equipment is co-located together a single TMO can process and time stamp signals from all eNB(s).

The RTT (Round Time Trip) measurements (ranging) can be used for locating. The drawback is that the RTT ranging is subject to multipath which has drastic impact on the locate accuracy.

On the other hand, RTT locating does not require the position references synchronization (in time) in general and in case of LTE the eNB in particular.

At the same time, when operating with Pilot Reference and/or other signals of the wireless network the multipath mitigation processor, method(s)/techniques and algorithms described in U.S. Pat. No. 7,872,583 are capable of determining the channel response for the RTT signal(s), e.g. identify the multipath channel that the RTT signal(s) are going through. This allows to correct the RTT measurements so that the actual DLOS time will be determined.

With DLOS time known it will be possible to obtain the location fix using trilateration and/or similar locating methods without the need of eNB or position references synchronization in time.

Even with TMO and TMO Server in place the InvisiTrack's technology integration will require changes in the macro/mini/pico and small cells and/or UE (cell phone). Although these changes are limited only to SW/FW (software/firmware) it takes a lot of effort to revamp the existing infrastructure. Also, in some cases network operators and/or UE/cell phone manufacturers/suppliers resisting equipment modifications. Note: UE is wireless network User Equipment.

This SW/FW change can be completely avoided if the TMO and TMO Server functionality is expanded to support the InvisiTrack locate technology. In other words, another embodiment described below operates with wireless networks signals, but do not require any modifications of the wireless network equipment/infrastructure. Thus, the embodiment described below operates with LTE networks and it is also applicable to other wireless systems/networks, including Wi-Fi.

In essence this embodiment creates a parallel wireless locate infrastructure that uses the wireless network signals to obtain location fix.

Similarly to TMO and TMO Server, the InvisiTrack's locate infrastructure will consists of one or more wireless Network Signals Acquisition Units (NSAU) and one or more Locate Server Units (LSU) that collect data from NSAU(s) and analyze it, determining range and locations, and to convert it into a table, e.g. of phone/UEs IDs and locations at an instant of time. The LSU interfaces to the wireless network via network's API.

Multiple of these units could be deployed in various locations in a large infrastructure. If NSAU(s) have coherent timing—the results for all can be used which will give better accuracy.

The coherent timing can be derived from the GPS clock and/or other stable clock sources.

The NSAU communicates with LSU via LAN (Local Area Network), Metro Area Network (MAN) and/or Internet.

In some installation/instances the NSAU and LSU could be combined/integrated into a single unit.

In order to support location services using LTE or other wireless networks, the transmitters are required to be clock and event synchronized to within tight tolerances. Normally this is accomplished by locking to the 1 PPS signal of GPS. This will result in timing synchronization in a local area to within 3 nanosecond 1-sigma.

However, there are many instances when this type of synchronization is not practical. This present embodiments provide time offset estimates between the downlink transmitters and tracking of the time offsets in order to provide delay compensation values to the location process so the location process can proceed as if the transmitters were clock and event synchronized. This is accomplished by prior knowledge of the transmit antenna (which is required for any location services) and a receiver with known a priori antenna location. This receiver called the synchronization unit will collect data from all the downlink transmitters and given its knowledge of the locations, calculate the offset timing from a preselected base antenna. These offsets are tracked by the system through the use of a tracking algorithm that compensates for clock drifts the downlink transmitters. Note: The processing to derive pseudo ranges from the received data will utilize the InvisiTrack Multipath mitigation algorithms (described in U.S. Pat. No. 7,872,583). Hence the synchronization will not be impacted by multipath.

These offset data are used by the location processor (Location Server, LSU) to properly align the data from each downlink transmitter so that it appears to have been generated by synchronized transmitters. The time accuracy is comparable with the best 1-PPS tracking and will support 3 meter location accuracy (1-sigma).

The synchronization receiver and/or receiver's antennas will be located based on optimal GDOP for best performance. In large installations multiple synchronization receivers can be utilized to provide an equivalent 3 nsec 1-sigma synchronization offset throughout the network. By utilizing synchronization receivers(s) the requirements for synchronization of the downlink transmitters is eliminated.

The synchronization receiver unit can be a standalone unit communicating with the NSAU and/or LSU. Alternatively this synchronization receiver can be integrated with the NSAU.

Figure 13:
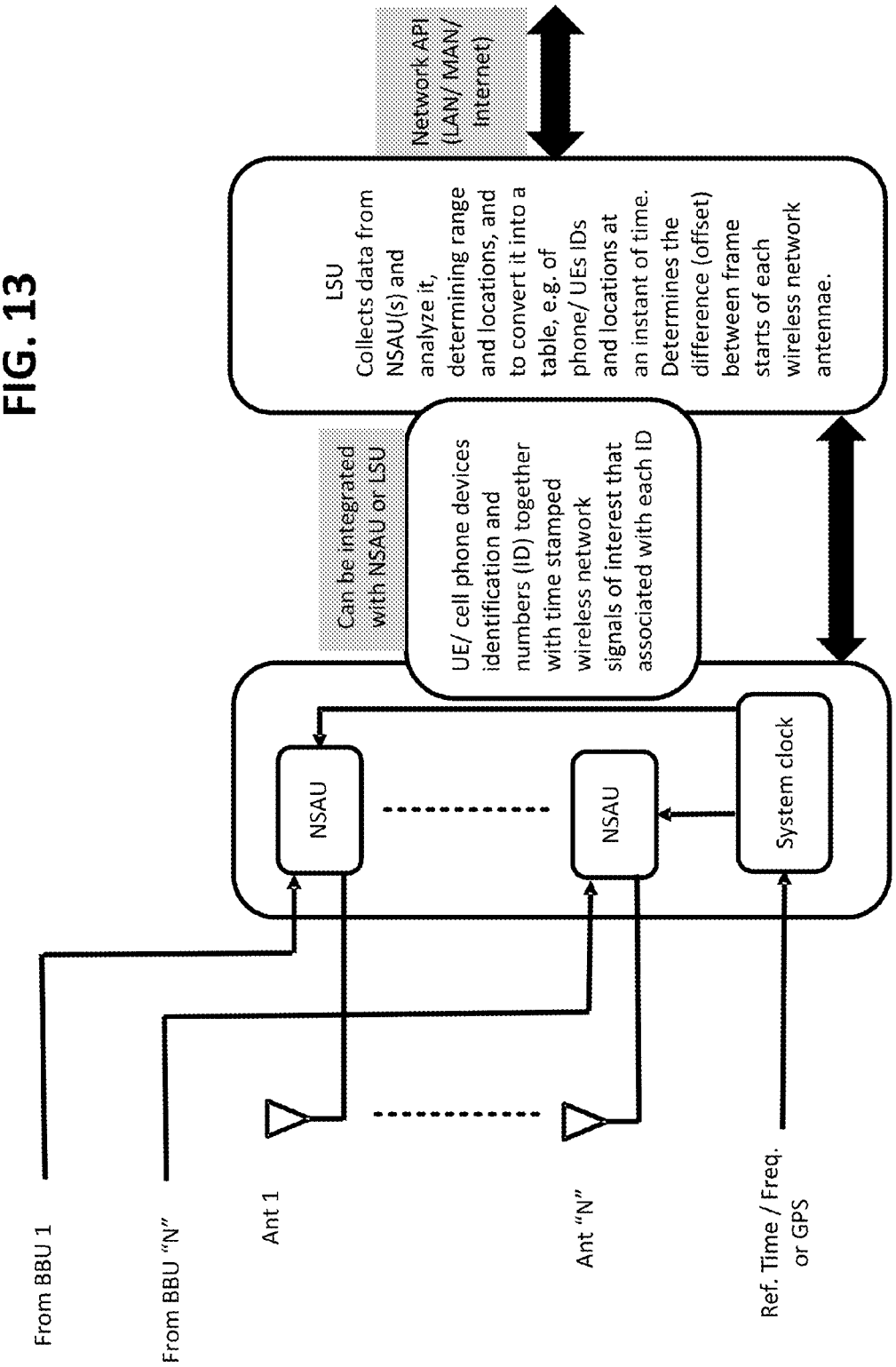
FIG. 13 illustrates an exemplary wireless network locate equipment diagram.

The exemplary wireless network locate equipment diagram is depicted in FIG. 13.

Figure 14:
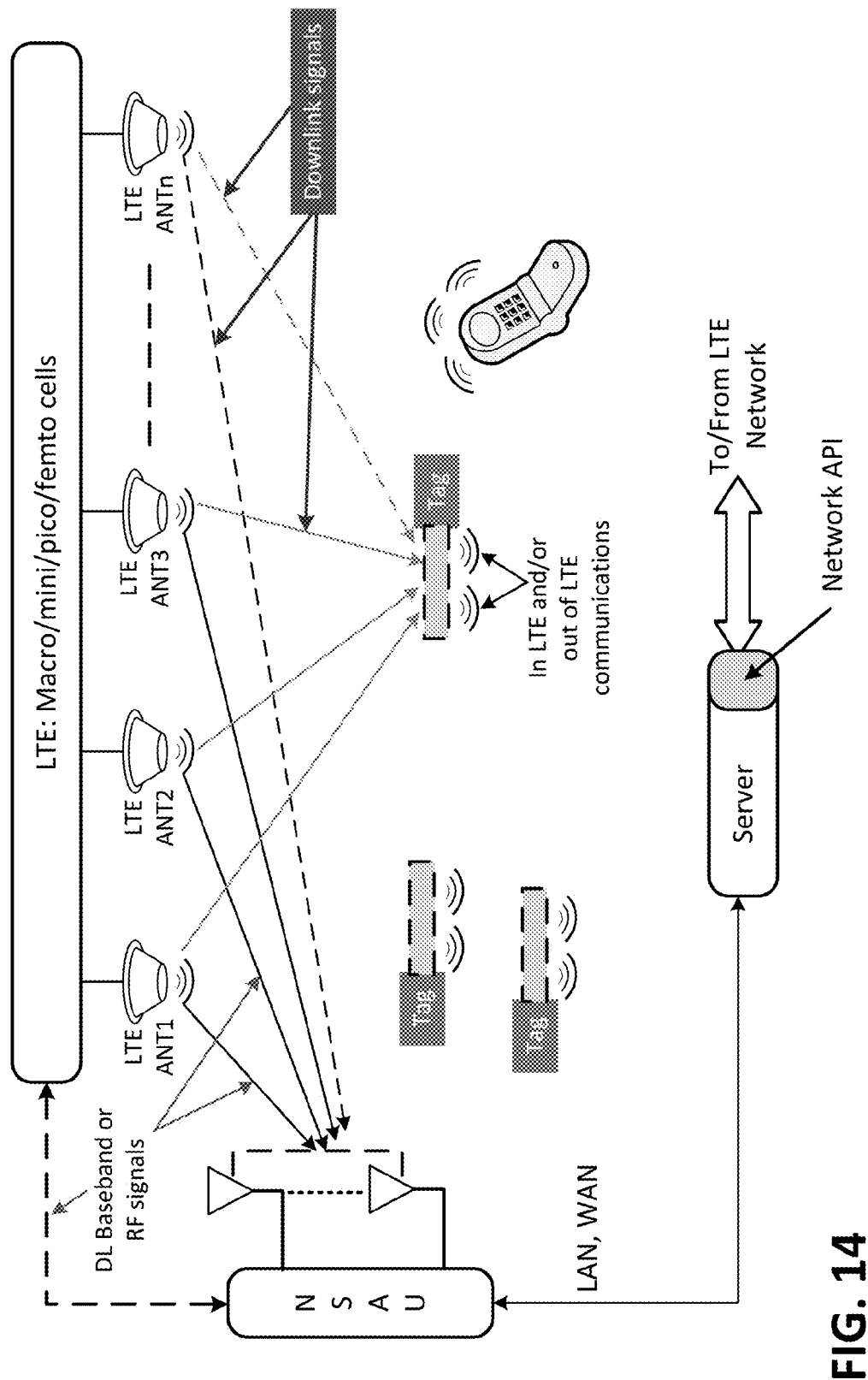
FIG. 14 illustrates an exemplary wireless network locate Downlink ecosystem for Enterprise applications.
Figure 15:
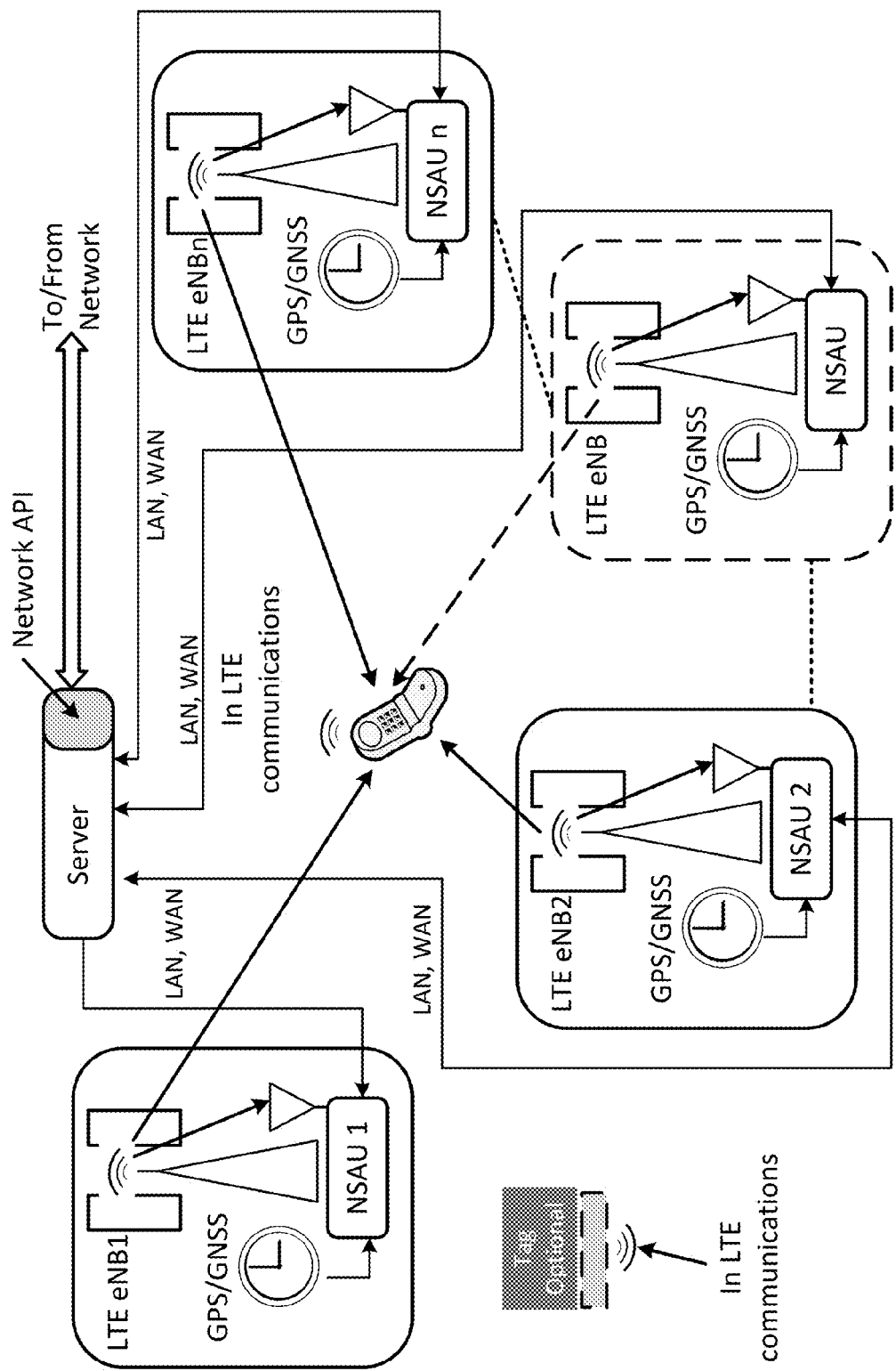
FIG. 15 illustrates an exemplary wireless network locate Downlink ecosystem for network wide applications.

The embodiment of a completely autonomous system, no Customer Network Investment, which utilizes LTE signals operates in the following modes:
1. Uplink mode uses wireless network Uplink (UL) signals for the purpose of locating (FIGS. 16 and 17)
2. Downlink mode uses wireless network Downlink (DL) signals for the purpose of locating (FIGS. 14 and 15).
3. Two-way mode uses both: UL and DL signals for locating. In the Uplink mode multiple antennas are connected to one or more NSAUs. These antennae locations are independent from the wireless network antennas; NSAU(s) antennae locations are selected to minimize the GDOP (Geometric Dilution of Precision).

Network' RF signals from the UE/cell phone devices are collected by NSAU(s) antennae and are processed by NSAU(s) to produce time stamped samples of the processed network' RF signals during a time interval that is adequate for capturing one or more instances of all signals of interest.

Optionally, NSAU will also receive, process and time stamped samples of Downlink signals to obtain additional information, for example for determining UE/phone ID, etc.

From captured time stamped samples the UE/cell phone devices identification numbers (ID) together with time stamped wireless network signals of interest that associated with each UE/cell phone ID(s) will be determined (obtained). This operation can be performed either by the NSAU or by the LSU.

The NSAU will periodically supply data to the LSU. If unscheduled data is needed for one or more UE/cell phone ID(s) then LSU will request additional data.

No changes/modifications will be needed in wireless network infrastructure and/or existing UE/cell phone for the UL mode operation.

In the Downlink (DL) mode the InvisiTrack enabled UE will be required. Also, the cell phone FW would have to be modified if phone is used to obtain location fix.

In some instances operators can make baseband signals available from BBU(s) (Base Band Units). In such cases NSAU(s) will also be capable process these available base band wireless network signals instead of RF wireless network signals.

In the DL mode there is no need to associate the UE/cell phone ID with one or more wireless network signals because these signals will be processed in the UE/cell phone or UE/cell phone will periodically produce time stamped samples of the processed network' RF signals and send these to the LSU; and the LSU will send result(s) back to the UE/cell phone.

In the DL mode the NSAU will process and time stamp processed RF or baseband (when available) wireless network signals. From captured time stamped samples wireless network signals DL frames starts associated with the network antennas will be determined (obtained) and the difference (offset) between these frame starts will be calculated. This operation can be performed either by the NSAU or by the LSU. Frame starts offsets for network antennas will be stored on the LSU.

In the DL mode frame starts offsets of network antennas will be sent from LSU to the UE/phone device in case when the device will process/determine its own location fix using InvisiTrack technology. Otherwise, when UE/cell phone device will periodically send time stamped samples of the processed network' RF signals to the LSU, the LSU will determine the device's location fix and will send the location fix data back to the device.

In DL mode the wireless network RF signals will come from one or more wireless network antennae. To avoid multipath impact on results accuracy the RF signal should be sniffed out from the antenna or the antenna connection to the wireless network equipment.

The two-way mode encompasses determination of the location fix from both: UL and DL operations. This allows further improve the locate accuracy.

Some Enterprise set ups use one or more BBUs feeding one or more Remote Radio Heads (RRH), with each RRH in turn feeding multiple antennae with the same ID. In such environments, depending on wireless network configuration, determining the DL mode frame starts offsets of network antennas might not be required. This includes a single BBU set up as well as multiple BBUs, whereby antennae of each BBU are assigned to a certain zone and adjacent zones coverage's are overlapping.

On the other hand a configuration, configuration whereby antennae that are fed from multiple BBUs are interleaved in the same zone will require determining the DL mode frame starts offsets of network antennas.

In DL mode of operation in DAS environment multiple antennae may share the same ID.

In the present embodiments, location consistency algorithm(s) are extended/developed to isolate the ranges of the DAS antennas from observables generated by the multipath mitigation processing from reference signal(s) (including pilot and/or synchronization) subcarriers and to obtain the location estimates from the multiple DAS emitters (antennas) ranges.

However, these consistency algorithms have limits of number of antennae that emit the same ID. It is possible to reduce the number of antennae that emit the same ID by
1. For a given coverage zone interleave Antennas that are fed from different sectors of sectorized BBU (BBUs are capable of supporting up to six sectors)
2. For a given coverage zone interleave Antennas that are fed from different sectors of sectorized BBU as well as Antennas that are fed from different BBUs
3. Adding a propagation delay element to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference). The addition of a unique delay ID for one or more antenna further reduces the number of antennae that emit the same ID.

In an embodiment, an autonomous system with no Customer Network Investment can be offered. In such embodiment, the system can operate on a band other than the LTE band. For example, ISM (industrial Scientific and Medical) bands and/or White Space bands can be used in places where LTE services are not available.

The embodiment can be also integrated with the macro/mini/pico/femto station (s) and/or UE (cell phone) equipment. Although the integration may require Customer Network Investment, it can reduce cost overhead and can dramatically improve the TCO (Total Cost of Ownership).

As mentioned herein above, PRS can be used by the UE for the Downlink Observed Time Difference of Arrival (DL-OTDOA) positioning. Regarding the synchronization of neighboring base stations (eNBs), the 3GPP TS 36.305 (Stage 2 functional specification of User Equipment (UE) positioning in E-UTRAN) specifies transferring timing to the UE, the timing being relative to an eNode B service of candidate cells (e.g., neighboring cells). The 3GPP TS 36.305 also specifies Physical cell IDs (PCIs) and global cell IDs (GCIs) of candidate cells for measurement purposes.

According to the 3GPP TS 36.305, this information is delivered from the E-MLC (Enhanced Serving Mobile Location Centre) server. It is to be noted that the TS 36.305 does not specify the abovementioned timing accuracy.

Additionally, the 3GPP TS 36.305 specifies that the UE shall return to the E-MLC the downlink measurements, which includes Reference Signal Time Difference (RSTD) measurements.

The RSTD is the measurement taken between a pair of eNBs (see TS 36.214 Evolved Universal Terrestrial Radio Access (E-UTRA); Physical Layer measurements; Release 9). The measurement is defined as a relative timing difference between a subframe received from the neighboring cell j and a corresponding subframe of the serving cell i. Positioning Reference Signals are used to take these measurements. The results are reported back to the location server that calculates the position.

In an embodiment, a hybrid method can be defined to accommodate both the newly introduced PRS and the already existing reference signals. In other words, the hybrid method can use/operate with PRS, with other reference signals (e.g., cell or node-specific reference signals (CRS)), or with both signal types.

Such a hybrid method provides the advantage of allowing network operator(s) to dynamically choose the mode of operation depending on circumstances or network parameters. For example, the PRS have better hearability than CRS, but may result in up to 7% reduction in the data throughput. On the other hand, CRS signals do not cause any throughput reduction. In addition, CRS signals are backward compatible with all previous LTE releases, for example Rel-8 and lower. As such, the hybrid method provides a network operator the ability to trade-off or balance between hearability, throughput, and compatibility.

In Long Term Evolution (LTE) implementations, LTE downlink baseband signals (generated by a cell or wireless node and referred to herein as "nodes") are generally combined into downlink frames. A receiver for detecting and receiving such signals may detect downlink frames from multiple cells or nodes (two or more). Each downlink frame includes multiple CRS or reference signals. In a Downlink (DL) frame, these reference signals have predetermined positions in time and frequency, e.g., there are deterministic time offsets between the frame start and each CRS in a given frame.

In addition, each CRS is modulated with a special code. The modulation and the code are also predetermined. The CRS modulation is the same for all nodes, but the code (seed) is determined by the ID (identification) number of the node.

As a result, by knowing the node ID(s), it is possible to estimate a course location of a frame start time for each frame from each node (cell), in the spectrum of the reference signals. To do so, it is first necessary to determine the frame start times or frame starts for all DL signals from different nodes. For example, in an embodiment, by correlating the received DL baseband signal with known replicas of code modulated CRS (generated internally by a detector and/or a multipath mitigation processor) it is possible to find all CRS sequences or other reference signals from various nodes, and with this information find coarse location frame starts of all observable nodes. In an embodiment, the detector may also demodulate/decode the CRS and then correlate the demodulated/decoded CRS with baseband sub-carriers that are assigned to the CRS.

At the same time, in an embodiment, the CRS may also be used as ranging signals by the multipath mitigation processor. Therefore, in addition to finding coarse frame starts the detector's correlation process is also capable of isolating the CRS from other signals (such as payload) in the frame using the code that was used to modulate those signals. Thereafter, these isolated CRS, and associated frames starts, are transferred to a multipath mitigation processor for ranging.

A similar approach can be used in the Uplink mode, whereby timing offsets between different node receivers can be determined.

In a downlink embodiment, a system for tracking and locating one or more wireless network devices in communication with a network comprises a user equipment receiver configured to receive multiple signals from two or more nodes in communication with the network, the multiple signals being modulated with a code determined by an identification of each node of the two or more nodes transmitting the multiple signals, the user equipment receiver including a detector configured to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In the embodiment, the system further comprises an uplink embodiment where a node receiver is configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a second processor is configured to use the device reference signals as ranging signals from each wireless network device for tracking and locating the one or more wireless network devices.

In an embodiment, a system for tracking and locating one or more wireless network devices in communication with a network, comprises a user equipment receiver configured to receive multiple signals from two or more nodes in communication with the network, the multiple signals being modulated with a code determined by an identification of each node of the two or more nodes transmitting the multiple signals, and a processor configured to detect and isolate reference signals from the multiple signals based on the identification and to use the reference signals as ranging signals from each node for tracking and locating the one or more wireless network devices.

In the embodiment, wherein the multiple signals from each node of the two or more nodes are combined into a frame that includes the reference signals, and wherein the processor is further configured to estimate a course location of frame starts from each node.

In the embodiment, wherein the processor is further configured to estimate the course location by correlating the reference signals with known replicas of the reference signals.

In the embodiment, wherein the processor is further configured to estimate a relative time of arrival of the ranging signals from each node based on the course location and isolated reference signals.

In the embodiment, wherein the processor is further configured to isolate the reference signals from any other signals in the frame, and wherein the processor is further configured to isolate the reference signals for each node of the two or more nodes.

In the embodiment, wherein the multiple signals from each node of the two or more nodes are in a frame, wherein the processor is further configured to estimate a course location of frame starts from each node by correlating the reference signals with known replicas of the reference signals, wherein the processor is further configured to isolate the reference signals from any other signals in the frame and to isolate the reference signals for each node of the two or more nodes, and wherein the processor is further configured to estimate a relative time of arrival of the ranging signals from each node based on the course location and isolated reference signals.

In an embodiment, a system for tracking and locating one or more wireless network devices in communication with a network, comprises a detector configured to receive multiple signals from two or more nodes in communication with the network, the multiple signals being modulated with a code determined by an identification of each node of the two or more nodes transmitting the multiple signals, and to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In an embodiment, a system for tracking and locating one or more wireless devices in communication with a network, comprises a node receiver configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a processor configured to use the device reference signals as ranging signals from each wireless network device for tracking and locating the one or more wireless network devices.

Furthermore, the hybrid method can be transparent to the LTE UE positioning architecture. For instance, the hybrid method can operate in the 3GPP TS 36.305 framework.

In an embodiment, RSTD can be measured and, according to the 3GPP TS 36.305, transferred from a UE to an E-SMLC.

The UL-TDOA (U-TDOA) is currently in a study phase and is expected to be standardized in the upcoming release 11.

Figure 16:
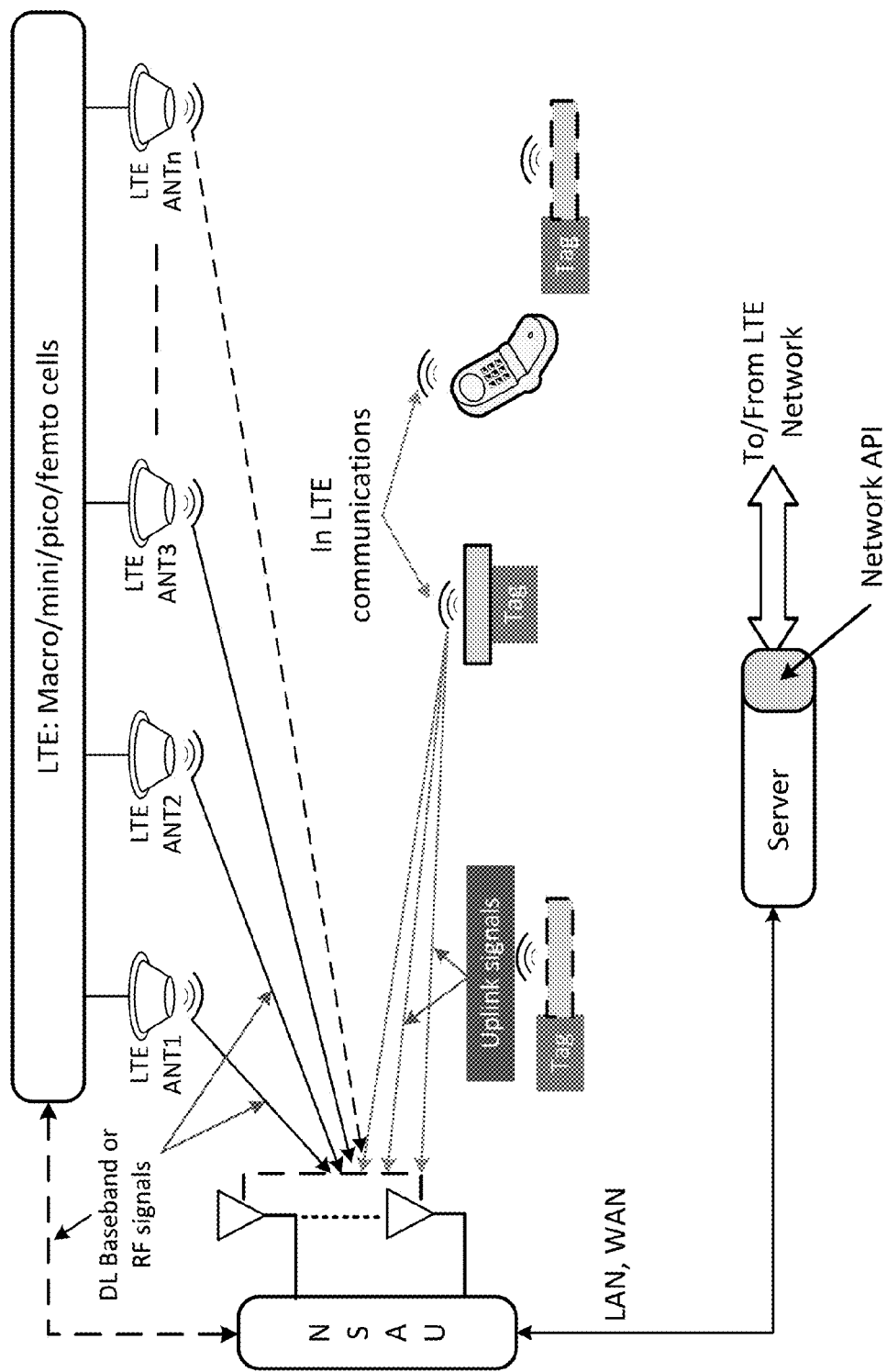
FIG. 16 illustrates an exemplary wireless network locate Uplink ecosystem for Enterprise applications.
Figure 17:
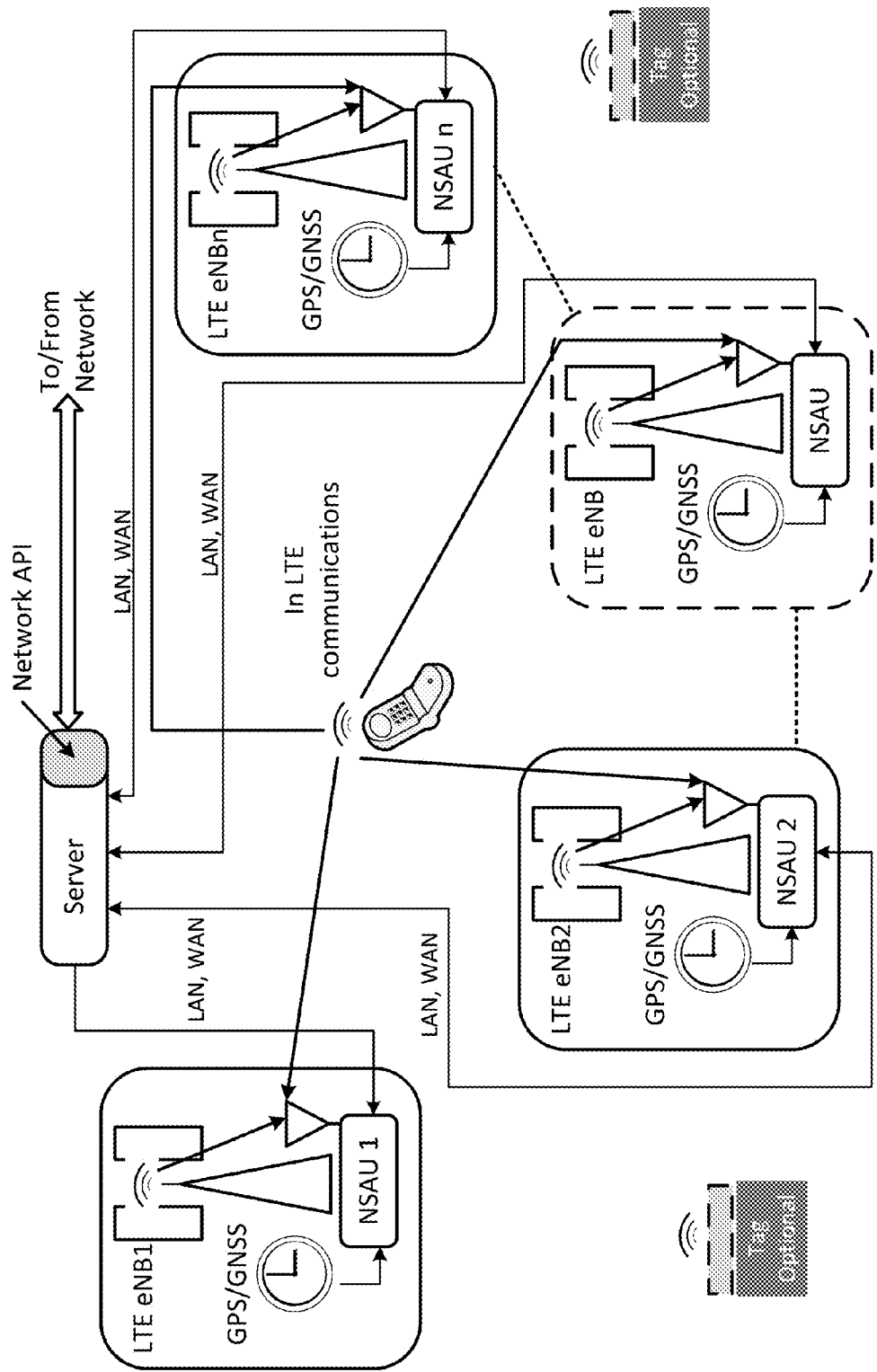
FIG. 17 illustrates an exemplary wireless network locate Uplink ecosystem for network wide applications.
Figure 18:
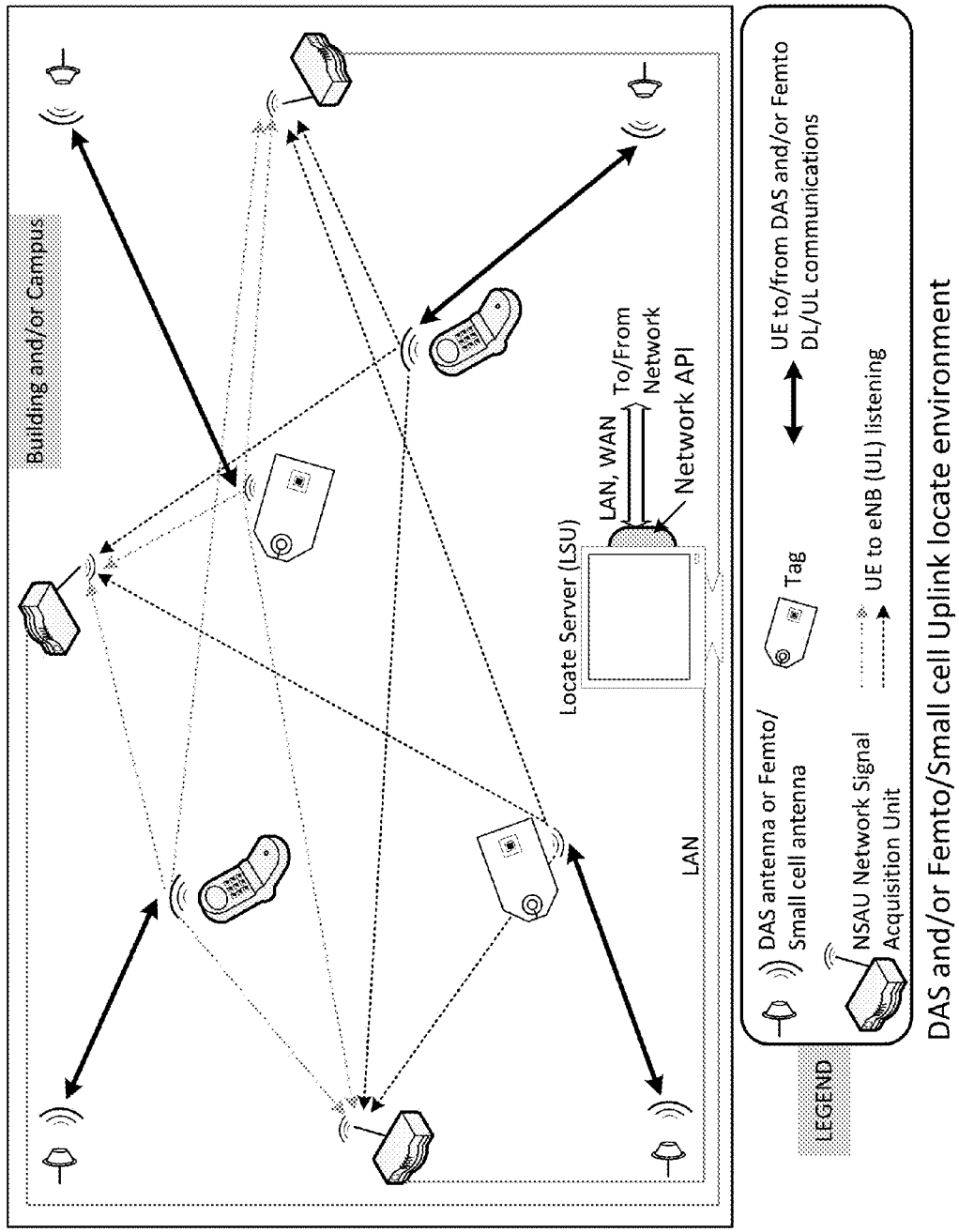
FIG. 18 illustrates an alternative embodiment of a UL-TDOA.
Figure 19:
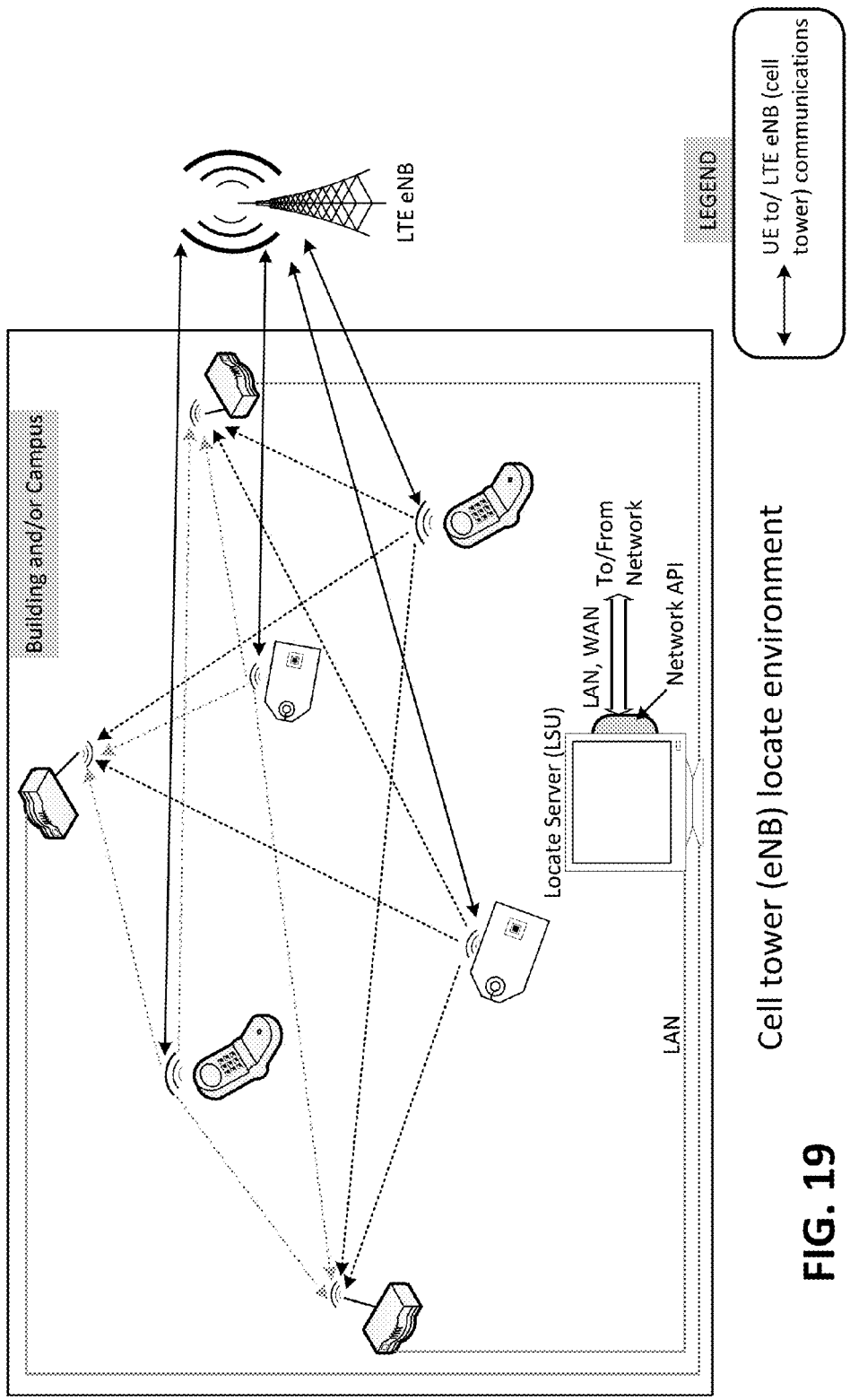
FIG. 19 illustrates another embodiment of a UL-TDOA.

Embodiments of the UL-TDOA (Uplink) are described herein above and are also shown in FIGS. 16 and 17. FIGS. 18 and 19, described herein below, provide examples of alternative embodiments of the UL-TDOA.

FIG. 18 presents an environment that may include one or more DAS and/or Femto/Small cell antennas. In this example embodiment, each NSAU is equipped with a single antenna. As depicted, at least three NSAUs are required. However, additional NSAUs can be added to improve hearability because each UE must be "heard" by at least three NSAUs.

Furthermore, the NSAU(s) can be configured as receivers. For example, each NSAU receives but does not transmit information over the air. In operation, each NSAU can listen to the wireless Uplink network signals from UEs. Each of the UEs can be a cell phone, a Tag, and/or another UE device.

Moreover, the NSAUs can be configured to communicate with a Locate Server Unit (LSU) over an interface, such as a wired service or a LAN. In turn, the LSU can communicate with a wireless or an LTE network. The communication can be via a network API, where the LSU can, for example, communicate with an E-SMLC of the LTE network and can use a wired service such as a LAN and/or a WAN.

Optionally, the LSU may also communicate directly with DAS base station(s) and or Femto/Small cells. This communication can use the same or a modified Network API.

In this embodiment, the Sounding Reference Signal (SRS) can be used for locate purposes. However, other signals may also be employed.

The NSAUs can convert the UE Uplink transmission signals to a digital format, for example I/Q samples, and can periodically send a number of the converted signals to the LSU with a time stamp.

The DAS base station(s) and or Femto/Small cells can pass to the LSU one or all of the following data:
1) the SRS, the I/Q samples, and the time stamp;
2) a list of served UE IDs; and
3) SRS schedule per UE with a UE ID, the schedule including SRS SchedulingRequestConfig information and SRS-UL-Config information.

The information passed to the LSU may not be limited by the abovementioned information. It can include any information needed to correlate each UE device uplink signal, such as a UE SRS, with each UE ID.

The LSU functionality can include ranging calculations and obtaining the location fix of a UE. These determinations/calculations can be based on the information passed from the NSAUs, the DAS bases stations, and/or Femto/Small cells to the LSU.

The LSU may also determine timing offsets from the available downlink transmission information passed from the NSAUs to the LSU.

In turn, the LSU can provide the wireless or LTE network with UE location fix and other calculations and data. Such information can be communicated via the Network API.

For synchronization purposes, each NSAU may receive, process, and time stamp samples of Downlink signals. Each NSAU may also periodically send a number of such samples to the LSU, including the time stamp(s).

Additionally, each NSAU may include an input configured for synchronization with external signal(s).

FIG. 19 depicts another embodiment of a UL-TDOA. In addition to the components depicted under FIG. 18, the environment of this embodiment may include one or more cell towers that can be used in lieu of the DAS base stations and/or Femto/Small cells. Data from the one or more cell towers can be used to obtain the location fix of a UE.

As such, an advantage of this embodiment includes obtaining a location fix with only a single cell tower (eNB). In addition, this embodiment can be configured to operate in a similar manner as described under FIG. 18, with the exception that one or more eNBs can replace the DAS base stations and/or the Femto/Small cells.

Having thus described the different embodiments of a system and methods, it should be apparent to those skilled in the art that certain advantages of the described method and apparatus have been achieved. In particular, it should be appreciated by those skilled in the art that a system for tracking and locating objects can be assembled using FGPA or ASIC and standard signal processing software/hardware combination at a very small incremental cost. Such a system is useful in a variety of applications, e.g. locating people in indoor or in outdoor environments, harsh and hostile environments etc.

It should also be appreciated that various modifications, adaptations, and alternative embodiments thereof may be made within the scope and spirit of the present invention.

The invention claimed is:

1. A system for tracking and locating one or more wireless network devices in communication with a network, comprising:
a user equipment receiver configured to receive multiple signals from each of two or more nodes in communication with the network, the multiple signals being modulated with a code determined by an identification of each node of the two or more nodes transmitting the multiple signals and combined into a frame that includes a reference signal, the user equipment receiver including a detector configured to detect and isolate the reference signal from the multiple signals based on the identification and the frame; and
a processor configured to use the reference signal as a ranging signal from each node for tracking and locating the one or more wireless network devices.

2. The system as recited in claim 1, wherein the detector is further configured to estimate a course location of frame starts from each node.

3. The system as recited in claim 2, wherein the detector is further configured to estimate the course location by correlating the reference signal with known replicas of such reference signal.

4. The system as recited in claim 2, wherein the detector is further configured to isolate the reference signal from any other signals in the frame, and wherein the detector is further configured to isolate the reference signal for each node of the two or more nodes.

5. The system as recited in claim 4, wherein the processor is at least one multipath mitigation processor, and wherein the detector is configured to pass the course location and isolated reference signal for each node to the multipath mitigation processor, and wherein the multipath mitigation processor is configured to receive the course location and isolated reference signal and estimate a relative time of arrival of the ranging signal from each node.

6. The system as recited in claim 1, further comprising:
a node receiver configured to receive device signals from the one or more wireless network devices, the device signals being modulated with a device code determined by a device identification of each wireless network device of the one or more wireless network devices transmitting the device signals, the node receiver including a device detector configured to detect and isolate a device reference signal from the device signals based on the device identification; and
a second processor configured to use the device reference signal as a ranging signal from each wireless network device for tracking and locating the one or more wireless network devices.

7. A system for tracking and locating one or more wireless network devices in communication with a network, comprising:
a user equipment receiver configured to receive multiple signals from each of two or more nodes in communication with the network, the multiple signals being modulated with a code determined by an identification of each node of the two or more nodes transmitting the multiple signals and combined into a frame that includes a reference signal; and
a processor configured to detect and isolate the reference signal from the multiple signals based on the identification and the frame, and to use the reference signal as a ranging signal from each node for tracking and locating the one or more wireless network devices.

8. The system as recited in claim 7, wherein the processor is further configured to estimate a course location of frame starts from each node.

9. The system as recited in claim 8, wherein the processor is further configured to estimate the course location by correlating the reference signal with known replicas of the reference signal.

10. The system as recited in claim 9, wherein the processor is further configured to estimate a relative time of arrival of the ranging signal from each node based on the course location and isolated reference signal.

11. The system as recited in claim 8, wherein the processor is further configured to isolate the reference signal from any other signals in the frame, and wherein the processor is further configured to isolate the reference signal for each node of the two or more nodes.

12. A system for tracking and locating one or more wireless network devices in communication with a network, comprising:
a detector configured to receive multiple signals from each of two or more nodes in communication with the network, the multiple signals being modulated with a code determined by an identification of each node of the two or more nodes transmitting the multiple signals and combined into a frame that includes a reference signal, and to detect and isolate the reference signal from the multiple signals based on the identification and the frame; and
a processor configured to use the reference signal as a ranging signal from each node for tracking and locating the one or more wireless network devices.

13. The system as recited in claim 12, wherein the detector is further configured to estimate a course location of frame starts from each node.

14. The system as recited in claim 13, wherein the detector is further configured to estimate the course location by correlating the reference signal with known replicas of such reference signal.

15. The system as recited in claim 13, wherein the detector is further configured to isolate the reference signal from any other signals in the frame, and wherein the detector is further configured to isolate the reference signal for each node of the two or more nodes.

16. The system as recited in claim 15, wherein the processor is at least one multipath mitigation processor, and wherein the detector is configured to pass the course location and isolated reference signal for each node to the multipath mitigation processor, and wherein the multipath mitigation processor is configured to receive the course location and isolated reference signal and estimate a relative time of arrival of the ranging signal from each node.

17. A system for tracking and locating one or more wireless network devices in communication with a network, comprising:
- a node receiver configured to receive device signals at one or more same frequencies from a plurality of wireless network devices, the device signals being modulated with a device code determined by a device identification of each wireless network device of the plurality of wireless network devices transmitting the device signals, the node receiver including a device detector configured to detect and isolate device reference signals from the device signals based on the device identification, and wherein the detector is further configured to detect and isolate each device reference signal based on the reference signal's configuration parameters and schedule; and
- a processor configured to use the device reference signals as ranging signals from each wireless network device for tracking and locating the plurality of wireless network devices.

* * * * *